US012515125B2

United States Patent
Hinds et al.

(10) Patent No.: US 12,515,125 B2
(45) Date of Patent: Jan. 6, 2026

(54) SMART CLIENT FOR STREAMING OF SCENE-BASED IMMERSIVE MEDIA TO GAME ENGINE

(71) Applicant: Tencent America LLC, Palo Alto, CA (US)

(72) Inventors: Arianne Hinds, Palo Alto, CA (US); Stephan Wenger, Hillsborough, CA (US); Paul Spencer Dawkins, Garland, TX (US)

(73) Assignee: Tencent America LLC, Palo Alto, CA (US)

( * ) Notice: Subject to any disclaimer, the term of this patent is extended or adjusted under 35 U.S.C. 154(b) by 286 days.

(21) Appl. No.: 18/126,120

(22) Filed: Mar. 24, 2023

(65) Prior Publication Data

US 2023/0338834 A1  Oct. 26, 2023

Related U.S. Application Data

(60) Provisional application No. 63/400,364, filed on Aug. 23, 2022, provisional application No. 63/351,218, (Continued)

(51) Int. Cl.
 *A63F 13/335* (2014.01)
 *A63F 13/355* (2014.01)

(52) U.S. Cl.
 CPC .......... *A63F 13/335* (2014.09); *A63F 13/355* (2014.09)

(58) Field of Classification Search
 CPC ...................... A63F 13/355; A63F 13/335
 See application file for complete search history.

(56) References Cited

U.S. PATENT DOCUMENTS

2011/0185354 A1* 7/2011 Tanner ............... G06F 8/61
 717/178
2020/0068235 A1* 2/2020 Han ............ H04N 21/21805

FOREIGN PATENT DOCUMENTS

| JP | 2005-295467 A | 10/2005 |
| JP | 2010-114815 A | 5/2010 |
| WO | 2021/252102 A1 | 12/2021 |

OTHER PUBLICATIONS

International Search Report with Written Opinion issued in Application No. PCT/US2023/017398, mailed Jul. 3, 2023, 9 pages.
(Continued)

*Primary Examiner* — Yingchuan Zhang
(74) *Attorney, Agent, or Firm* — ArentFox Schiff LLP

(57) ABSTRACT

Aspects of the disclosure provide methods and apparatuses (electronic devices) for media processing. In some examples, an electronic device includes processing circuitry to perform a process of a smart client that is a client interface of the electronic device to an immersive media streaming network. A method for media processing includes transmitting, by the client interface of the electronic device and to a server device in the immersive media streaming network, capability and availability information of the electronic device for playing back a scene-based immersive media. Further, the method includes receiving, by the client interface, a media stream carrying adapted media content for the scene-based immersive media. The adapted media content is generated from the scene-based immersive media by the server device based on the capability and availability information. The method then includes playing back the scene-based immersive media according to the adapted media content.

15 Claims, 40 Drawing Sheets

Related U.S. Application Data filed on Jun. 10, 2022, provisional application No. 63/346,105, filed on May 26, 2022, provisional application No. 63/345,814, filed on May 25, 2022, provisional application No. 63/332,853, filed on Apr. 20, 2022.

(56) References Cited

OTHER PUBLICATIONS

Office Action received for Japanese Patent Application No. 2024-534586, mailed on Jul. 1, 2025, 6 pages (3 pages of English Translation and 3 pages of Original Document).
Extended European Search Report received for European Application No. 23790216.8, mailed on Sep. 4, 2025, 8 pages.

* cited by examiner

SMART CLIENT FOR STREAMING OF SCENE-BASED IMMERSIVE MEDIA TO GAME ENGINE

INCORPORATION BY REFERENCE

This present disclosure claims the benefit of priority to U.S. Provisional Application No. 63/332,853, "SMART CLIENT FOR STREAMING OF SCENE-BASED IMMERSIVE MEDIA TO GAME ENGINE" filed on Apr. 20, 2022, U.S. Provisional Application No. 63/345,814, "SUBSTITUTION OF VISUAL IMMERSIVE MEDIA ASSETS FOR PERSONALIZED EXPERIENCES" filed on May 25, 2022, U.S. Provisional Application No. 63/346,105, "SUBSTITUTION OF NONVISUAL IMMERSIVE MEDIA ASSETS FOR PERSONALIZED EXPERIENCES" filed on May 26, 2022, U.S. Provisional Application No. 63/351,218, "SMART CONTROLLER FOR NETWORK-BASED MEDIA ADAPTATION" filed on Jun. 10, 2022, and U.S. Provisional Application No. 63/400,364, "CLIENT SCENE-BASED IMMERSIVE MEDIA PROFILES FOR SUPPORT OF HETEROGENEOUS RENDER-BASED CLIENTS" filed on Aug. 23, 2022. The entire disclosures of the prior applications are hereby incorporated by reference in their entirety.

TECHNICAL FIELD

The present disclosure describes embodiments generally related to media processing and distribution.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Immersive media generally refers to media that stimulates any or all human sensory systems (visual, auditory, somatosensory, olfactory, and possibly gustatory) to create or enhance the perception of the user being physically present in the experience of the media, such as beyond what is distributed over existing commercial networks for timed two-dimensional (2D) video and corresponding audio which is known as "legacy media". Both immersive media and legacy media can be characterized as either timed or untimed.

Timed media refers to media that is structured and presented according to time. Examples include movie features, news reports, episodic content, all of which are organized according to periods of time. Legacy video and audio are generally considered to be timed media.

Untimed media is media that is not structured by time; but rather structured by logical, spatial, and/or temporal relationships. An example includes a video game where the user has control over the experience created by the gaming device. Another example of untimed media is a still image photograph taken by a camera. Untimed media may incorporate timed media, for example, in a continuously looped audio or video segment of a scene for a video game. Conversely, timed media may incorporate untimed media, for example a video with a fixed still image as background.

Immersive media-capable devices may refer to devices equipped with abilities to access, interpret, and present immersive media. Such media and devices are heterogeneous in terms of the quantity and formats of the media, and numbers and types of network resources required to distribute such media at scale, i.e., to achieve distribution equivalent to that of legacy video and audio media over networks. In contrast, legacy devices such as laptop displays, televisions, and mobile handset displays are homogenous in their capabilities since all of these devices are comprised of rectangular display screens, and consume 2D rectangular video or still images as their primary media formats.

SUMMARY

Aspects of the disclosure provide methods and apparatuses (electronic devices) for media processing. In some examples, an electronic device includes processing circuitry to perform a process of a smart client that is a client interface of the electronic device. A method for media processing includes transmitting, by the client interface of the electronic device and to a server device in a network (e.g., immersive media streaming network), capability and availability information of the electronic device for playing back a scene-based immersive media. Further, the method includes receiving, by the client interface, a media stream carrying adapted media content for the scene-based immersive media. The adapted media content is generated from the scene-based immersive media by the server device based on the capability and availability information. The method then includes playing back the scene-based immersive media according to the adapted media content.

In some examples, the method includes determining, by the client interface, that a first media asset associated with a first scene is received for a first time and is to be reused in one or more scenes according to the adapted media content, and storing the first media asset in a cache device that is accessible by the electronic device.

In some examples, the method includes extracting, by the client interface, a first list of unique assets in the first scene from the media stream, the first list of unique assets identifying the first media asset as a unique asset in the first scene and to be used in one or more other scenes.

In some examples, the method includes transmitting, by the client interface, a signal indicative of an availability of the first media asset at the electronic device to the server device. The signal causes the server device to use a proxy to substitute for the first media asset in the adapted media content.

In some examples, the method includes determining, by the client interface, that the first media asset is previously stored in the cache device according to the proxy in the adapted media content, and accessing the cache device to retrieve the first media asset.

In some examples, the method includes receiving a query signal for the first media asset from the server device, and transmitting, in response to the query signal, the signal indicative of the availability of the first media asset at the electronic device.

In some examples, the method includes receiving, by the client interface, a request to acquire device attribute and resource status from the server device, querying, one or more internal components of the electronic device and/or one or more external components associated with the electronic device for attributes of the electronic device and resource availability for processing the scene-based immersive media, and transmitting the attributes of the electronic device and the resource availability to the server device.

In some examples, the method includes receiving a request of the scene-based immersive media from a user interface, and forwarding, by the client interface, the request of the scene-based immersive media to the server device.

In some examples, the method includes generating, under a control of the client interface, a reconstructed scene-based immersive media based on a decoding of the media stream and a media reconstruction, and providing, via an application programing interface (API) of a game engine of the electronic device, the reconstructed scene-based immersive media to the game engine for playing back.

In some examples, the method includes depacketizing, by the client interface, the media stream to generate depacketized media data, providing, via an application programing interface (API) of a game engine of the electronic device, the depacketized media data to the game engine, and generating, by the game engine, a reconstructed scene-based immersive media for playing back based on the depacketized media data.

Aspects of the disclosure also provide a non-transitory computer-readable medium storing instructions which when executed by a computer cause the computer to perform the method for media processing.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
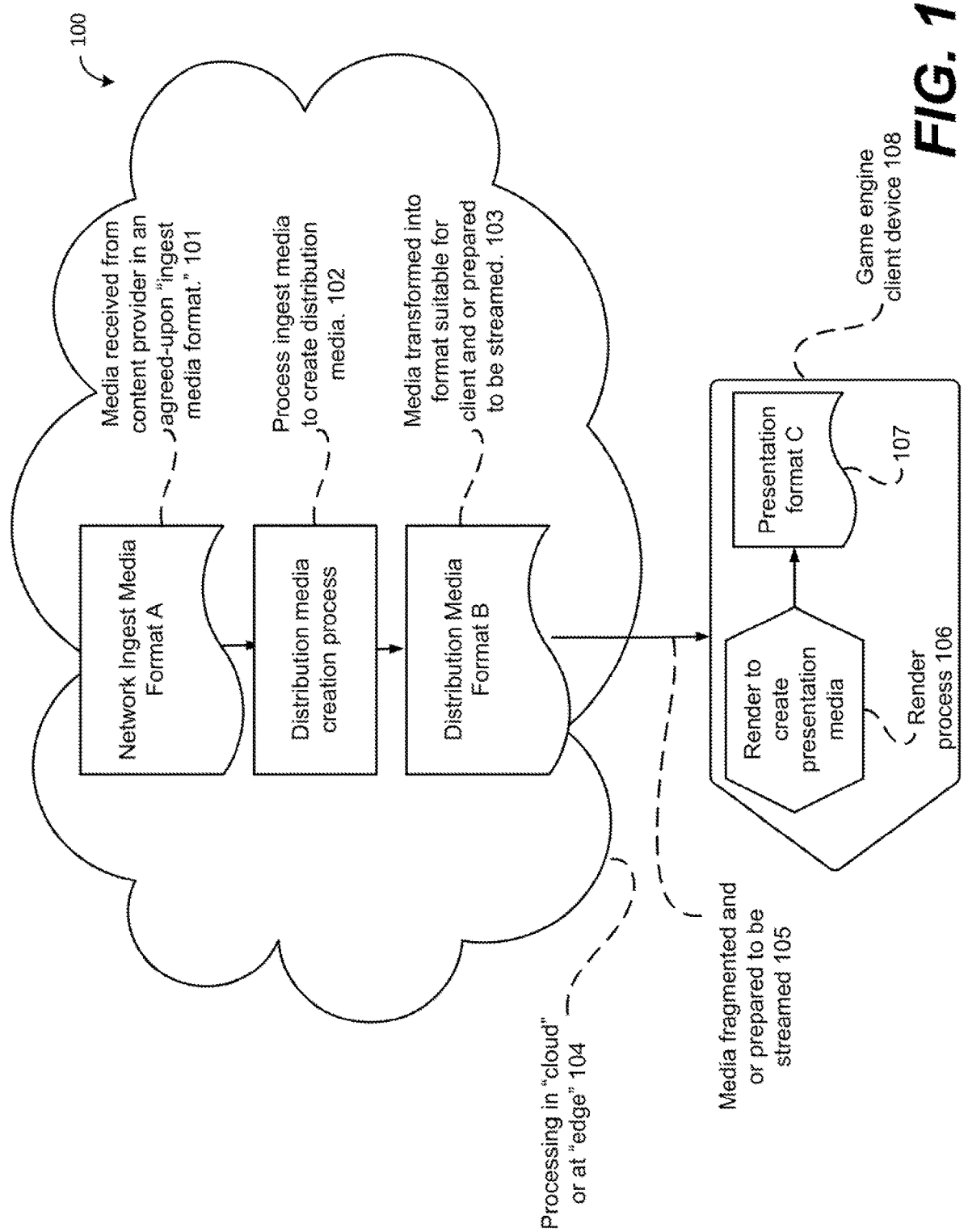
FIG. 1 shows a media flow process in some examples.

Aspects of the disclosure provide architectures, structures, components, techniques, systems and/or networks to distribute media, including video, audio, geometric (3D) objects, haptics, associated metadata, or other content for a client device. In some examples, architectures, structures, components, techniques, systems and/or networks are configured for distribution of media content to heterogenous immersive and interactive client devices, e.g., game engines.

As previously described, immersive media generally refers to media that stimulates any or all human sensory systems (visual, auditory, somatosensory, olfactory, and possibly gustatory) to create or enhance the perception of the user being physically present in the experience of the media, i.e., beyond what is distributed over existing commercial networks for timed two-dimensional (2D) video and corresponding audio which is known as "legacy media". In some examples, immersive media refers to media that attempt to create, or imitate the physical world through digital simulation of kinetics and laws of physics, thereby stimulating any or all human sensory systems so as to create the perception by the user of being physically present inside a scene that depicts a real or virtual world. Both immersive media and legacy media can be characterized as either timed or untimed.

Timed media refers to media that is structured and presented according to time. Examples include movie features, news reports, episodic content, all of which are organized according to periods of time. Legacy video and audio are generally considered to be timed media.

Untimed media is media that is not structured by time; but rather structured by logical, spatial, and/or temporal relationships. An example includes a video game where the user has control over the experience created by the gaming device. Another example of untimed media is a still image photograph taken by a camera. Untimed media may incorporate timed media, for example, in a continuously looped audio or video segment of a scene for a video game. Conversely, timed media may incorporate untimed media, for example a video with a fixed still image as background.

Immersive media-capable devices may refer to devices equipped with sufficient resources and capabilities to access, interpret, and present immersive media. Such media and devices are heterogeneous in terms of the quantity and formats of the media, and numbers and types of network resources required to distribute such media at scale, i.e., to achieve distribution equivalent to that of legacy video and audio media over networks. Likewise, media are heterogenous in terms of the amount and types of network resources required to distribute such media at scale. "At scale" may refer to the distribution of media by service providers that achieve distribution equivalent to that of legacy video and audio media over networks, e.g., Netflix, Hulu, Comcast subscriptions, and Spectrum subscriptions.

Generally, legacy devices such as laptop displays, televisions, and mobile handset displays are homogenous in their capabilities since all of these devices are comprised of rectangular display screens, and consume 2D rectangular video or still images as their primary media formats. Likewise, the number of audio formats supported in legacy devices is limited to a relatively small set.

The term "frame-based" media refers to the characteristic that the visual media are comprised of one or more consecutive rectangular frames of imagery. In contrast, "scene-based" media (e.g., scene based immersive media) refers to visual media that are organized by "scenes" in which each scene refers to individual assets that collectively describe the visual scene in some examples.

A comparative example between frame-based and scene-based visual media can be described using visual media illustrating a forest. In the frame-based representation, the forest is captured using camera devices, such as mobile phones with cameras. A user can enable a camera device to focus on the forest and the frame-based media that is captured by the camera device is the same as what the user sees through the camera viewport provided on the camera device, including any movement of the camera device initiated by the user. The resulting frame-based representation of the forest is the series of 2D images that are recorded by the camera device usually at a standard rate of 30 frames-per-second or 60 frames-per-second. Each image is a collection of pixels where the information stored in each pixel is congruent, one pixel to the next.

In contrast, a scene-based representation of a forest is comprised of individual assets that describe each of the objects in the forest. For example, the scene-based representation can include individual objects called "trees" where each tree is comprised of a collection of smaller assets called "trunks," "branches," and "leaves." Each tree trunk can be further described individually by a mesh (tree trunk mesh) that describes a full 3D geometry of the tree trunk and a texture that is applied to the tree trunk mesh to capture the color and radiance properties of the tree trunk. Furthermore, the tree trunk may be accompanied by additional information that describes the surface of the tree trunk in terms of its smoothness or roughness or ability to reflect light. The individual assets that comprise the scene vary in terms of the type and quantities of information that is stored in each asset.

Yet another difference between scene-based and frame-based media is that in frame-based media, the view that is created for the scene is identical to the view that the user captured via the camera, i.e., at the time that the media was created. When the frame-based media is presented by a client, the view of the media that is presented is the same as the view that is captured in the media, e.g., by the camera that was used to record the video. With scene-based media, however, there may be multiple ways for the user to view the scene.

Client devices that support scene-based media may be equipped with a renderer and or resources (e.g., GPUs, CPUs, local media cache storage) whose capabilities and supported functions collectively comprise an upper bound or upper limit to characterize the total capabilities of the client device to ingest a variety of scene-based media formats. For example, a mobile handset client device may be limited in the complexity of the geometric assets, e.g., the number of polygons that describe the geometric assets, that the mobile handset client device can render, especially for support of real-time applications. Such a limitation may be established based on the fact that a mobile client is powered by batteries, and hence the amount of computation resources that are available to perform real-time rendering are likewise limited. In such a scenario, it may be desirable for the client device to inform the network that the client device prefers to have access to geometric assets with a polygon count no larger than a client-specified upper limit. Furthermore, the information conveyed from the client to the network may be best communicated using a well-defined protocol that leverages a lexicon of well-defined attributes.

Likewise, a media distribution network may have compute resources that facilitate the distribution of immersive media in a variety of formats to a variety of clients with variety of capabilities. In such a network, it may be desirable for the network to be informed of the client-specific capabilities according to a well-defined profile protocol, e.g., a lexicon of attributes that is communicated via a well-defined protocol. Such a lexicon of attributes may include information to describe the media or the minimum compute resources needed to render the media in real-time, so that the network can better establish priorities for how to serve media to its heterogeneous clients. Furthermore a centralized data store in which the client-provided profile information is collected across the domain of clients is helpful to provide a summary of which types of assets, and in which format, are in high demand. Provisioned with the information about which types of assets are in higher vs. lower demand allows an optimized network to prioritize tasks that respond to the requests for assets that are in higher demand.

In some examples, the distribution of media over networks can employ media delivery systems and architectures that reformat the media from an input or network "ingest" media format to a distribution media format. In an example, the distribution media format is not only suitable to be ingested by the target client device and its applications, but is also conducive to being "streamed" over the network. In some examples, there may be two processes that are performed upon the ingested media by a network: 1) converting the media from a format A into a format B that is suitable to be ingested by the target client device, i.e., based upon the client device's capabilities to ingest certain media formats, and 2) preparing the media to be streamed.

In some examples, "streaming" of media broadly refers to the fragmenting and/or packetizing of the media so that the processed media can be delivered over the network in consecutive smaller-sized "chunks" logically organized and sequenced according to either or both the media's temporal or spatial structure. In some examples, "transforming," which may sometimes be referred to as "transcoding," of media from a format A to a format B may be a process that is performed, usually by the network or by a service provider, prior to distributing the media to a target client device. Such transcoding may be comprised of converting the media from a format A to a format B based upon prior knowledge that format B is somehow a preferred format, or the only format, that can be ingested by the target client device, or is better suited for distribution over a constrained resource such as a commercial network. One example of the transformation of media is the conversion of the media from a scene-based representation to a frame-based representation. In some examples, both steps of transforming the media and preparing the media to be streamed are necessary before the media can be received and processed by the target client device from the network. Such prior knowledge about client-preferred formats may be acquired via the use of a well-defined profile protocol utilizing an agreed-upon lexicon of attributes that summarizes the characteristics of scene-based media that are preferred across a variety of client devices.

In some examples, the above one or two-step processes acted upon the ingested media by the network, i.e., prior to distributing the media to the target client device, results in a media format referred to as a "distribution media format," or simply, the "distribution format." In general, these steps can be performed only once, if performed at all for a given media data object, if the network has access to information to indicate that the target client device will need the transformed and or streamed media object for multiple occasions that otherwise would trigger the transformation and streaming of such media multiple times. That is, the processing and transfer of data for transformation and streaming of media is generally regarded as a source of latency with the requirement for expending potentially significant amount of network and or compute resources. Hence, a network design that does not have access to information to indicate when a client device potentially already has a particular media data object stored in its cache or stored locally with respect to the client device, will perform suboptimally to a network that does have access to such information.

In some examples, for legacy presentation devices, the distribution format may be equivalent or sufficiently equivalent to the "presentation format" ultimately used by the client device (e.g., client presentation device) to create the presentation. For example, a presentation media format is a media format whose properties (resolution, framerate, bit-depth, colour gamut, etc, . . . ) are closely tuned to the capabilities of the client presentation device. Some examples of distribution vs. presentation formats include: a high-definition (HD) video signal (1920 pixel columns× 1080 pixel rows) distributed by a network to an ultra-high-definition (UHD) client device with resolution (3840 pixel columns×2160 pixel rows). For example, an UHD client device can apply a process called "super-resolution" to the HD distribution format to increase the resolution of the video signal from HD to UHD. Thus, the final signal format that is presented by the UHD client device is the "presentation format" which, in this example, is a UHD signal, whereas the HD signal comprises the distribution format. In this example, the HD signal distribution format is very similar to the UHD signal presentation format because both signals are in a rectilinear video format, and the process to convert the HD format to a UHD format is a relatively straightforward and easy process to perform on most legacy client devices.

In some examples, the preferred presentation format for the target client device may be significantly different from the ingest format received by the network. Nevertheless, the target client device may have access to sufficient compute, storage, and bandwidth resources to transform the media from the ingest format into the necessary presentation format suitable for presentation by the target client device. In this scenario, the network may bypass the step of reformatting the ingested media, e.g., "transcoding" the media, from a format A to a format B simply because the client has access to sufficient resources to perform all media transforms without the network having to do so. However, the network may still perform the step of fragmenting and packaging the ingest media so that the media may be streamed to the target client device.

In some examples, the ingested media received by the network is significantly different from the target client device's preferred presentation format, and the target client device does not have access to sufficient compute, storage, and or bandwidth resources to convert the media to the preferred presentation format. In such a scenario, the network may assist the target client device by performing some or all of the transformation from the ingest format into a format that is either equivalent or nearly equivalent to the target client device's preferred presentation format on behalf of the target client device. In some architecture designs, such assistance provided by the network on behalf of the target client device is referred to as "split rendering."

FIG. 1 shows a media flow process 100 (also referred to as process 100) in some examples. The media flow process 100 includes first steps that can be executed by in a network cloud (or an edge device) 104, and second steps that can be executed by a client device 108. In some examples, a media in an ingest media format A is received by a network from a content provider at a step 101. A step 102 that is a network process step can prepare the media for distribution to the client device 108 by formatting the media into a format B and or by preparing the media to be streamed to the client device 108. In a step 103, the media is streamed from the network cloud 104 to the client device 108 via a network connection 105. The client 108 receives the distribution media and can prepare the media for presentation via a render process as shown by 106. The output of render process 106 is the presentation media in yet another potentially different format C as shown by 107.

Figure 2:
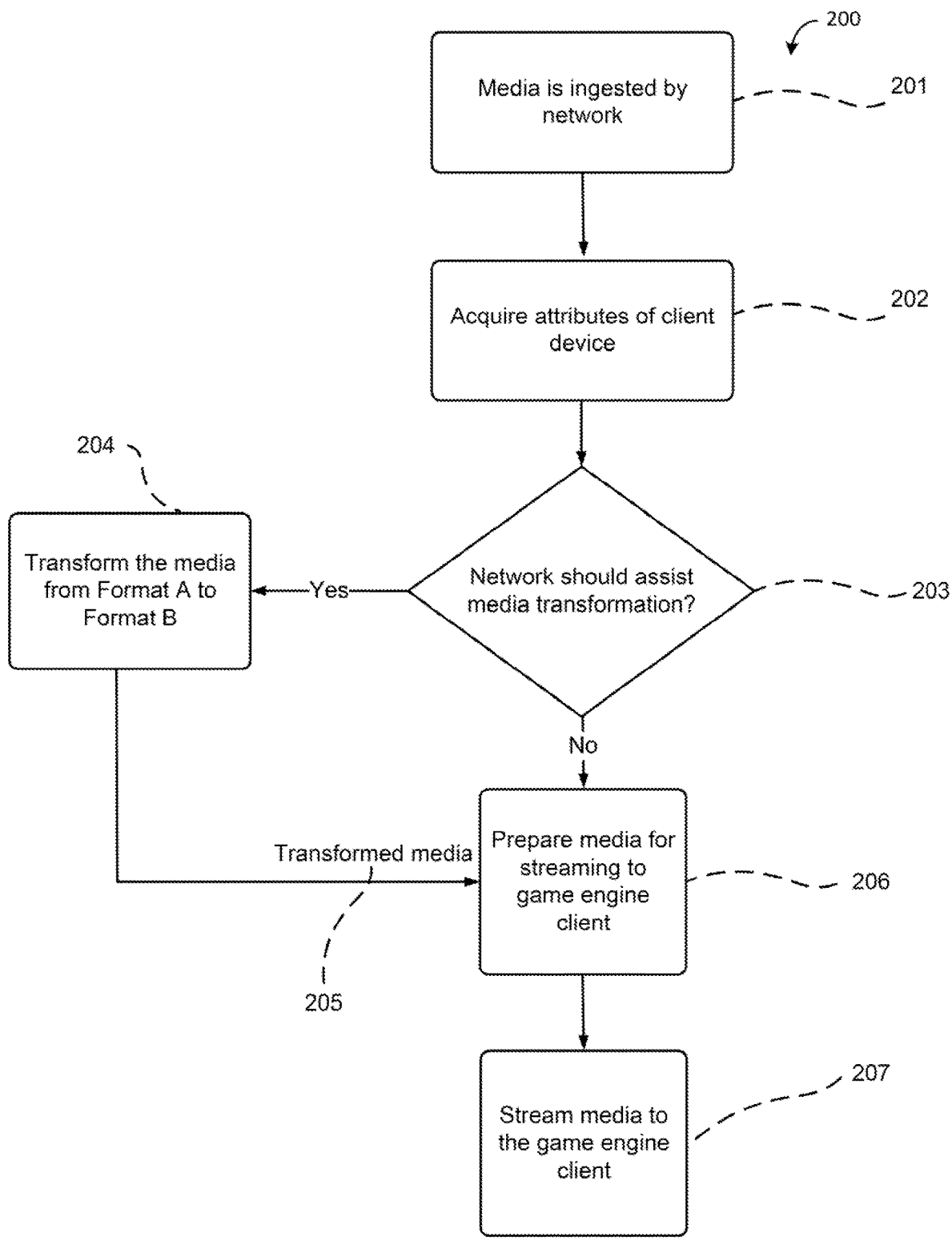
FIG. 2 shows a media transform decision making process in some examples.

FIG. 2 shows a media transform decision making process 200 (also referred to as process 200) that illustrates a network logic flow for processing ingested media within a network (also referred to as network cloud), for example by one or more devices in the network. At 201, a media is ingested by a network cloud from a content provider. The attributes for a target client device, if not already known, are acquired at 202. A decision making step 203 determines if the network should assist with the transformation of the media, if needed. The ingested media is transformed by a process step 204 to convert the media from a Format A into a Format B producing transformed media 205 when the decision making step 203 determines that the network should assist with the transformation. At 206, the media, either transformed or in its original form, is prepared to be streamed. At 207, the prepared media is suitably streamed to the target client device, such as a game engine client device.

An important aspect to the logic in FIG. 2 is the decision making process 203 that may be performed by an automated process. That decision making step can determine whether the media can be streamed in its original ingested format A, or if the media needs to be transformed into a different format B to facilitate the presentation of the media by the target client device.

In some examples, the decision making process step 203 may require access to information that describes aspects or features of the ingest media, in such a way so as to aid the decision making process step 203 to make an optimal choice, i.e., to determine if a transformation of the ingest media is needed prior to streaming the media to the target client device, or if the media can be streamed in the original ingest format A directly to the target client device.

According to an aspect of the disclosure, streaming of scene-based immersive media can be different from streaming frame-based media. For example, streaming of frame-based media may be equivalent to streaming of frames of video, where each frame captures a full picture of the entire scene or a complete picture of the entire object to be presented by a client device. The sequence of frames when reconstructed by the client device from their compressed forms, and presented to the viewer, creates a video sequence that comprises the entire immersive presentation or a portion of the presentation. For frame-based media streaming, the order in which the frames are streamed from the network to the client device may be consistent with a predefined specification, such as ITU-T Recommendation H.264 Advanced Video Coding for Generic Audio Visual Services.

However, scene-based streaming of media is unlike frame-based streaming because the scene may be comprised of individual assets that may be themselves independent of each other. A given scene-based asset may be used multiple times within a particular scene or across a series of scenes. The amount of time that a client device, or any given renderer, needs to create the correct presentation of the particular asset may depend on a number of factors including, but not limited to: the size of the asset, the availability of compute resources to perform the rendering, and other attributes that describe the overall complexity of the asset. Client devices that support scene-based streaming may require that some or all of the rendering for each asset within a scene is completed before any of the presentation for the scene can begin. Hence the order in which assets are streamed from a network to a client device may impact the overall performance.

According to an aspect of the disclosure, given each of the above scenarios where transformations of media from a format A to another format may be done either entirely by the network, entirely by the client device, or jointly between both the network and the client device, e.g., for split rendering, a lexicon of attributes that describe a media format may be needed so that both the client device and network have complete information to characterize the transformation work. Furthermore, a lexicon that provides attributes of a client device's capabilities, e.g., in terms of available compute resources, available storage resources, and access to bandwidth may likewise be needed. Even further, a mechanism to characterize the level of compute, storage, or bandwidth complexity of an ingest format may be needed so that a network and a client device may jointly, or singly, determine if or when the network may employ a split-rendering step for distributing the media to the client device. Moreover, if the transformation and or streaming of a particular media object that is or will be needed by the client device to complete its presentation of the media can be avoided, then the network may skip the steps of transform and streaming assuming that the client device has access or availability to the media object that it may need in order to complete the client device's presentation of the media. With respect to the order in which scene-based assets are streamed from the network to the client device to facilitate the client device's ability to perform at its full potential, it may be desirable for a network to be equipped with sufficient information so that the network can determine such an order to improve the performance of the client device. For example, such a network that has sufficient information to avoid repetitive transformation and or streaming steps for assets that are used more than once, in a particular presentation, may perform more optimally than a network that is not so designed. Likewise, a network that can "intelligently" sequence the delivery of assets to the client may facilitate the client device's ability to perform at its full potential, i.e., to create an experience that may be more enjoyable to the end user. Further, the interface between the client device and a network (e.g., server device in the network) may be implemented using one or more channels of communication upon which essential information concerning the characteristics of the client device's operating state, the availability of resources at the client device, or local to the client device, the types of media to be streamed, and the frequency of the assets to be used or across a multitude of scenes is conveyed. Hence, a network architecture that implements streaming of scene-based media to heterogenous clients may need access to a client interface that can provide and update the network server processes with information related to the processing of each scene, including the current conditions related to the client device's ability to access compute and storage resources. Such a client interface may also interact closely with other processes executing on the client device, in particular with game engines that may serve essential roles on behalf of client device's ability to deliver an immersive experience to the end user. Examples of essential roles that game engines may serve include providing the application program interfaces (API's) to enable the delivery of interactive experiences. Another role that may be provided by game engines on behalf of the client device is the rendering of the exact visual signal needed by the client device to deliver a visual experience congruent with the capabilities of the client device.

The definitions of some terms used in the present disclosure are provided in the following paragraphs.

Scene graph: general data structure commonly used by vector-based graphics editing applications and modern computer games, which arranges the logical and often (but not necessarily) spatial representation of a graphical scene; a collection of nodes and vertices in a graph structure.

Scene: in the context of computer graphics, a scene is a collection of objects (e.g., 3D assets), object attributes, and other metadata that comprise the visual, acoustic, and physics-based characteristics describing a particular setting that is bounded either by space or time with respect to the interactions of the objects within that setting.

Node: fundamental element of the scene graph comprised of information related to the logical or spatial or temporal representation of visual, audio, haptic, olfactory, gustatory, or related processing information; each node shall have at most one output edge, zero or more input edges, and at least one edge (either input or output) connected to it.

Base Layer: a nominal representation of an asset, usually formulated to minimize the compute resources or time needed to render the asset, or the time to transmit the asset over a network.

Enhancement Layer: a set of information that when applied to the base layer representation of an asset, augments the base layer to include features or capabilities that are not supported in the base layer.

Attribute: metadata associated with a node used to describe a particular characteristic or feature of that node either in a canonical or more complex form (e.g. in terms of another node).

Container: a serialized format to store and exchange information to represent all natural, all synthetic, or a mixture of synthetic and natural scenes including a scene graph and all of the media resources that are required for rendering of the scene.

Serialization: the process of translating data structures or object state into a format that can be stored (for example, in a file or memory buffer) or transmitted (for example, across a network connection link) and reconstructed later (possibly in a different computer environment). When the resulting series of bits is reread according to the serialization format, it can be used to create a semantically identical clone of the original object.

Renderer: a (typically software-based) application or process, based on a selective mixture of disciplines related to: acoustic physics, light physics, visual perception, audio perception, mathematics, and software development, that, given an input scene graph and asset container, emits a typically visual and/or audio signal suitable for presentation on a targeted device or conforming to the desired properties as specified by attributes of a render target node in the scene graph. For visual-based media assets, a renderer may emit a visual signal suitable for a targeted display, or for storage as an intermediate asset (e.g. repackaged into another container i.e. used in a series of rendering processes in a graphics pipeline); for audio-based media assets, a renderer may emit an audio signal for presentation in a multi-channel loudspeaker and/or binauralized headphones, or for repackaging into another (output) container. Popular examples of renderers include the real-time rendering features of the game engines Unity and Unreal Engine.

Evaluate: produces a result (e.g., similar to evaluation of a Document Object Model for a webpage) that causes the output to move from an abstract to a concrete result.

Scripting language: An interpreted programming language that can be executed by a renderer at runtime to process dynamic input and variable state changes made to the scene graph nodes, which affect rendering and evaluation of spatial and temporal object topology (including physical forces, constraints, inverse kinematics, deformation, collisions), and energy propagation and transport (light, sound).

Shader: a type of computer program that was originally used for shading (the production of appropriate levels of light, darkness, and color within an image) but which now performs a variety of specialized functions in various fields of computer graphics special effects or does video post-processing unrelated to shading, or even functions unrelated to graphics at all.

Path Tracing: a computer graphics method of rendering three-dimensional scenes such that the illumination of the scene is faithful to reality.

Timed media: Media that is ordered by time; e.g., with a start and end time according to a particular clock.

Untimed media: Media that is organized by spatial, logical, or temporal relationships; e.g., as in an interactive experience that is realized according to the actions taken by the user(s).

Neural Network Model: a collection of parameters and tensors (e.g., matrices) that define weights (i.e., numerical values) used in well defined mathematical operations applied to the visual signal to arrive at an improved visual output which may include the interpolation of new views for the visual signal that were not explicitly provided by the original signal.

Frame-based media: 2D video with or without associated audio.

Scene-based media: audio, visual, haptic, and other primary types of media and media-related information organized logically and spatially by a use of a scene graph.

In the last decade, a number of immersive media-capable devices have been introduced into the consumer market, including head-mounted displays, augmented-reality glasses, hand-held controllers, multi-view displays, haptic gloves, and game consoles. Likewise, holographic displays and other forms of volumetric displays are poised to emerge into the consumer market within the next three to five years. Despite the immediate or imminent availability of these devices, a coherent end-to-end ecosystem for the distribution of immersive media over commercial networks has failed to materialize for several reasons.

One of the impediments to realizing a coherent end-to-end ecosystem for distribution of immersive media over commercial networks is that the client devices that serve as end-points for such a distribution network for immersive displays are all very diverse. Some of them support certain immersive media formats while others do not. Some of them are capable of creating an immersive experience from legacy raster-based formats, while others cannot. Unlike a network designed only for distribution of legacy media, a network that must support a diversity of display clients needs a significant amount of information pertaining to the specifics of each of the client's capabilities, and the formats of the media to be distributed, before such network can employ an adaptation process to translate the media into a format suitable for each target display and corresponding application. Such a network, at a minimum, would need access to information describing the characteristics of each target display and the complexity of the ingested media in order for the network to ascertain how to meaningfully adapt an input media source to a format suitable for the target display and application. Similarly, a network that is optimized for efficiency may want to maintain a database of the types of media, and their corresponding attributes, that are supported by the client devices attached to such a network.

Likewise, an ideal network supporting heterogeneous clients should leverage the fact that some of the assets that are adapted from an input media format to a specific target format may be reused across a set of similar display targets. That is, some assets, once converted to a format suitable for a target display may be reused across a number of such displays that have similar adaptation requirements. Therefore, such an ideal network would employ a caching mechanism to store adapted assets into an area that is relatively immutable, i.e., similar to the use of Content Distribution Networks (CDNs) in use for legacy networks.

Moreover, immersive media may be organized into "scenes," e.g., "scene-based media," that are described by scene graphs, which are also known as scene descriptions. The scope of a scene graph is to describe visual, audio, and other forms of immersive assets that comprise a particular setting that is part of a presentation, for example, the actors and events taking place in a particular location in a building that is part of a presentation, e.g., movie. A list of all scenes that comprise a single presentation may be formulated into a manifest of scenes.

An additional benefit of such an approach is that for content that is prepared in advance of having to distribute such content, a "bill of materials" can be created that identifies all of the assets that will be used for the entire presentation, and how often each asset is used across the various scenes within the presentation. An ideal network should have knowledge of the existence of cached resources that can be used to satisfy the asset requirements for a particular presentation. Similarly a client that is presenting a series of scenes may wish to have knowledge about the frequency of any given asset to be used across multiple scenes. For example, if a media asset (also known as an "object") is referenced multiple times across multiple scenes that are or will be processed by the client, then the client should avoid discarding the asset from its caching resources until the last scene that requires that particular asset has been presented by the client.

Finally, many emerging advanced imaging displays, including but not limited to: Oculus Rift, Samsung Gear VR, Magic Leap goggles, all Looking Glass Factory displays, SolidLight by Light Field Lab, Avalon Holographic displays, and Dimenco displays, utilize game engines as mechanisms by which their respective displays may ingest content to be rendered and presented on the display. Currently, the most popular game engines employed across this aforementioned set of displays includes Unreal Engine by Epic Games, and Unity by Unity Technologies. That is, advanced imaging displays are currently designed and shipped with either one or both of these game engines employed as a mechanism by which the display may acquire media to be rendered and presented by such advanced imaging displays. Both Unreal Engine and Unity are optimized to ingest scene-based as opposed to frame-based media. The existing media distribution ecosystem, however, is capable of streaming only frame-based media. A large "gap" exists in the current media distribution ecosystem, including standards (de jure or defacto) and best practices to enable the distribution of scene-based content to the emerging advanced imaging displays so that media can be delivered "at scale," e.g., at the same scale by which frame-based media is distributed.

The disclosed subject matter addresses the need for a mechanism or process that responds to the network server process(es) and participates in the combined network and immersive client architecture described herein, on behalf of the client device on which a game engine is utilized to ingest scene-based media. Such a "smart client" mechanism is especially relevant in a network designed to stream scene-based media to immersive heterogenous and interactive client devices such that the distribution of media is performed efficiently, and within the constraints of the capabilities of the various components that comprise the network as a whole. A "smart client" is associated with a particular client device and responds to the network's requests for information pertaining to the current state of its associated client device, including the availability of resources on the client device for rendering and creating presentations of scene-based media. The "smart client" also serves as an "intermediary" between the client device on which a game engine is employed, and the network itself.

Note that the remainder of the disclosed subject matter assumes, without loss of generality, that a smart client capable of responding on behalf of a particular client device is also capable of responding on behalf of a client device on which one or more other applications (i.e., not the game engine applications) are active. That is, the problem of responding on behalf of a client device is equivalent to the problem of responding on behalf of a client on which one or more other applications are active.

Further note that the term "media object" and "media asset" may be used interchangeably, both referring to a specific instance of a specific format of media. The term client device or client (without any qualification) refers to the device and its constituent components on which the presentation of the media is ultimately performed. The term "game engine" refers to Unity or Unreal Engine, or any game engine that serves a role in a distribution network architecture. The term "smart client" refers to the subject matter of this document.

Referring back to FIG. 1, the media flow process 100 demonstrates the flow of media through the network 104 or distribution to the client device 108 on which a game engine is employed. In FIG. 1, processing of an ingest media format A is performed by processing in a cloud or edge devices 104. At 101, the media is obtained from a content provider (not shown). A process step 102 performs any necessary transformations or conditioning of the ingested media to create a potentially alternative representation of the media as a distribution format B. Media formats A and B may or may not be representations following the same syntax of a particular media format specification, however the format B is likely to be conditioned into a scheme that facilitates the distribution of the media over a network protocol such as TCP or UDP. Such "streamable" media is depicted to be streamed via network connection 105 as media that is streamed to the client device 108. The client device 108 may have access to some rendering capabilities depicted as 106. Such render capabilities 106 may be rudimentary or likewise, sophisticated, depending on the type of the client device 108 and game engine that is operating on the client device. Render process 106 creates presentation media that may or may not be represented according to a third format specification, e.g., Format C. In some examples, in a client device that employs a game engine, render process 106 is typically a function provided by the game engine.

Referring to FIG. 2, the media transform decision making process 200 can be employed to determine if the network needs to transform the media prior to distributing the media to a client device. In FIG. 2, the ingested media 201 represented in format A is provided by a content provider (not depicted) to the network. The process step 202 acquires attributes that describe the processing capabilities of targeted client (not depicted). Decision making process step 203 is employed to determine if the network or the client should perform any format conversions for any of the media assets contained within the ingested media 201, e.g., such as a conversion of a particular media object from a format A to a format B, prior to the media being streamed to the client. If any of the media assets needs to be transformed by the network, then the network employs process step 204 to transform the media object from format A to format B. The transformed media 205 is the output from process step 204. The transformed media is merged into the preparation process 206 to prepare the media to be streamed to the game engine client (not shown). The process step 207 streams the prepared media to the game engine client for example.

Figure 3:
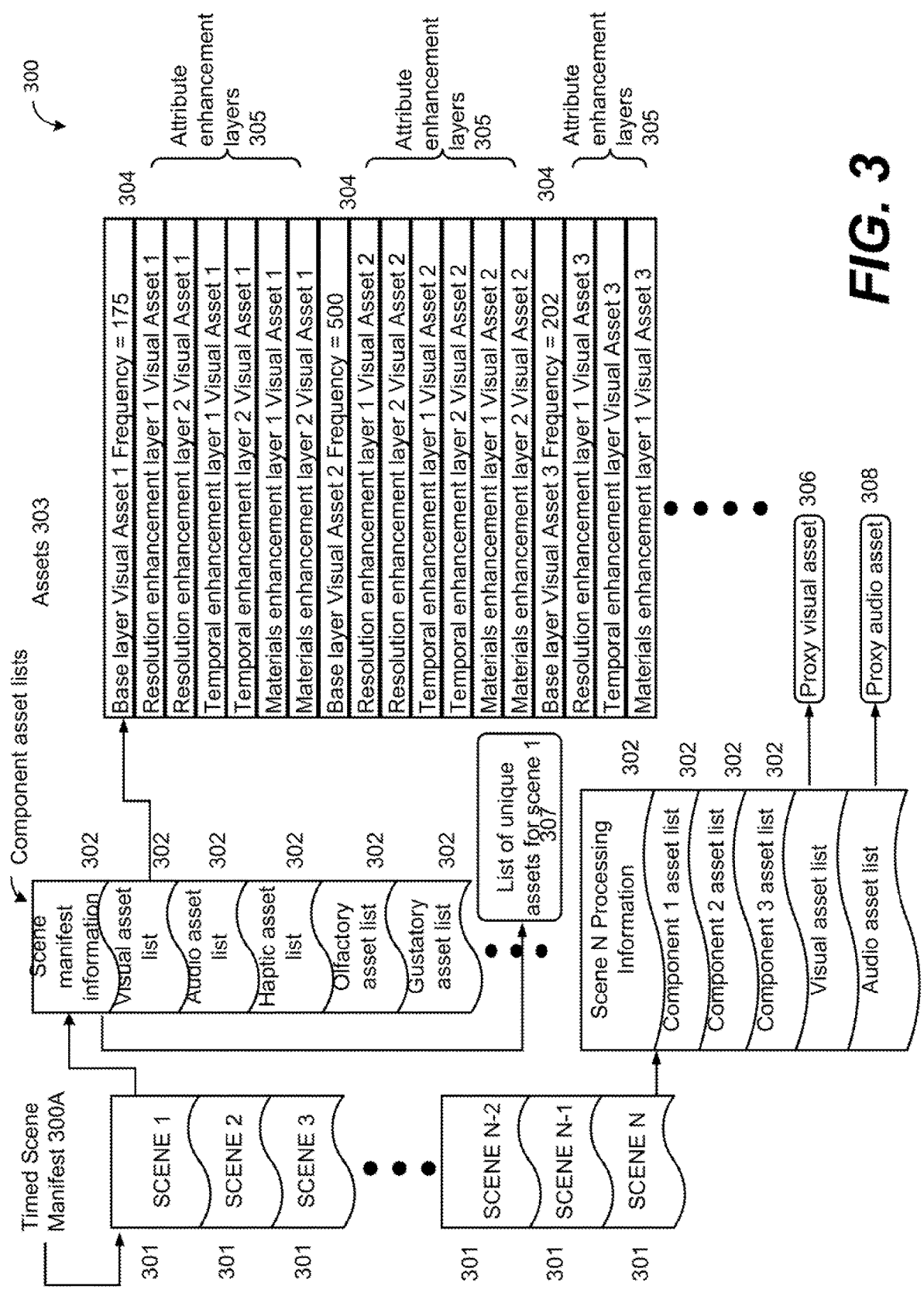
FIG. 3 shows a representation of a format for heterogenous immersive media that is timed in an example.
Figure 4:
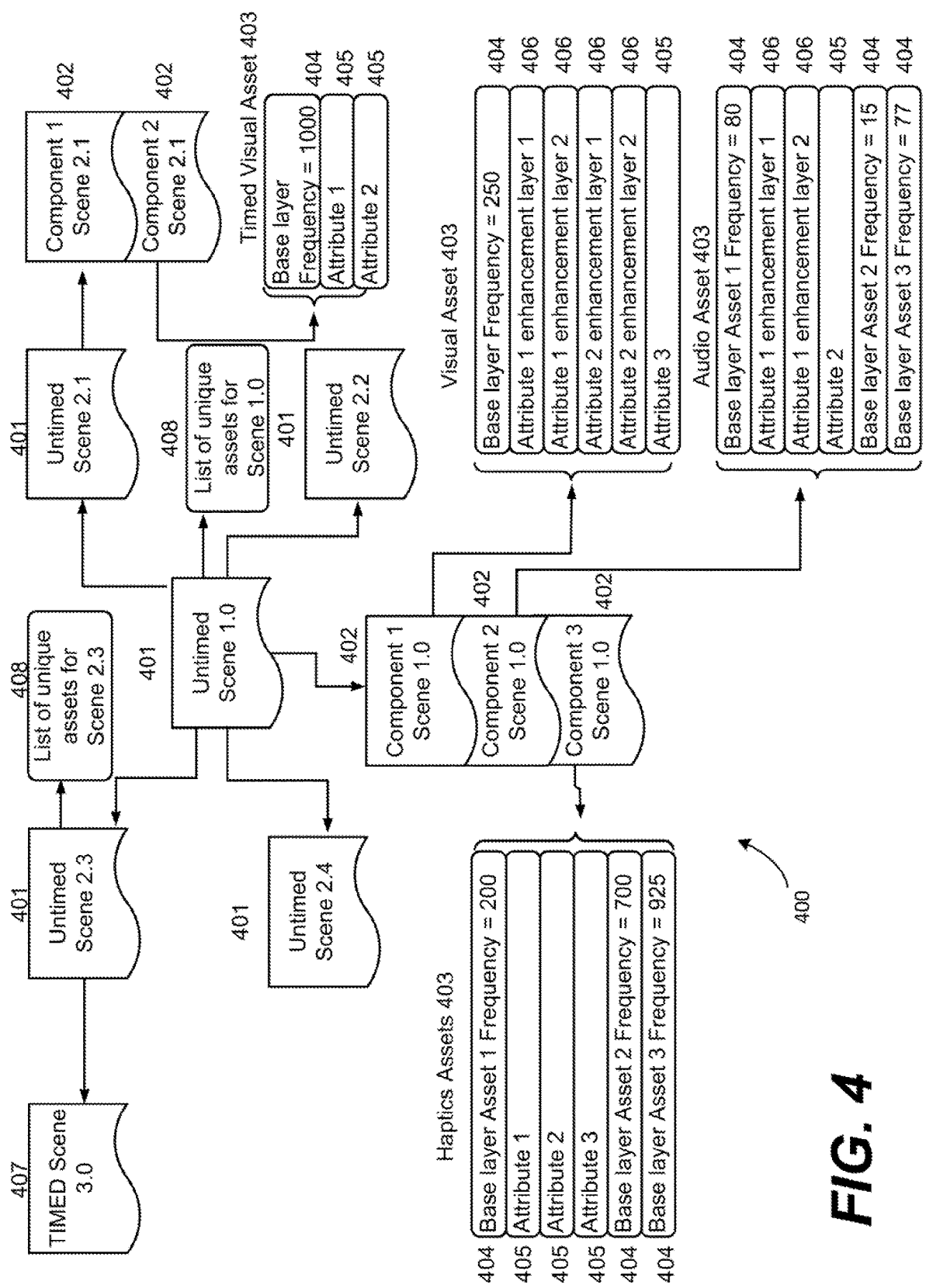
FIG. 4 shows a representation of a streamable format for heterogeneous immersive media that is untimed in an example.

FIG. 3 shows a representation of a streamable format 300 for heterogenous immersive media that is timed in an example; and FIG. 4 shows a representation of a streamable format 400 for heterogeneous immersive media that is untimed in an example. In the case of FIG. 3, FIG. 3 refers to a scene 301 for timed media. In the case of FIG. 4, FIG. 4 refers to a scene 401 for untimed media. For both cases, a scene may be embodied by various scene representations, or scene descriptions.

For example, in some immersive media designs, a scene may be embodied by a scene graph, or as a multi-plane image (MPI), or as a multi-spherical image (MSI). Both the MPI and MSI techniques are examples of technologies that aid in the creation of display-agnostic scene representations for natural content, i.e., images of the real world captured simultaneously from one or more cameras. Scene graph technologies, on the other hand, may be employed to represent both natural and computer-generated imagery in the form of synthetic representations, however, such representations are especially compute-intensive to create for the case when the content is captured as natural scenes by one or more cameras. That is, scene graph representations of naturally-captured content are both time and compute-intensive to create, requiring complex analysis of natural images with techniques of photogrammetry or deep learning or both, in order to create synthetic representations that can subsequently be used to interpolate sufficient and adequate numbers of views to fill a target immersive client display's viewing frustum. As a result, such synthetic representations are presently impractical to consider as candidates for representing natural content, because they cannot practically be created in real-time for consideration of use cases that require real-time distribution. In some examples, the best candidate representations for computer generated imagery is to employ the use of a scene graph with synthetic models, as computer generated imagery is created using 3D modeling processes and tools.

Such a dichotomy in optimal representations of both natural and computer generated content suggests that the optimal ingest format for naturally-captured content is different from the optimal ingest format for computer generated content or for natural content that is not essential for real-time distribution applications. Therefore, the disclosed subject matter targets to be robust enough to support multiple ingest formats for visually immersive media, whether they are created naturally through the use of physical cameras or by a computer.

The following are example technologies that embody scene graphs as a format suitable for representing visual immersive media that is created using computer generated techniques, or naturally captured content for which deep learning or photogrammetry techniques are employed to create the corresponding synthetic representations of a natural scene, i.e., not essential for real-time distribution applications.

1. ORBX® by OTOY

ORBX by OTOY is one of several scene graph technologies that is able to support any type of visual media, timed or untimed, including ray-traceable, legacy (frame-based), volumetric, and other types of synthetic or vector-based visual formats. According to an aspect, ORBX is unique from other scene graphs because ORBX provides native support for freely available and/or open source formats for meshes, point clouds, and textures. ORBX is a scene graph that has been intentionally designed with the goal of facilitating interchange across multiple vendor technologies that operate on scene graphs. Moreover, ORBX provides a rich materials system, support for open shader language, a robust camera system, and support for Lua scripts. ORBX is also the basis of the immersive technologies media format published for license under royalty-free terms by the immersive digital experiences alliance (IDEA). In the context of real time distribution of media, the ability to create and distribute an ORBX representation of a natural scene is a function of the availability of compute resources to perform a complex analysis of the camera-captured data and synthesis of the same data into synthetic representations. To date, the availability of sufficient compute for real-time distribution is not practical, but nevertheless, not impossible.

2. Universal Scene Description by Pixar

Universal scene description (USD) by Pixar is another scene graph that can be used in the visual effects (VFX) and professional content production communities. USD is integrated into Nvidia's Omniverse platform which is a set of tools for developers for 3D model creation and rendering with Nvidia's GPUs. A subset of USD was published by Apple and Pixar as USDZ. USDZ is supported by Apple's ARKit.

3. glTF2.0 by Khronos glTF2.0 is the most recent version of the graphics language transmission format specification written by the Khronos 3D Group. This format supports a simple scene graph format that is generally capable of supporting static (untimed) objects in scenes, including "png" and "jpeg" image formats. glTF2.0 supports simple animations, including support for translate, rotate, and scale, of basic shapes described using the glTF primitives, i.e. for geometric objects. glTF2.0 does not support timed media, and hence does not support video nor audio.

It is noted that the above scene representations of immersive visual media are provided for example only, and do not limit the disclosed subject matter in its ability to specify a process to adapt an input immersive media source into a format that is suitable to the specific characteristics of a client end-point device.

Moreover, any or all of the above example media representations either currently employ or may employ deep learning techniques to train and create a neural network model that enables or facilitates the selection of specific views to fill a particular display's viewing frustum based on the specific dimensions of the frustum. The views that are chosen for the particular display's viewing frustum may be interpolated from existing views that are explicitly provided in the scene representation, e.g., from the MSI or MPI techniques, or they may be directly rendered from render engines based on specific virtual camera locations, filters, or descriptions of virtual cameras for these render engines.

The disclosed subject matter is therefore robust enough to consider that there is a relatively small but well known set of immersive media ingest formats that is sufficiently capable to satisfy requirements both for real-time or "on-demand" (e.g., non-real-time) distribution of media that is either captured naturally (e.g., with one or more cameras) or created using computer generated techniques.

Interpolation of views from an immersive media ingest format by use of either neural network models or network-based render engines is further facilitated as advanced network technologies such as 5G for mobile networks, and fiber optical cable for fixed networks are deployed. That is, these advanced network technologies increase the capacity and capabilities of commercial networks because such advanced network infrastructures can support transport and delivery of increasingly larger amounts of visual information. Network infrastructure management technologies such as multi-access edge computing (MEC), software defined networks (SDN), and network functions virtualization (NFV), enable commercial network service providers to flexibly configure their network infrastructure to adapt to changes in demand for certain network resources, e.g., to respond to dynamic increases or decreases in demand for network throughputs, network speeds, roundtrip latency, and compute resources. Moreover, this inherent ability to adapt to dynamic network requirements likewise facilitates the ability of networks to adapt immersive media ingest formats to suitable distribution formats in order to support a variety of immersive media applications with potentially heterogenous visual media formats for heterogenous client end-points.

Immersive media applications themselves may also have varying requirements for network resources including gaming applications which require significantly lower network latencies to respond to real-time updates in the state of the game, telepresence applications which have symmetric throughput requirements for both the uplink and downlink portions of the network, and passive viewing applications that may have increased demand for downlink resources depending on the type of client end-point display that is consuming the data. In general, any consumer-facing application may be supported by a variety of client end-points with various onboard-client capabilities for storage, compute, and power, and likewise various requirements for particular media representations.

The disclosed subject matter therefore enables a sufficiently equipped network, i.e., a network that employs some or all of the characteristics of a modern network, to simultaneously support a plurality of legacy and immersive media-capable devices according to features that are specified within that:

1. Provide flexibility to leverage media ingest formats that are practical for both real-time and on demand use cases for the distribution of media.
2. Provide flexibility to support both natural and computer generated content for both legacy and immersive-media capable client end-points.
3. Support both timed and untimed media.
4. Provide a process for dynamically adapting a source media ingest format to a suitable distribution format based on the features and capabilities of the client end-point, as well as based on the requirements of the application.
5. Ensure that the distribution format is streamable over IP-based networks.
6. Enable the network to simultaneously serve a plurality of heterogenous client end-points that may include both legacy and immersive media-capable devices.
7. Provide an exemplary media representation framework that facilitates the organization of the distribution media along scene boundaries.

An end-to-end embodiment of the improvements enabled by the disclosed subject matter is achieved according to the processing and components described in the following detailed description.

FIG. 3 and FIG. 4 respectively employ an exemplary encompassing distribution format that can be adapted from an ingest source format to match the capabilities of a specific client end-point. As described above, the media that is shown in FIG. 3 is timed and the media that is shown in FIG. 4 is untimed. The specific encompassing format is robust enough in its structure to accommodate a large variety of media attributes that each may be layered based on the amount of salient information that each layer contributes to the presentation of the media. It is noted that the layering process can be applied in, for example progressive JPEG and scalable video architectures (e.g., specified in ISO/IEC 14496-10 Scalable Advanced Video Coding).

According to an aspect, the media that is streamed according to the encompassing media format is not limited to legacy visual and audio media, but may include any type of media information that is capable of producing a signal that interacts with machines to stimulate the human senses for sight, sound, taste, touch, and smell.

According to another aspect, the media that is streamed according to the encompassing media format can be both timed or untimed media, or a mixture of both.

According to another aspect, the encompassing media format is furthermore streamable by enabling a layered representation for media objects by use of a base layer and enhancement layer architecture. In one example, the separate base layer and enhancement layers are computed by application of multi-resolution or multi-tesselation analysis techniques for media objects in each scene. This is analogous to the progressively rendered image formats specified in ISO/IEC 10918-1 (JPEG), and ISO/IEC 15444-1 (JPEG2000), but not limited to raster-based visual formats. In an example, a progressive representation for a geometric object could be a multi-resolution representation of the object computed using wavelet analysis.

In another example of the layered representation of the media format, the enhancement layers apply different attributes to the base layer, such as refining the material properties of the surface of a visual object that is represented by the base layer. In yet another example, the attributes may refine the texture of the surface of the base layer object, such as changing the surface from a smooth to a porous texture, or from a matted surface to a glossy surface.

In yet another example of the layered representation, the surfaces of one or more visual objects in the scene may be altered from being Lambertian to being ray-traceable.

In yet another example of the layered representation, the network will distribute the base-layer representation to the client so that the client may create a nominal presentation of the scene while the client awaits the transmission of additional enhancement layers to refine the resolution or other characteristics of the base representation.

According to another aspect, the resolution of the attributes or refining information in the enhancement layers is not explicitly coupled with the resolution of the object in the base layer as it is today in existing MPEG video and JPEG image standards.

According to another aspect, the encompassing media format supports any type of information media that can be presented or actuated by a presentation device or machine, thereby enabling the support of heterogenous media formats to heterogenous client end-points. In one embodiment of a network that distributes the media format, the network will first query the client end-point to determine the client's capabilities, and if the client is not capable of meaningfully ingesting the media representation then the network will either remove the layers of attributes that are not supported by the client, or adapt the media from its current format into a format that is suitable for the client end-point. In one example of such adaptation, the network would convert a volumetric visual media asset into a 2D representation of the same visual asset, by use of a Network-Based Media Processing protocol. In another example of such adaptation, the network may employ a neural network process to reformat the media to an appropriate format or optionally synthesize views that are needed by the client end-point.

According to another aspect, the manifest for a complete or partially-complete immersive experience (live streaming event, game, or playback of on-demand asset) is organized by scenes which is the minimal amount of information that rendering and game engines can currently ingest in order to create a presentation. The manifest includes a list of the individual scenes that are to be rendered for the entirety of the immersive experience requested by the client. Associated with each scene are one or more representations of the geometric objects within the scene corresponding to streamable versions of the scene geometry. One embodiment of a scene representation refers to a low resolution version of the geometric objects for the scene. Another embodiment of the same scene refers to an enhancement layer for the low resolution representation of the scene to add additional detail, or increase tessellation, to the geometric objects of the same scene. As described above, each scene may have more than one enhancement layer to increase the detail of the geometric objects of the scene in a progressive manner.

According to another aspect, each layer of the media objects that are referenced within a scene is associated with a token (e.g., URI) that points to the address of where the resource can be accessed within the network. Such resources are analogous to CDN's where the content may be fetched by the client.

According to another aspect, the token for a representation of a geometric object may point to a location within the network or to a location within the client. That is, the client may signal to the network that its resources are available to the network for network-based media processing.

FIG. 3 shows a timed media representation 300 in some examples. The timed media representation 300 describes an example of the encompassing media format for timed media. A timed scene manifest 300A includes a list of scene information 301. A scene information 301 refers to a list of components 302 that separately describe processing information and types of media assets that are in the scene information 301. The components 302 refer to assets 303 that further refer to base layers 304 and attribute enhancement layers 305. In the FIG. 3 example, each of the base layers 304 refer to a numeric frequency metric that indicates the number of times the asset is used across the set of scenes in the presentation. A list of unique assets that have not been previously used in other scenes is provided in 307. Proxy visual asset 306 includes information of reused visual asset, such as a unique identifier of the reused visual asset, and proxy audio asset 308 includes information of reused audio asset, such as a unique identifier of the reused audio asset.

FIG. 4 shows an untimed media representation 400 in some examples. The untimed media representation 400 describes an example of the encompassing media format for untimed media. An untimed scene manifest (not depicted) references a Scene 1.0 for which there is no other scene that can branch to Scene 1.0. The scene information 401 is not associated with a start and end duration according to a clock. The scene information 401 refers to a list of components 402 that separately describe processing information and types of media assets that comprise the scene. The components 402 refer to assets 403 that further refer to base layers 404 and attribute enhancement layers 405 and 406. In the FIG. 4 example, each of the base layers 404 refer to a numeric frequency value that indicates the number of times the asset is used across the set of scenes in the presentation. Furthermore, the Scene Information 401 can refer to other Scenes Information 401 that are for untimed media. The Scene Information 401 can also refer to Scene Information 407 that is for a timed media scene. Lists 408 identify unique assets associated with a particular scene that have not been previously used in higher order (e.g., parent) scenes.

Figure 5:
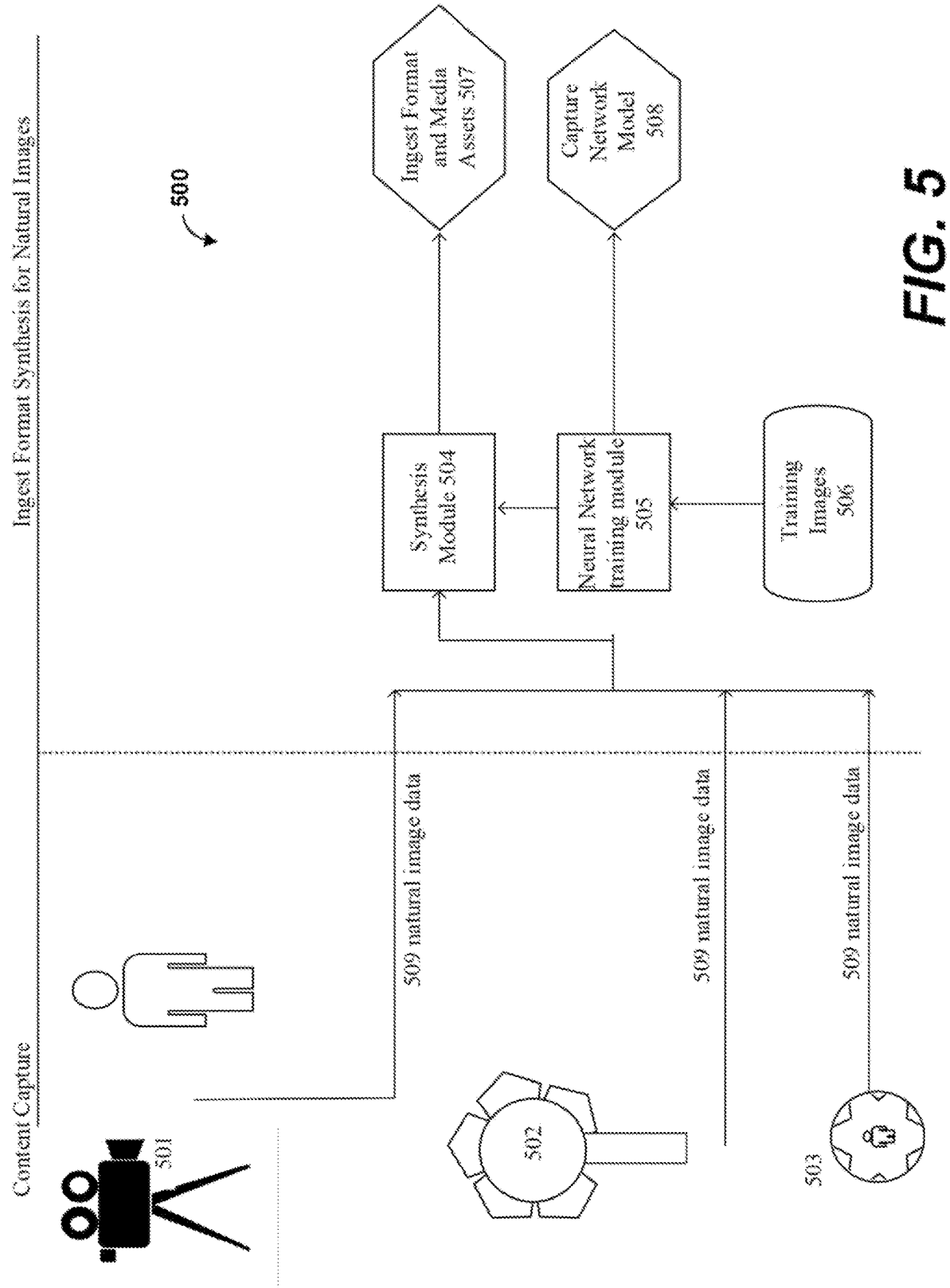
FIG. 5 shows a diagram of process to synthesize media into an ingest format from natural content in some examples.

FIG. 5 shows a diagram of process 500 to synthesize an ingest format from natural content. The process 500 includes a first sub-process for content capture and a second sub-process of ingest format synthesis for natural images.

In the FIG. 5 example, in the first sub-process, camera unit can be used to capture natural image content 509. For example, camera unit 501 can use a single camera lens to capture a scene of a person. Camera unit 502 can capture a scene with five diverging fields of view by mounting five camera lenses around a ring-shaped object. The arrangement in the camera unit 502 is an exemplary arrangement for capturing omnidirectional content for VR applications. Camera unit 503 captures a scene with seven converging fields of view by mounting seven camera lenses on the inner diameter portion of a sphere. The arrangement in the camera unit 503 is an exemplary arrangement for capturing light fields for light field or holographic immersive displays.

In the FIG. 5 example, in the second sub-process, the natural image content 509 is synthesized. For example, the natural image content 509 is provided as input to a synthesis module 504 that may, in an example, employ a neural network training module 505 using a collection of training images 506 to produce a capture neural network model 508. Another process commonly used in lieu of training process is photogrammetry. If the model 508 is created during process 500 depicted in FIG. 5, then the model 508 becomes one of the assets in the ingest format 507 for the natural content. Exemplary embodiments of the ingest format 507 include MPI and MSI.

Figure 6:
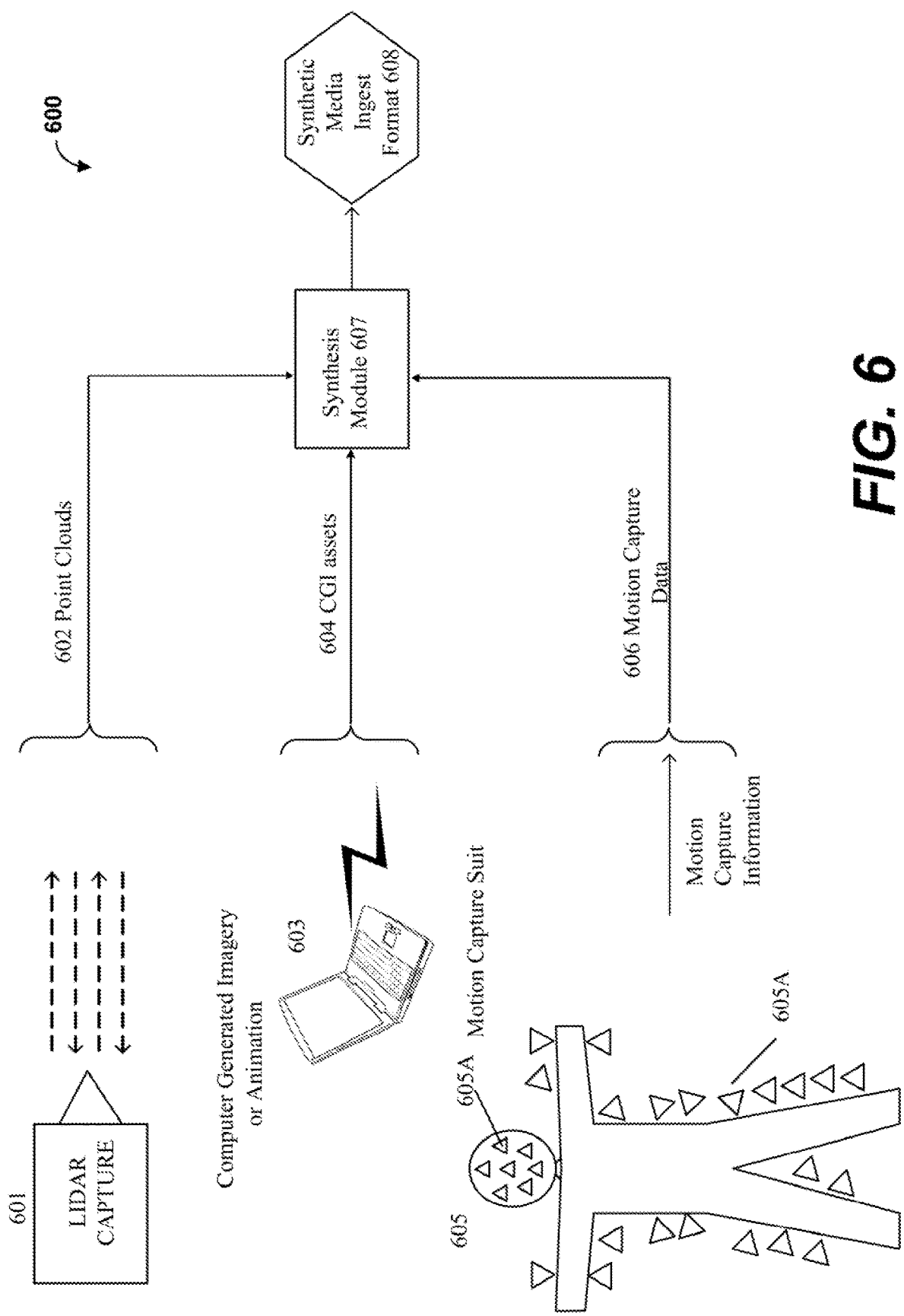
FIG. 6 shows a diagram of a process to create an ingest format for synthetic media in some examples.

FIG. 6 shows a diagram of a process 600 to create an ingest format for synthetic media 608, e.g., computer-generated imagery. In the FIG. 6 example, LIDAR camera 601 captures point clouds 602 of a scene. Computer-generated imagery (CGI) tools, 3D modelling tools, or another animation processes to create synthetic content are employed on computer 603 to create 604 CGI assets over a network. Motion capture suit with sensors 605A are worn on actor 605 to capture a digital recording of the motion for actor 605 to produce animated motion capture (MoCap) Data 606. Data 602, 604, and 606 are provided as input to a synthesis module 607 which likewise may, for example, use a neural network and training data to create a neural network model (not shown in FIG. 6).

The techniques for representing, streaming and processing heterogeneous immersive media in the present disclosure can be implemented as computer software using computer-readable instructions and physically stored in one or more computer-readable media. For example, FIG. 7 shows a computer system 700 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
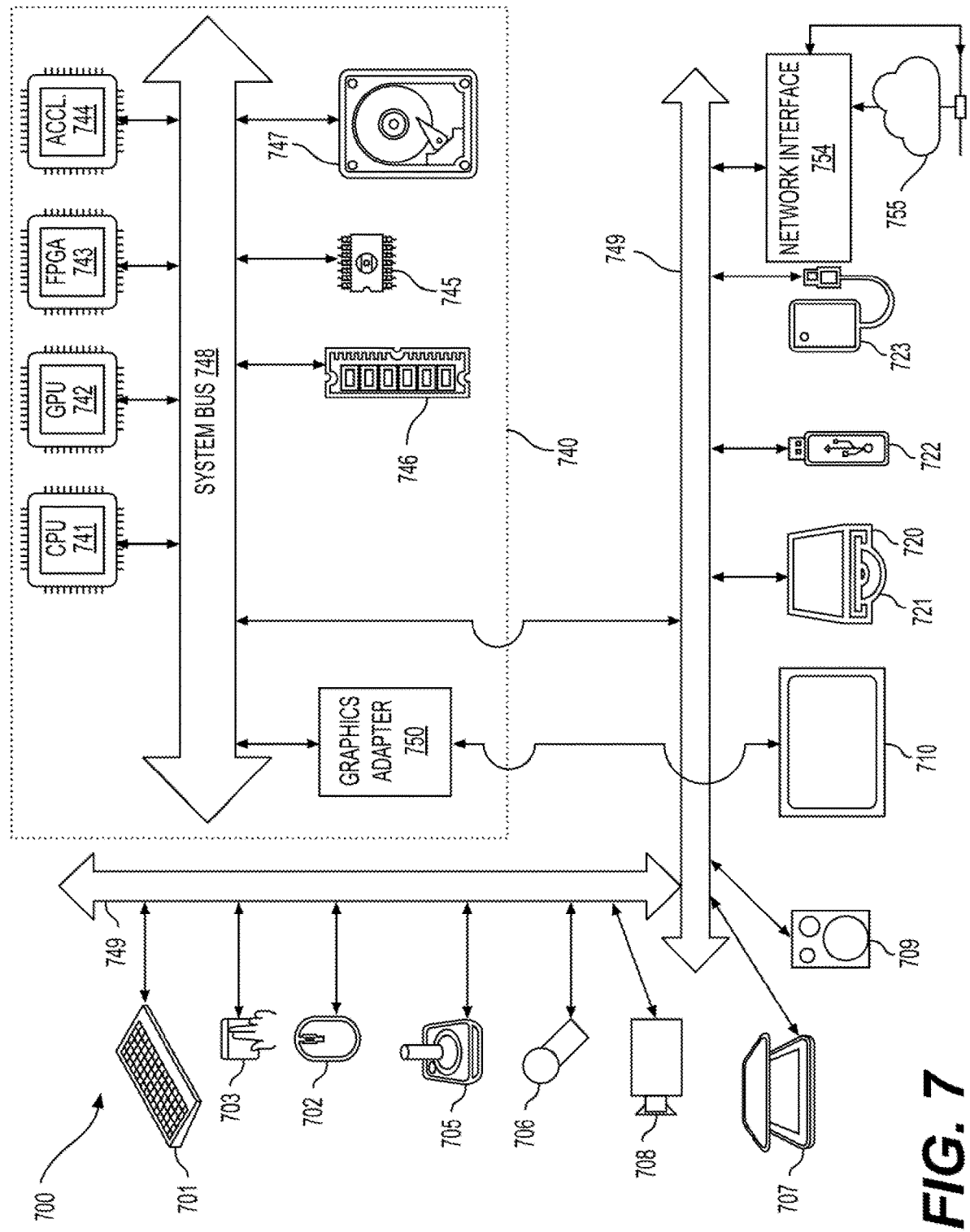
FIG. 7 is a schematic illustration of a computer system in accordance with an embodiment.

The components shown in FIG. 7 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710, data-glove (not shown), joystick 705, microphone 706, scanner 707, camera 708.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, data-glove (not shown), or joystick 705, but there can also be tactile feedback devices that do not serve as input devices), audio output devices (such as: speakers 709, headphones (not depicted)), visual output devices (such as screens 710 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 700 can also include human accessible storage devices and their associated media such as optical media including CD/DVD ROM/RW (720) with CD/DVD or the like media 721, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 700 can also include an interface 754 to one or more communication networks 755. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 749 (such as, for example USB ports of the computer system 700); others are commonly integrated into the core of the computer system 700 by attachment to a system bus as described below (for example Ethernet interface into a PC computer system or cellular network interface into a smartphone computer system). Using any of these networks, computer system 700 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 740 of the computer system 700.

The core 740 can include one or more Central Processing Units (CPU) 741, Graphics Processing Units (GPU) 742, specialized programmable processing units in the form of Field Programmable Gate Areas (FPGA) 743, hardware accelerators for certain tasks (744), graphics adapters 750, and so forth. These devices, along with Read-only memory (ROM) 745, Random-access memory 746, internal mass storage such as internal non-user accessible hard drives, SSDs, and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 749. In an example, the screen 710 can be connected to the graphics adapter 750. Architectures for a peripheral bus include PCI, USB, and the like.

CPUs 741, GPUs 742, FPGAs 743, and accelerators 744 can execute certain instructions that, in combination, can make up the aforementioned computer code. That computer code can be stored in ROM 745 or RAM 746. Transitional data can be also be stored in RAM 746, whereas permanent data can be stored for example, in the internal mass storage 747. Fast storage and retrieve to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 700, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system can provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Figure 8:
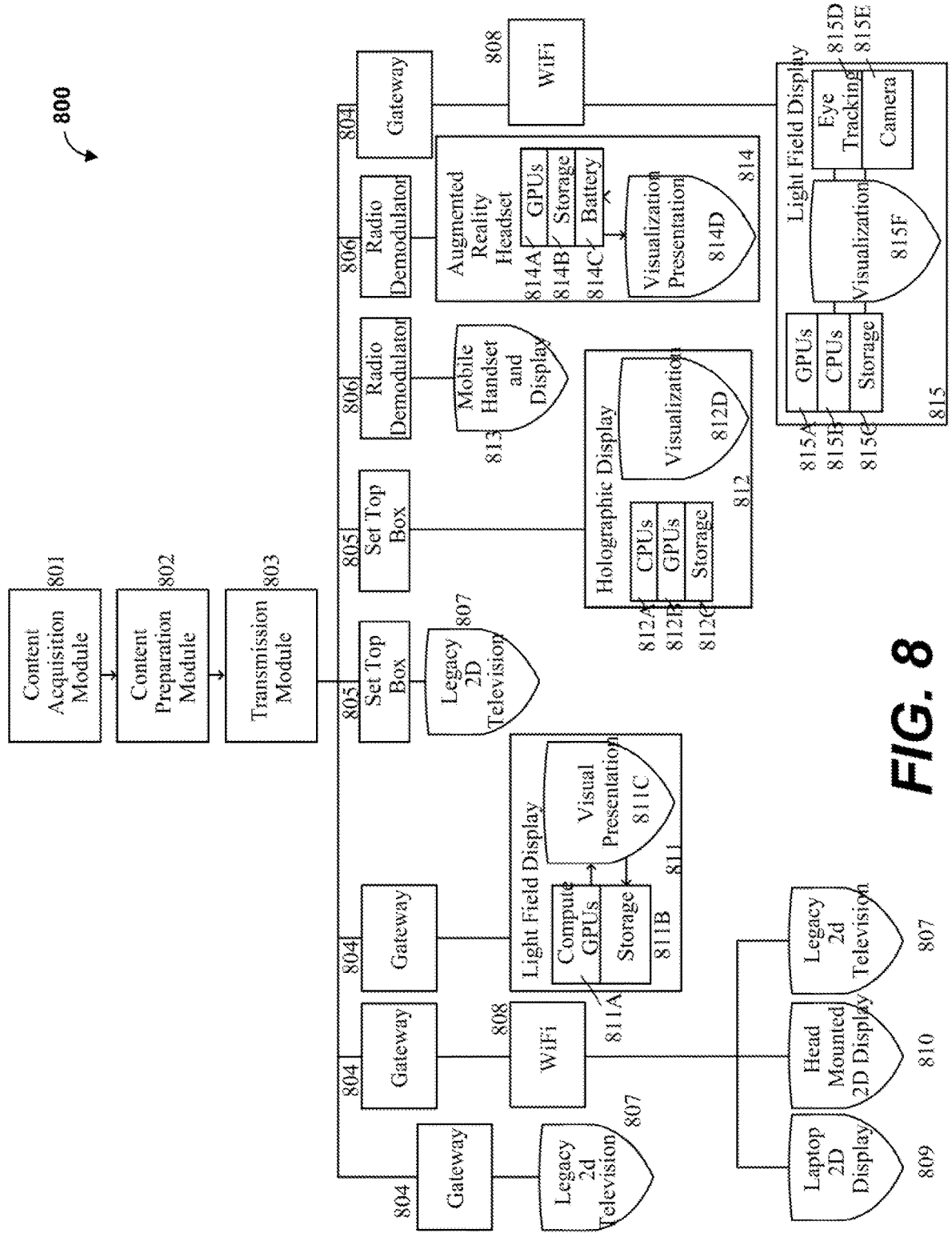
FIG. 8 shows a network media distribution system that supports a variety of legacy and heterogenous immersive-media capable displays as client end-points in some examples.

FIG. 8 shows a network media distribution system 800 that supports a variety of legacy and heterogenous immersive-media capable displays as client end-points in some examples. In the FIG. 8 example, content acquisition module 801 captures or creates the media using example embodiments in FIG. 6 or FIG. 5. Ingest formats are created in content preparation module 802 and then are transmitted to one or more client end-points in a network media distribution system using transmission module 803. Gateways 804 may serve customer premise equipment to provide network access to various client end-points for the network. Set top boxes 805 may also serve as customer premise equipment to provide access to aggregated content by the network service provider. Radio demodulators 806 may serve as mobile network access points for mobile devices (e.g., as with mobile handset and displays 813). In one or more embodiments, legacy 2D televisions 807 may be directly connected to gateways 804, set-top boxes 805, or WiFi routers 808. A computer laptop with a legacy 2D display 809 may be a client end-point connected to a WiFi router 808. A head mounted 2D (raster-based) display 810 may also connected to a router 808. A Lenticular light field display 811 may be connected to a gateway 804. The display 811 may be comprised of local compute GPUs 811A, storage devices 811B, and a visual presentation unit 811C that creates multiple views using a ray-based lenticular optical technology. A Holographic Display 812 may be connected to a set top box 805 and may include local compute CPUs 812A, GPUs 812B, storage devices 812C, and a Fresnal pattern, wave-based holographic visualization unit 812D. An augmented reality headset 814 may be connected to a radio demodulator 806 and may include a GPU 814A, a storage device 814B, a battery 814C, and a volumetric visual presentation component 814D. A dense light field display 815 may be connected to a WiFi router 808 and may include multiple GPUs 815A, CPUs 815B, and storage devices 815C; an eye tracking device 815D; a camera 815E; and a dense ray-based light field panel 815F.

Figure 9:
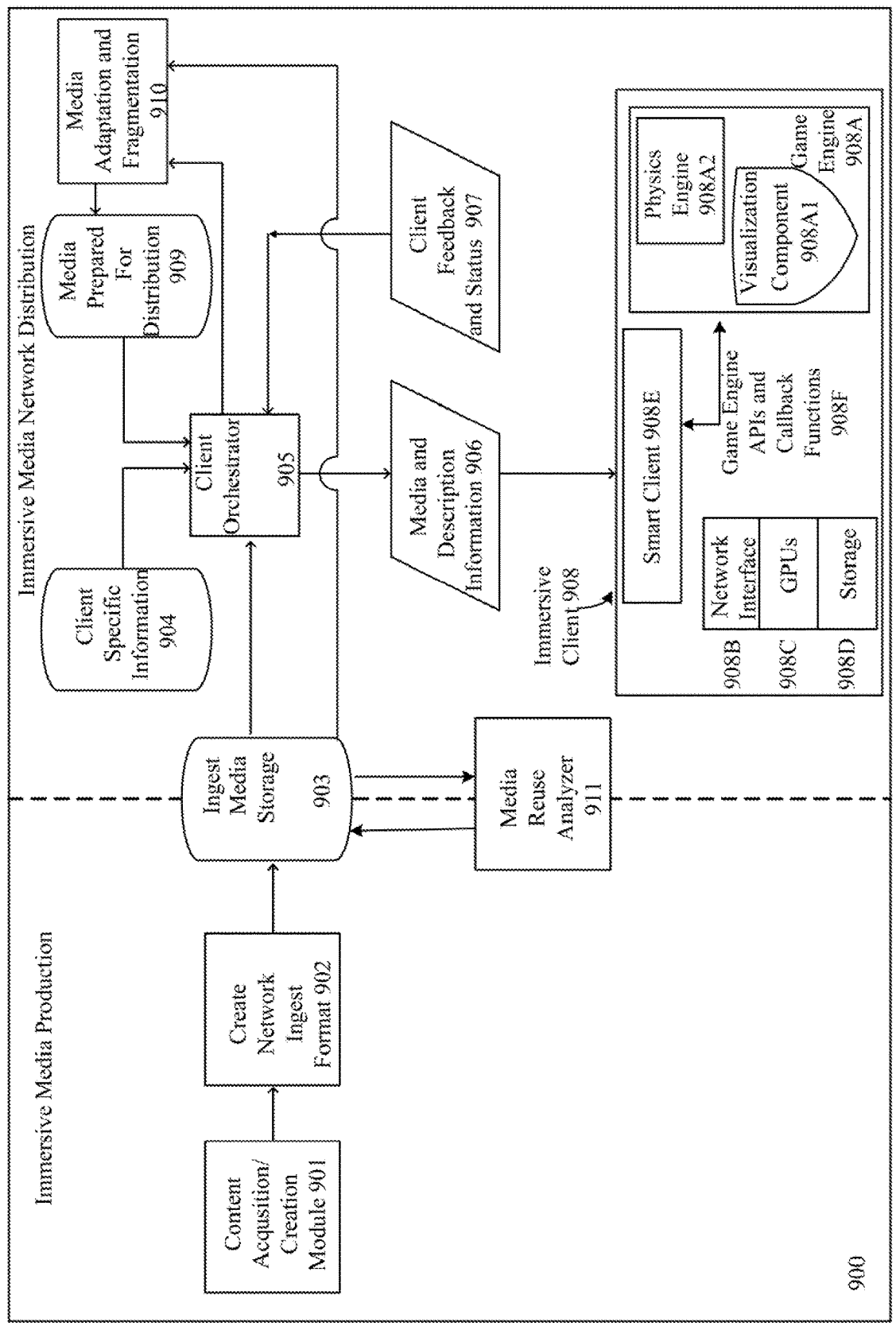
FIG. 9 shows a diagram of an immersive media distribution module that is capable of serving legacy and heterogenous immersive media-capable displays in some examples.

FIG. 9 shows a diagram of an immersive media distribution module 900 that is capable of serving legacy and heterogenous immersive media-capable displays as previously depicted in FIG. 8. Content is either created or acquired in module 901, which is embodied in FIG. 5 and FIG. 6 for natural and CGI content respectively. Content is then converted into an ingest format using the create network ingest format module 902. Some examples of the module 902 are embodied in FIG. 5. and FIG. 6 for natural and CGI content respectively. The ingest media is optionally updated to store information regarding assets that are potentially reused across multiple scenes, from media reuse analyzer 911. The ingest media format is transmitted to the network and stored on storage device 903. In some other examples, the storage device may reside in the immersive media content producer's network, and accessed remotely by the immersive media network distribution module 900 as depicted by the dashed line that bisects. Client and application specific information is, in some examples, available on a remote storage device 904, which may optionally exist remotely in an alternate cloud network in an example.

As depicted in FIG. 9, a network orchestrator 905 serves as the primary source and sink of information to execute the major tasks of the distribution network. In this particular embodiment, the network orchestrator 905 may be implemented in unified format with other components of the network. Nevertheless the tasks depicted by network orchestrator 905 in FIG. 9 form elements of the disclosed subject matter in some examples. The network orchestrator 905 can be implemented in software, and can be executed by processing circuitry to perform a process.

According to some aspects of the disclosure, the network orchestrator 905 may further employ a bidirectional message protocol for communication with client devices to facilitate processing and distribution of the media (e.g., immersive media) in accordance with the characteristics of the client devices. Furthermore, the bi-directional message protocol may be implemented across different delivery channels, i.e., a control plane channel and a data plane channel.

The network orchestrator 905 receives information about the features and attributes of client devices, such as a client 908 (also referred to as client device 908) in FIG. 9, and furthermore collects requirements regarding the application currently running on the client 908. This information may be obtained from the device 904, or in an alternate embodiment, may be obtained by directly querying the client 908. In some examples, a bidirectional message protocol is used to enable direct communication between the network orchestrator 905 and the client 908. For example, the network orchestrator 905 can send a direct query to the client 908. In some examples, a smart client 908E can participate in the gathering and reporting of client status and feedback on behalf of the client 908. The smart client 908E can be implemented in software that can be executed by processing circuitry to perform a process.

The network orchestrator 905 also initiates and communicates with media adaptation and fragmentation module 910 which will be described in FIG. 10. As ingest media is adapted and fragmented by the module 910, the media is, in some examples, transferred to an intermedia storage device depicted as the media prepared for distribution storage device 909. As the distribution media is prepared and stored in device 909, the network orchestrator 905 ensures that immersive client 908, via its network interface 908B, either receives the distribution media and corresponding descriptive information 906 either through a push request, or client 908 itself may initiate a pull request of the media 906 from storage device 909. In some examples, the network orchestrator 905 may employ a bi-directional message interface (not shown in FIG. 9) to perform the "push" request or to initiate a "pull" request by the immersive client 908. In an example, the immersive client 908 can employ the network interface 908B, GPUs (or CPUs not shown) 908C, and storage 908D. Furthermore, Immersive Client 908 may employ a game engine 908A. The game engine 908A may further employ visualization component 908A1 and a physics engine 908A2. The game engine 908A communicates with the smart client 908E to collectively orchestrate the processing of the media via game engine APIs and callback functions 908F. The distribution format of the media is stored in the client 908's storage device or storage cache 908D. Finally, the client 908 visually presents the media via the visualization component 908A1.

Throughout the process of streaming the immersive media to the immersive client 908, the network orchestrator 905 can monitor the status of the client's progress via client progress and status feedback channel 907. The monitoring of status may be performed by means of a bi-directional communication message interface (not shown in FIG. 9), which may be implemented in the smart client 908E.

Figure 10:
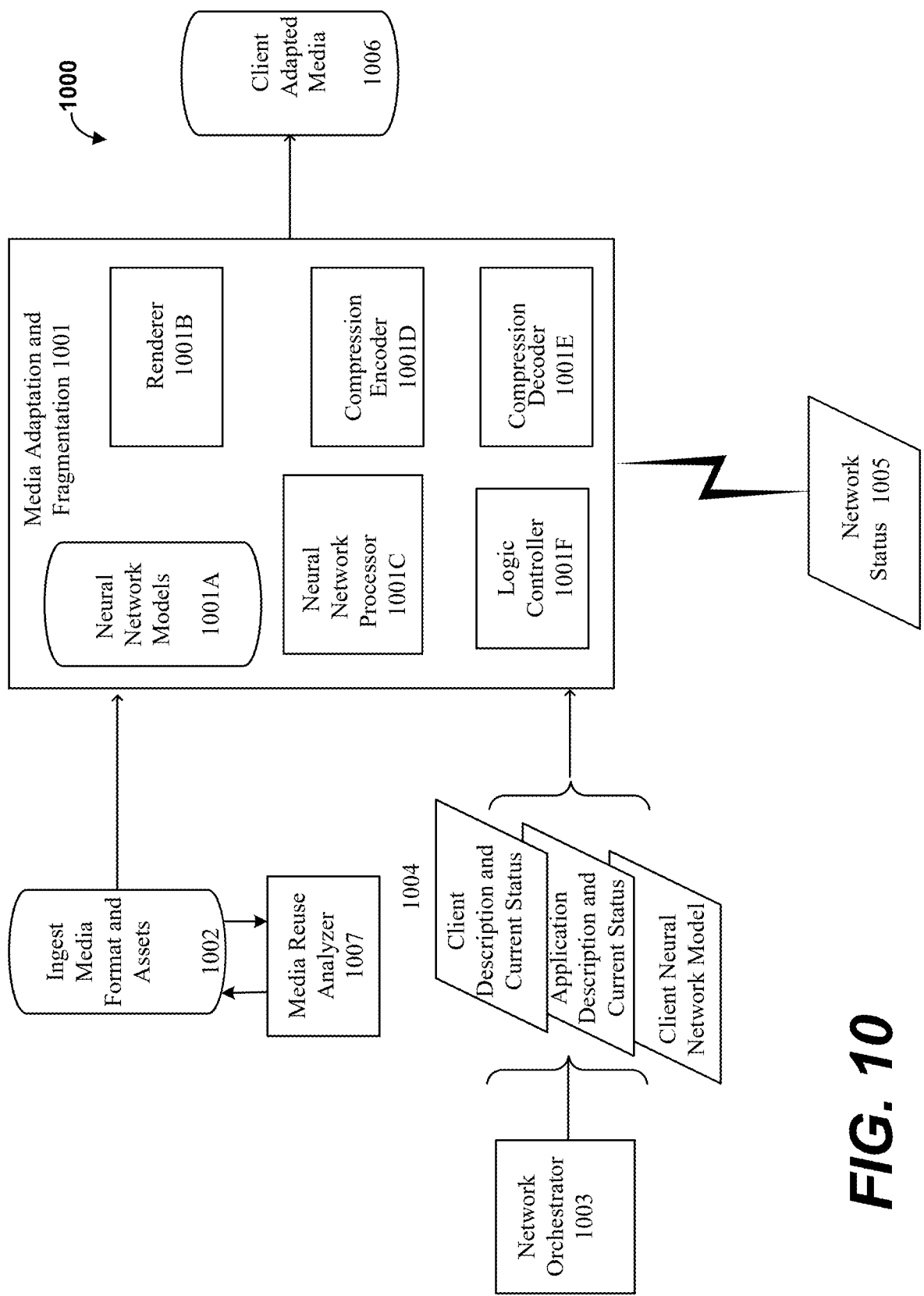
FIG. 10 shows a diagram of a media adaptation process in some examples.

FIG. 10 depicts a diagram of a media adaptation process 1000 so that the ingested source media may be appropriately adapted to match the requirements of the immersive client 908 in some examples. A media adaptation and fragmentation module 1001 is comprised of multiple components that facilitate the adaptation of the ingest media into an appropriate distribution format for immersive client 908. In FIG. 10, the media adaptation and fragmentation module 1001 receives input network status 1005 to track the current traffic load on the network. The immersive client 908 information can include attributes and features description, application features and description as well as application current status, and a client neural network model (if available) to aid in mapping the geometry of the client's frustum to the interpolation capabilities of the ingest immersive media. Such information may be obtained by means of a bi-directional message interface (not shown in FIG. 10) with the aid of a smart client interface shown as 908E in FIG. 9. The media adaptation and fragmentation module 1001 ensures that the adapted output, as it is created, is stored into a client-adapted media storage device 1006. A media reuse analyzer 1007 is depicted in FIG. 10 as a process that may be executed a priori or as part of the network automated process for the distribution of the media.

In some examples, the media adaptation and fragmentation module 1001 is controlled by a logic controller 1001F. In an example, the media adaptation and fragmentation module 1001 employs a renderer 1001B or a neural network processor 1001C to adapt the specific ingest source media to a format that is suitable for the client. In an example, the media adaptation and fragmentation module 1001 receives client information 1004 from a client interface module 1003, such as a server device in an example. The client information 1004 can include client description and current status, can application description and the current status, and can include client neural network model. The neural network processor 1001C uses neural network models 1001A. Examples of such a neural network processor 1001C include the deepview neural network model generator as described in MPI and MSI. In some examples, the media is in a 2D format, but the client requires a 3D format, then the neural network processor 1001C can invoke a process to use highly correlated images from a 2D video signal to derive a volumetric representation of the scene depicted in the video. An example of such a process could be the neural radiance fields from one or few images process developed at the University of California, Berkley. An example of a suitable renderer 1001B could be a modified version of the OTOY Octane renderer (not shown) which would be modified to interact directly with the media adaptation and fragmentation module 1001. The media adaptation and fragmentation module 1001 may, in some examples, employ media compressors 1001D and media decompressors 1001E depending on the need for these tools with respect to the format of the ingest media and the format required by immersive client 908.

Figure 11:
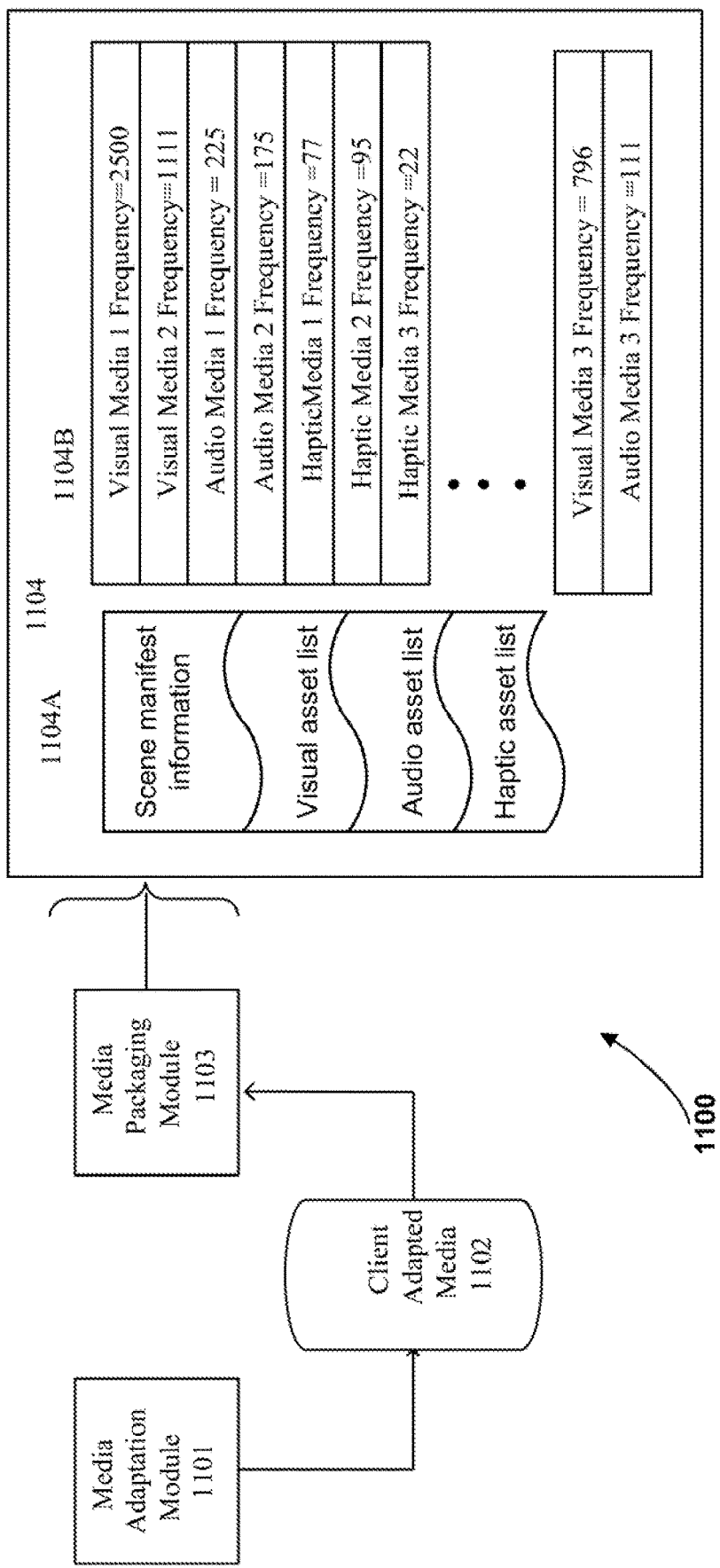
FIG. 11 depicts a distribution format creation process in some examples.

FIG. 11 depicts a distribution format creation process 1100 in some examples. An adapted media packaging module 1103 packages media from media adaptation module 1101 (depicted as process 1000 in FIG. 10) now residing on client adapted media storage device 1102. The packaging module 1103 formats the adapted media from media adaptation module 1101 into a robust distribution format 1104, for example, the exemplary formats shown in FIG. 3 or FIG. 4. Manifest information 1104A provides client 908 with a list of scene data assets 1104B that it can expect to receive as well as optional metadata describing the frequency by each asset is used across the set of scenes comprising the presentation. List 1104B depicts a list of visual assets, audio assets, and haptic assets, each with their corresponding metadata. In this exemplary embodiment, each of the assets in list 1104B references metadata that contains a numeric frequency value that indicates the number of times that a particular asset is used across all scenes that comprise the presentation.

Figure 12:
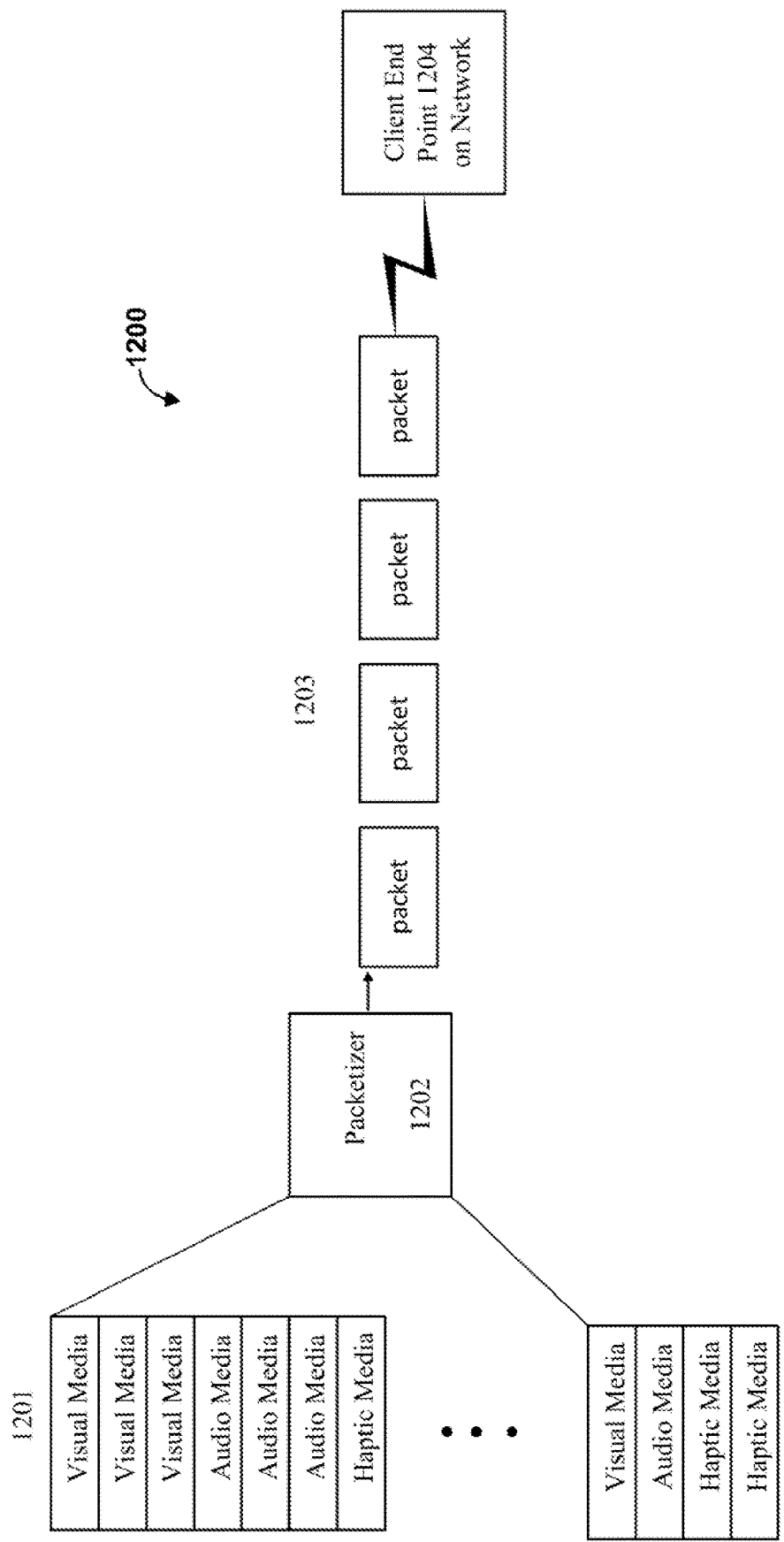
FIG. 12 shows a packetizer process system in some examples.

FIG. 12 shows a packetizer process system 1200 in some examples. In the FIG. 12 example, a packetizer 1202 separates the adapted media 1201 into individual packets 1203 that are suitable for streaming to the immersive client 908, shown as client end point 1204 on network.

Figure 13:
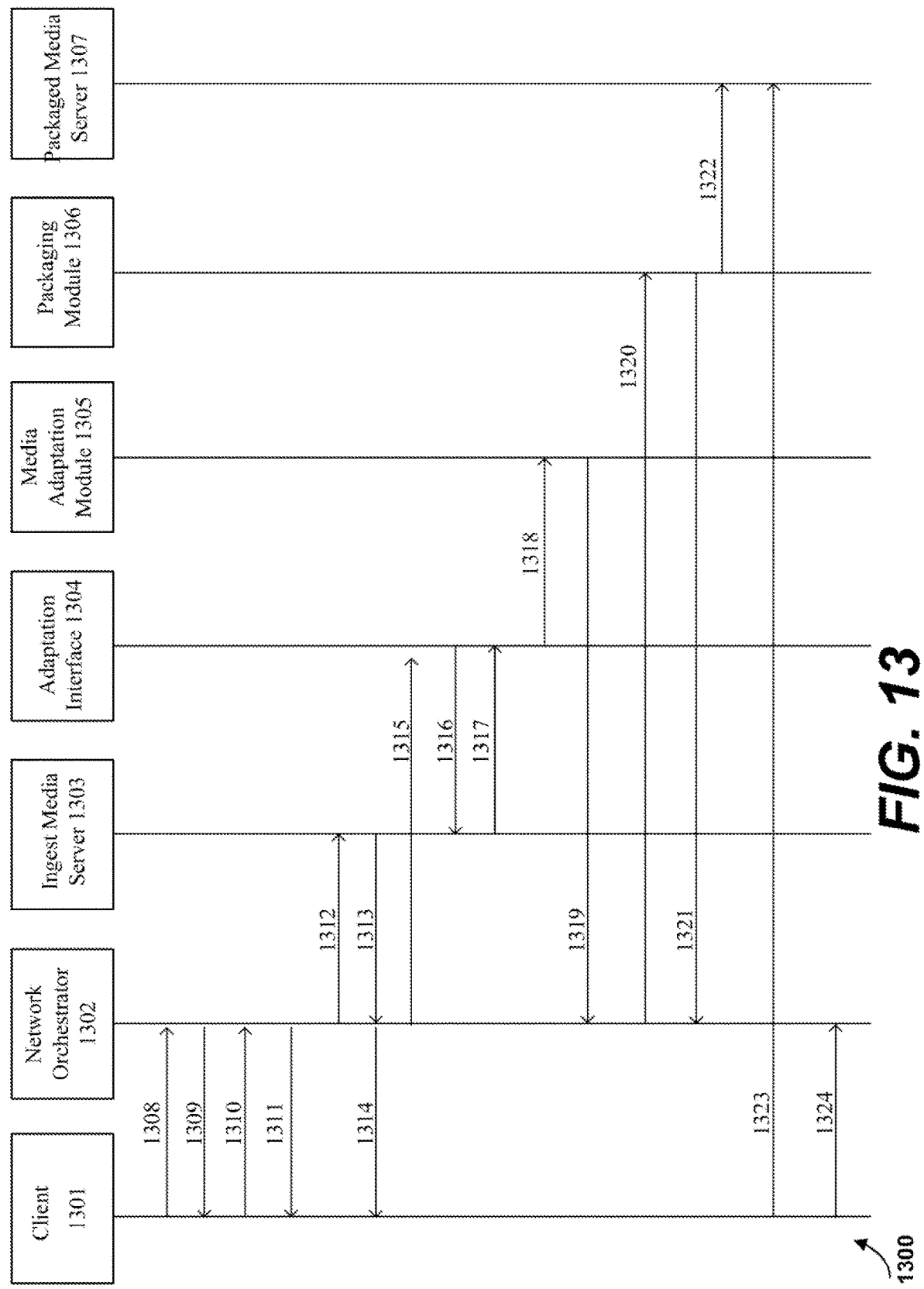
FIG. 13 shows a sequence diagram of a network adapting a specific immersive media in an ingest format to a streamable and suitable distribution format for a specific immersive media client end-point in some examples

FIG. 13 shows a sequence diagram 1300 of a network adapting a specific immersive media in an ingest format to a streamable and suitable distribution format for a specific immersive media client end-point in some examples.

The components and communications shown in FIG. 13 are explained as follows: client 1301 (also referred to as client end-point, client device, in some examples) initiates a media request 1308 to a network orchestrator 1302 (also referred to as network distribution interface in some examples). The media request 1308 includes information to identify the media that is requested by the client 1301, either by URN or other standard nomenclature. The network orchestrator 1302 responds to media request 1308 with profiles request 1309, which requests that client 1301 provide information about its currently available resources (including compute, storage, percent battery charged, and other information to characterize the current operating status of the client). The profiles request 1309 also requests that the client provide one or more neural network models that can be used by the network for neural network inferencing to extract or interpolate the correct media views to match the features of the client's presentation system, if such models are available at the client. Response 1310 from client 1301 to the network orchestrator 1302 provides a client token, application token, and one or more neural network model tokens (if such neural network model tokens are available at the client). The network orchestrator 1302 then provides client 1301 with a session ID token 1311. The network orchestrator 1302 then requests ingest media server 1303 with ingest media request 1312, which includes the URN or standard nomenclature name for the media identified in request 1308. The ingest media server 1303 replies to the request 1312 with a response 1313 which includes an ingest media token. The network orchestrator 1302 then provides the media token from the response 1313 in a call 1314 to client 1301. The network orchestrator 1302 then initiates the adaptation process for the media request 1308 by providing the adaptation interface 1304 with the ingest media token, client token, application token, and neural network model tokens 1315. The adaptation interface 1304 requests access to the ingest media by providing the ingest media server 1303 with the ingest media token at call 1316 to request access to the ingest media assets. The ingest media server 1303 responds to request 1316 with an ingest media access token in response 1317 to the adaptation interface 1304. The adaptation interface 1304 then requests that media adaptation module 1305 adapt the ingest media located at the ingest media access token for the client, application, and neural network inference models corresponding to the session ID token created at 1313. Request 1318 from the adaptation interface 1304 to media adaptation module 1305 contains the required tokens and session ID. The media adaptation module 1305 provides the network orchestrator 1302 with adapted media access token and session ID in update 1319. The network orchestrator 1302 provides the packaging module 1306 with adapted media access token and session ID in interface call 1320. The packaging module 1306 provides response 1321 to the network orchestrator 1302 with the packaged media access token and session ID in response message 1321. The packaging module 1306 provides packaged assets, URNs, and the packaged media access token for the session ID to the packaged media server 1307 in response 1322. Client 1301 executes request 1323 to initiate the streaming of media assets corresponding to the packaged media access token received in response message 1321. The client 1301 executes other requests and provides status updates in message 1324 to the network orchestrator 1302.

Figure 14:
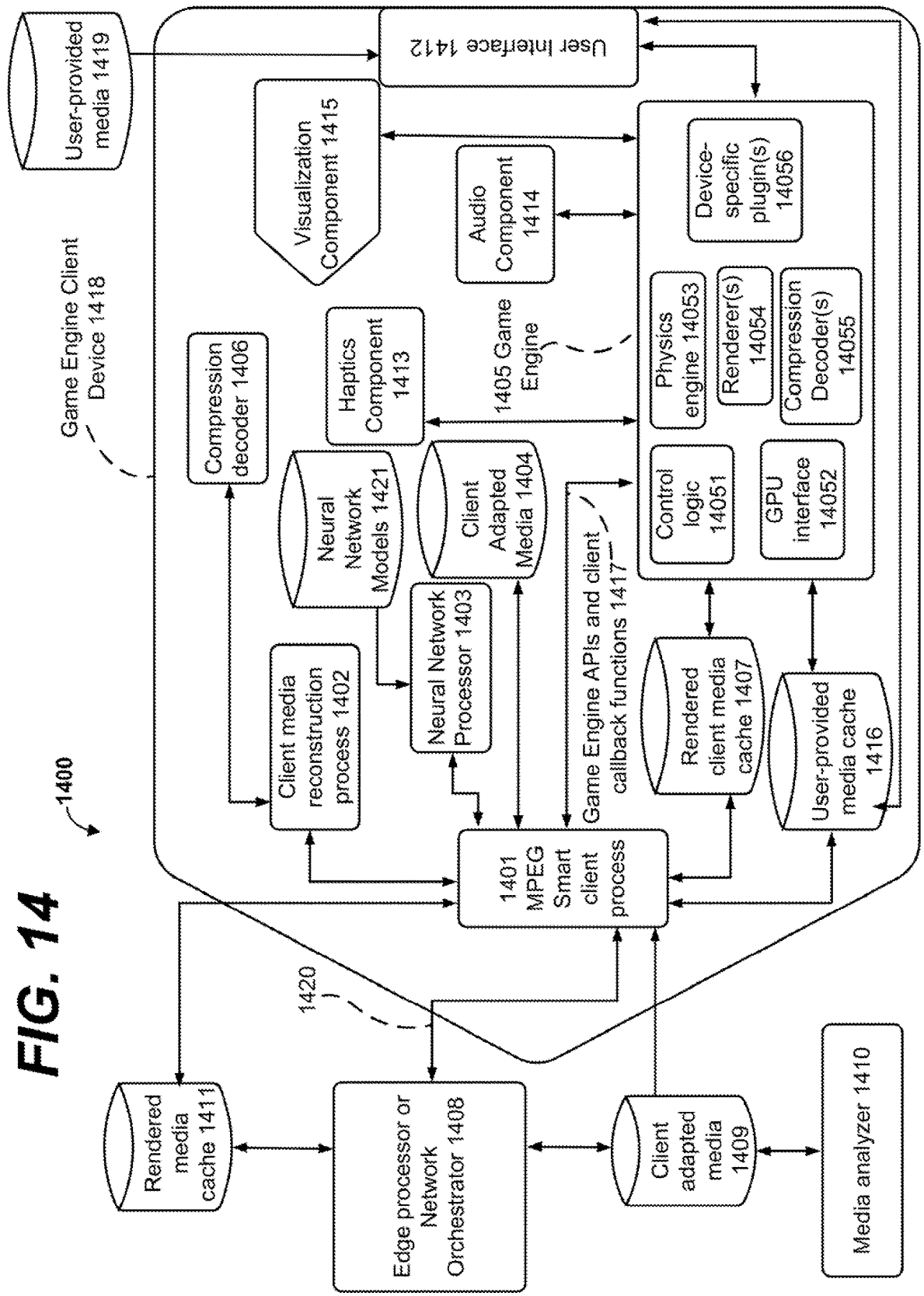
FIG. 14 shows a diagram of a media system with a hypothetical network and a client device for scene-based media processing in some examples.

FIG. 14 shows a diagram of a media system 1400 with a hypothetical network and a client device 1418 (also referred to as game engine client device 1418) for scene-based media processing in some examples. In FIG. 4, a smart client, such as shown by an MPEG smart client process 1401, can serve as a central coordinator to prepare media to be processed by and for other entities within game engine client device 1418, as well as for entities that exist outside of game engine client device 1418. In some examples, the smart client is implemented as software instructions that can be executed by processing circuitry to perform a process, such as the MPEG smart client process 1401 (also referred to as MPEG smart client 1401 in some examples). A game engine 1405 is primarily responsible for rendering the media to create the presentation that will be experienced by end-user(s). A haptics component 1413, a visualization component 1415, and an audio component 1414 can assist the game engine 1405 to render haptics, visual, and audio media respectively. An edge processor or network orchestrator device 1408 can convey information and system media to and receive status updates and other information from the MPEG smart client 1401 via network interface protocol 1420. The network interface protocol 1420 may be split across multiple communication channels and processes, and employ multiple communication protocols. In some examples, the game engine 1405 is a game engine device that includes control logic 14051, GPU interface 14052, physics engine 14053, renderer(s) 14054, compression decoder(s) 14055, and device-specific plugin(s) 14056. The MPEG smart client 1401 also serves as the primary interface between the network and the client device 1418. For example, the MPEG smart client 1401 may employ game engine APIs and callback functions 1417 to interact with the game engine 1405. In an example, the MPEG smart client 1401 may be responsible for reconstructing the streamed media conveyed in 1420 prior to invoking game engine APIs and callback functions 1417 that are managed by the game engine control logic 14051 to cause the game engine 1405 to process the reconstructed media. In such a example, the MPEG smart client 1401 may utilize client media reconstruction process 1402 which may in turn utilize compression decoder process 1406.

In some other examples, the MPEG smart client 1401 may not be responsible for reconstructing the packetized media streamed in 1420 prior to invoking APIs and callback functions 1417. In such examples, the game engine 1405 may decompress and reconstruct the media. Furthermore, in such examples, the game engine 1405 may employ the compression decoder(s) 14055 to decompress the media. Upon receipt of reconstructed media, the game engine control logic 14051 may employ the GPU interface 14052 to render the media via renderer process(es) 14054.

In some examples, the rendered media is animated, then the physics engine 14053 may be employed by the game engine control logic 14051 to simulate laws of physics in the animation of the scene.

In some examples, throughout the processing of the media by the client device 1418, the neural network models 1421 may be employed by the neural network processor 1403 to assist the operations orchestrated by the MPEG smart client 1401. In some examples, the reconstruction process 1402 may need to employ the neural network models 1421 and the neural network processors 1403 to fully reconstruct the media. Likewise, the client device 1418 may be configured via the user interface 1412 by a user to cache the media received from the network in client-adapted media cache 1404 after the media has been reconstructed or cache the rendered media in the rendered client media cache 1407 once the media has been rendered. Further, in some examples, the MPEG smart client 1401 may substitute system-provided visual/nonvisual assets with user-provided visual/nonvisual assets from a user-provided media cache 1416. In such an embodiment, the user interface 1412 may guide end-users to execute the steps to load user-provided visual/non visual assets from a user-provided media cache 1419 (e.g., external of the client device 1418) into a client-accessible user-provided media cache 1416 (e.g., inside the client device 1418). In some embodiments, the MPEG smart client 1401 may be configured to store rendered assets (for potential reuse or sharing with other clients) in the rendered media cache 1411.

In some examples, a media analyzer 1410 may examine client adapted media 1409 (in the network) to determine the complexity of assets, or the frequency with which assets are reused across one or more scenes (not shown), for potential prioritization for rendering by the game engine 1405 and or for reconstruction processing via the MPEG smart client 1401. In such examples, the media analyzer 1410 will store complexity, prioritization, and frequency-of-asset-use information in media stored in 1409.

It is noted that, in the present disclosure, while a process is shown and described, the process can be implemented as instructions in a software module, and the instructions can be executed by processing circuitry to perform the process. It is also noted that, in the present disclosure, while a module is shown and described, the module can be implemented as a software module with instructions, and the instructions can be executed by processing circuitry to perform a process.

According to first aspects of the present disclosure, various techniques can be used to implement a smart client in a client device with a game engine for providing scene-based immersive media to the game engine. The smart client may be embodied by one or more processes, with one or more channels of communication implemented between the client device processes and the network server processes. In some examples, the smart client is configured to receive, and convey media and media-related information to facilitate the processing of scene-based media on a particular client device between the network server processes and the client device's game engine(s), which can serve as the media rendering engine(s) in the client device in some examples. The media and the media related information can include meta-data, command-data, client status information, media assets, and information to facilitate the optimization of one or more operating aspects within the network. Likewise for the client device, the smart client may use the availability of application programming interfaces provided by the game engine in order to efficiently enable the playback of the scene-based immersive media streamed from the network. In a network architecture that aims to support a heterogenous collection of immersive media processing devices, the smart client described herein is a component of the network architecture that provides the main interface for the network server processes to interact with and deliver scene-based media to a particular client device. Likewise for the client device, the smart client utilizes the programming architecture employed by the client device's game engine to cause the efficient management and delivery of scene-based assets for rendering by the game engine.

Figure 15:
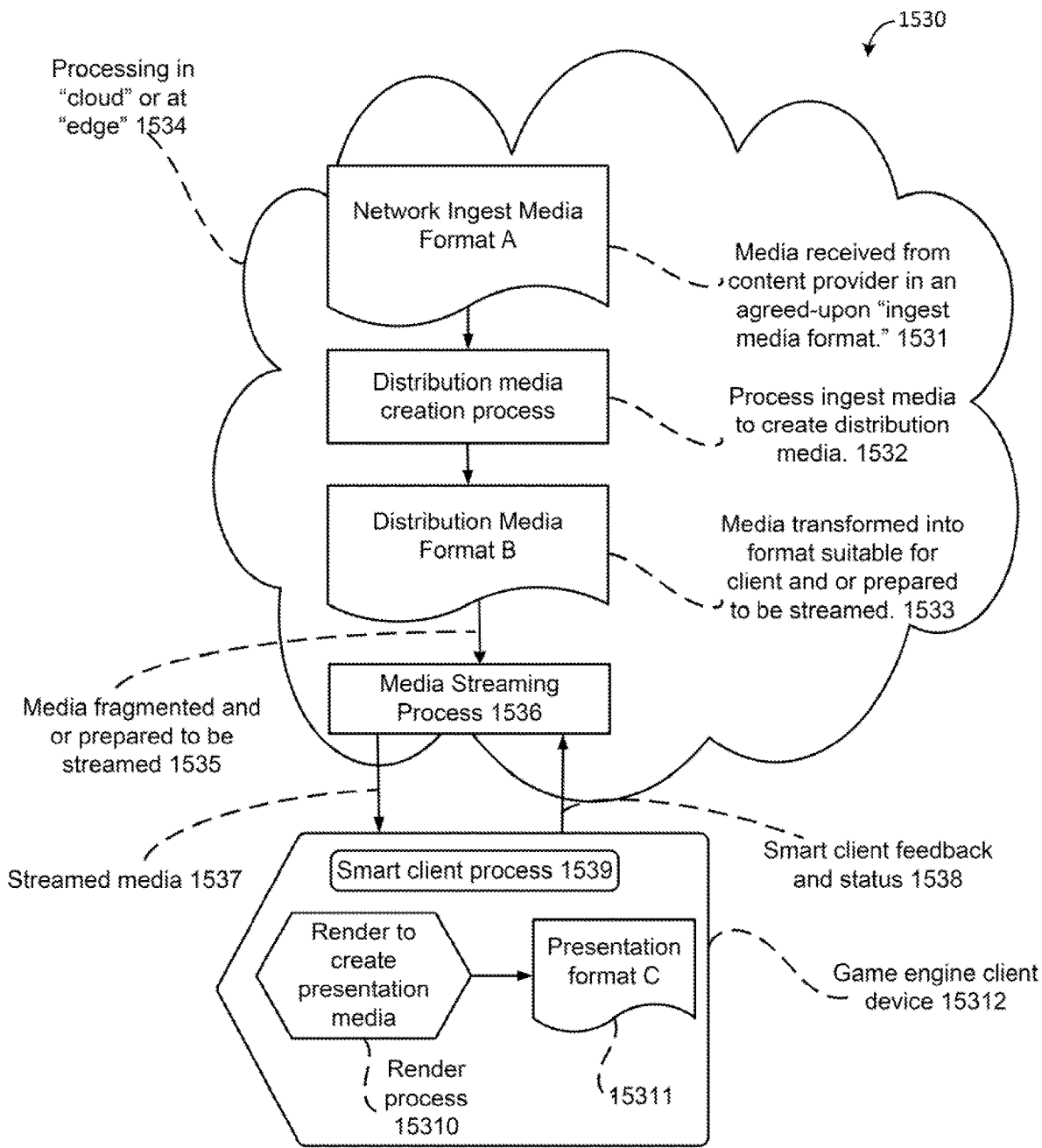
FIG. 15 is a diagram of a media flow process for media distribution through a network to a client device in some examples.

FIG. 15 is a diagram of a media flow process 1530 (also referred to as process 1530) for media distribution through a network to a client device in some examples. The process 1530 is similar to the process 100 as depicted in FIG. 1, but with the explicit process for the media distribution depicted in the "cloud" or "edge". Additionally, the client device in FIG. 15 explicitly depicts a use of a game engine process as one of the processes executing on behalf of the client device. A Smart Client process is also depicted as one of the processes executing on behalf of the client device.

The process 1530 is similar to the process 100 in FIG. 1, but with an explicit media streaming process 1536 depicted, and a logic for a smart client process 1539 shown as a constituent part of a client device 15312. The smart client process 1539 serves as the primary interface by which the media distribution network communicates with a client device 15312. In some examples, the client device 15312 employs a game engine to render the media, the media presentation format C 15311 is scene-based rather than frame-based media. Such a smart client process may therefore play an important role of communicating to the network that frequently reused assets from scene-based media have already been received by the client device 15312, and that the network does not need to stream them to the client device 15312 again. The process 1530 includes a series of steps and begins at process (step) 1531. At the process 1531, media is ingested into the network by a content provider (not shown). Then, a distribution media process (step) 1532 converts the media to a distribution format B. A process (step) 1533 then converts media in distribution format B to another format 1535 that can be packetized and streamed over a network. A media streaming process 1536 then distributes the media 1537 over the network to the game engine client device 15312. The smart client process 1539 receives the media on behalf of client device 15312, and returns progress, status, and other information to the network via the information channel 1538. The smart client process 1539 orchestrates the processing of the streamed media 1537 with the constituent parts of client device 15312 which may include converting the media into yet another format presentation format C 15311 via a render process 15310.

Figure 16:
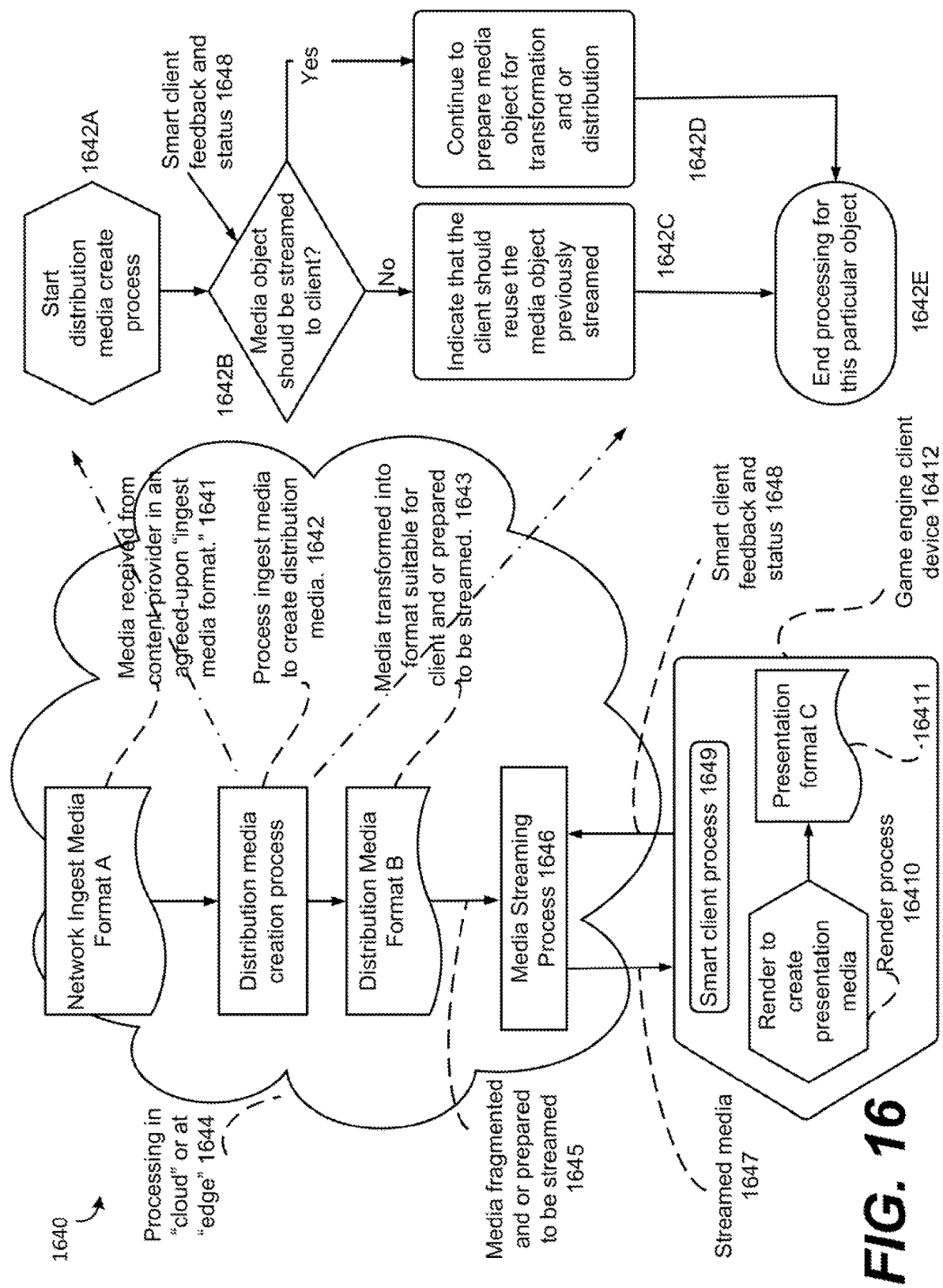
FIG. 16 shows a diagram of a media flow process with asset reuse to game engine process in some examples.

FIG. 16 shows a diagram of a media flow process 1640 (also referred to as process 1640) with asset reuse to game engine process in some examples. The process 1640 is similar to process 1530 as depicted in FIG. 15, but with query logic explicitly depicted to determine if the client device already has the access to the asset in question and therefore the network does not need to stream the asset again. In FIG. 16, the client device is depicted with a smart client and game engine existing as parts of the client device.

The process 1640 is similar to process 1530 as depicted in FIG. 15, but with query logic explicitly depicted to determine if a client device (e.g., with a game engine) 16412 already has access to the media asset in question and therefore the network does not need to stream the asset again. As in process 1530 depicted in FIG. 15, the process 1640 shown in FIG. 16 includes a series of steps starting with process (step) 1641. At the process 1641, media is ingested into the network by a content provider (not shown). A process (step) 1642 determines whether the media asset in question has previously been streamed to the client device, and therefore does not need to be streamed again. Some of the relevant steps of the process 1642 are explicitly depicted to illustrate the logic to determine whether the media asset in question has previously been streamed to the client device, and therefore does not need to be streamed again. For example, a start distribution media create process 1642A begins the logic sequence for the process 1642. A decision making process 1642B determines whether or not the media needs to be streamed to the client device 16412 by information contained in the smart client feedback and status 1648. If the media needs to be streamed to the client device 16412 then process 1642D continues to prepare the media to be streamed. If the media should not be streamed to the client device 16412 then a process 1642C indicates that the media asset will not be contained in the streamed media 1647 (and hence can be acquired from another source, e.g., a resource cache available to the client device). A process 1642E marks the end of the process 1642. A process 1643 then converts media in distribution format B to another format 1645 that can be packetized and streamed over a network. A media streaming process 1646 then distributes the media 1647 over the network to the client device 16412 (with a game engine). A smart client process 1649 receives the media on behalf of client device 16412, and returns progress, status, and other information to the network via the information channel 1648. The smart client process 1649 orchestrates the processing of the streamed media 1647 with the constituent parts of client device 16412 which may include converting the media into yet another format presentation format C 16411 via a render process 16410.

Figure 17:
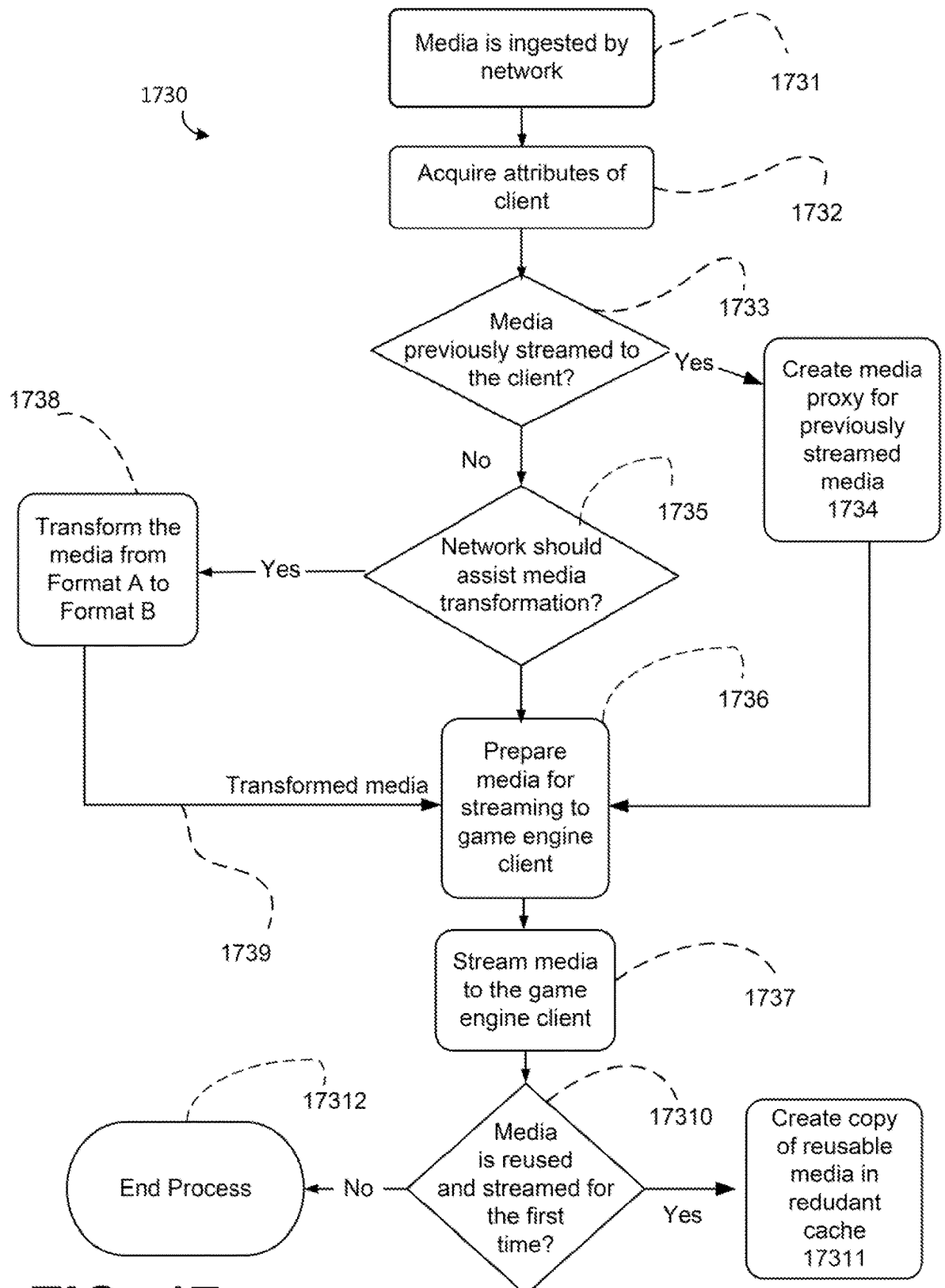
FIG. 17 shows a diagram of a media transform decision making process with asset reuse logic and redundant cache for a client device in some examples.

FIG. 17 shows a diagram of a media transform decision making process 1730 (also referred to as process 1730) with asset reuse logic and redundant cache for a client device (e.g., game engine client device). The process 1730 is similar to the process 200 in FIG. 2, but with the addition of logic to determine if a proxy to the original media needs to be streamed in lieu of the original media itself (either transformed to another format or in its original format).

In FIG. 17, the flow of media through a network employs two decision making processes to determine if the network needs to transform the media prior to distributing the media to the client device. In FIG. 17, at a process step 1731, ingested media represented in format A is provided by a content provider (not depicted) to the network. A process step 1732 acquires attributes that describe the processing capabilities of a client device (not depicted). A decision making process step 1733 is employed to determine if the network has previously streamed a particular media object (also referred to as media asset) to the client device. If the media object has been previously streamed to the client device, a process step 1734 is employed to substitute a proxy (e.g., an identifier) for the media object to indicate that the client device can access a copy of the previously streamed media object from its local cache or other cache. If the media object has not been previously streamed, a decision making process step 1735 is employed to determine if the network or the client device needs to perform any format conversions for any of the media assets contained within the ingested media at the process step 1731, e.g., such as a conversion of a particular media object from a format A to a format B, prior to the media object being streamed to the client device. If any of the media assets needs to be transformed by the network, then the network employs a process step 1738 to transform the media asset from format A to format B. The transformed media 1739 is the output from the process step 1738. The transformed media 1739 is merged into the preparation process step 1736 to prepare a media to be streamed to the client device (not shown). A process 1737 streams the media to the client device.

In some examples, the client device includes a smart client. The smart client can perform a process step 17310 that determines whether a received media asset is streamed for the first time and will be re-used. If the received media asset is streamed for the first time and will be re-used, the smart client can perform a process step 17311 that creates a copy of the reusable media asset in a cache (also referred to as a redundant cache) that is accessible by the client device. The cache can be an internal cache of the client device and can be an external cache device out of the client device.

Figure 18:
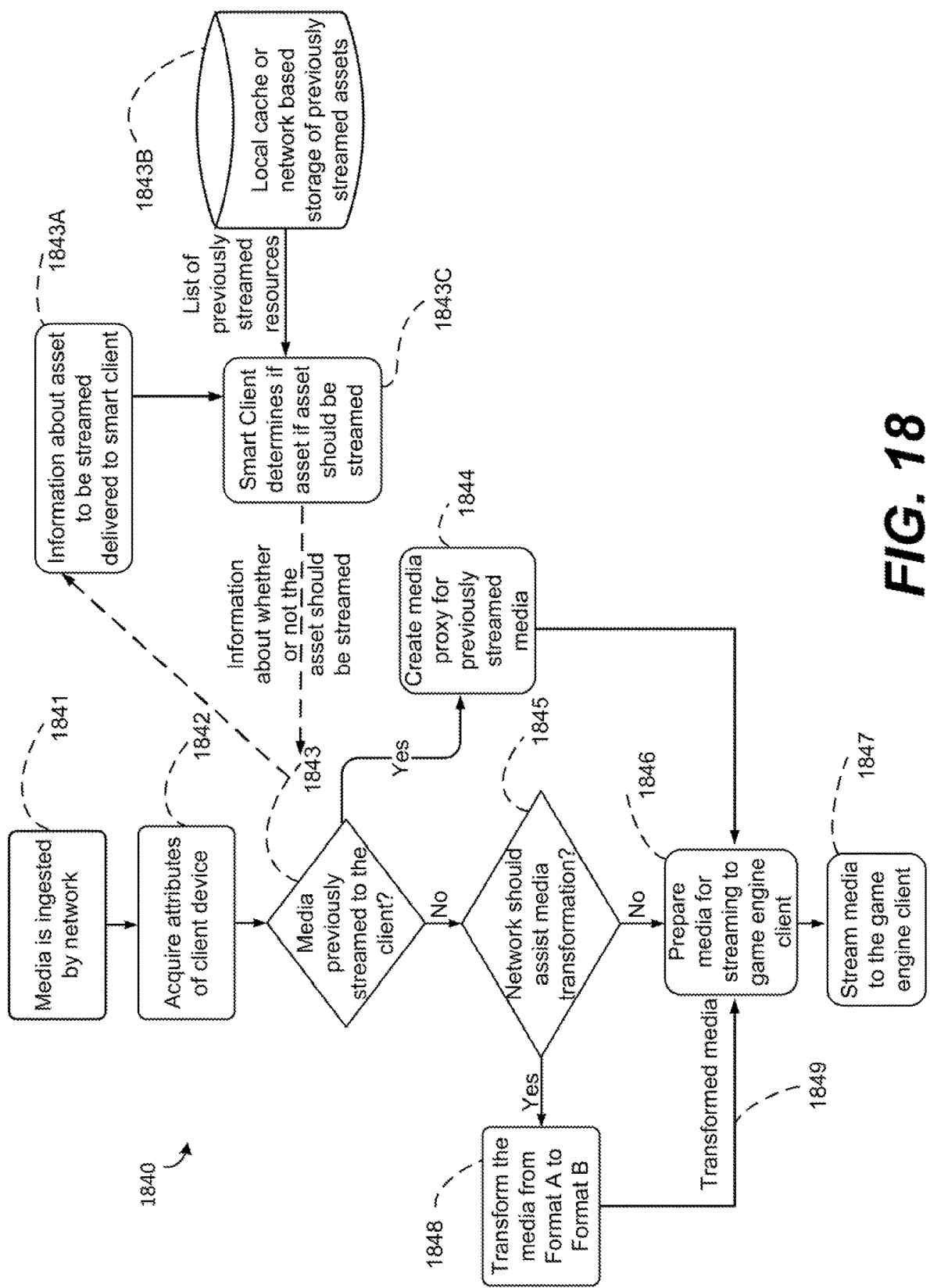
FIG. 18 is a diagram of asset reuse logic with the aid of a smart client in some examples.

FIG. 18 is a diagram of asset reuse logic with the aid of a smart client for game engine client process 1840 (also referred as process 1840). The process 1840 is similar to process 1730 as depicted in FIG. 17, but with the asset query logic process 1733 depicted in FIG. 17 implemented by an asset query logic 1843 shown in FIG. 18 to illustrate the role of a smart client of a client device in determining when particular assets are already accessible to the client device. Media is ingested into the network at process step 1841. A process step 1842 acquires attributes that describe the processing capabilities of targeted client (not depicted). The network then initiates an asset query logic 1843 to determine if a media asset needs to be streamed to the client device or not. A smart client process step 1843A receives information from the network (e.g., a network server process) concerning the media asset that is be needed for presentation. The smart client accesses information from a database (e.g., local cache, network storage accessible by the client device) 1843B to determine if the media asset in question is already accessible to the client device. A smart client process 2043C returns information to the network server's asset query logic 1843 regarding whether or not the media asset in question needs to be streamed. If the asset does not need to be streamed then process step 1844 creates a proxy for the media asset in question and inserts that proxy into the media to be prepared for streaming to the client device at a process step 1846. If the media asset does need to be streamed to the client device then a network server process step 1845 determines if the network needs to assist in any transformation of the media to be streamed to the client device. If such a transformation is required and that transformation needs to be performed by the network's available resources, then a network process 1848 performs the transformation. The transformed media 1849 is then provided to a process step 1846 to merge the transformed media into the media to be streamed to the client device. If at network process step 1845, the decision is made such that the network does not perform any such transformation of the media, then process step 1846 prepares the media with the original media asset to be streamed to the client device. Following the process step 1846, the media is streamed to the client device at process step 1847.

Figure 19:
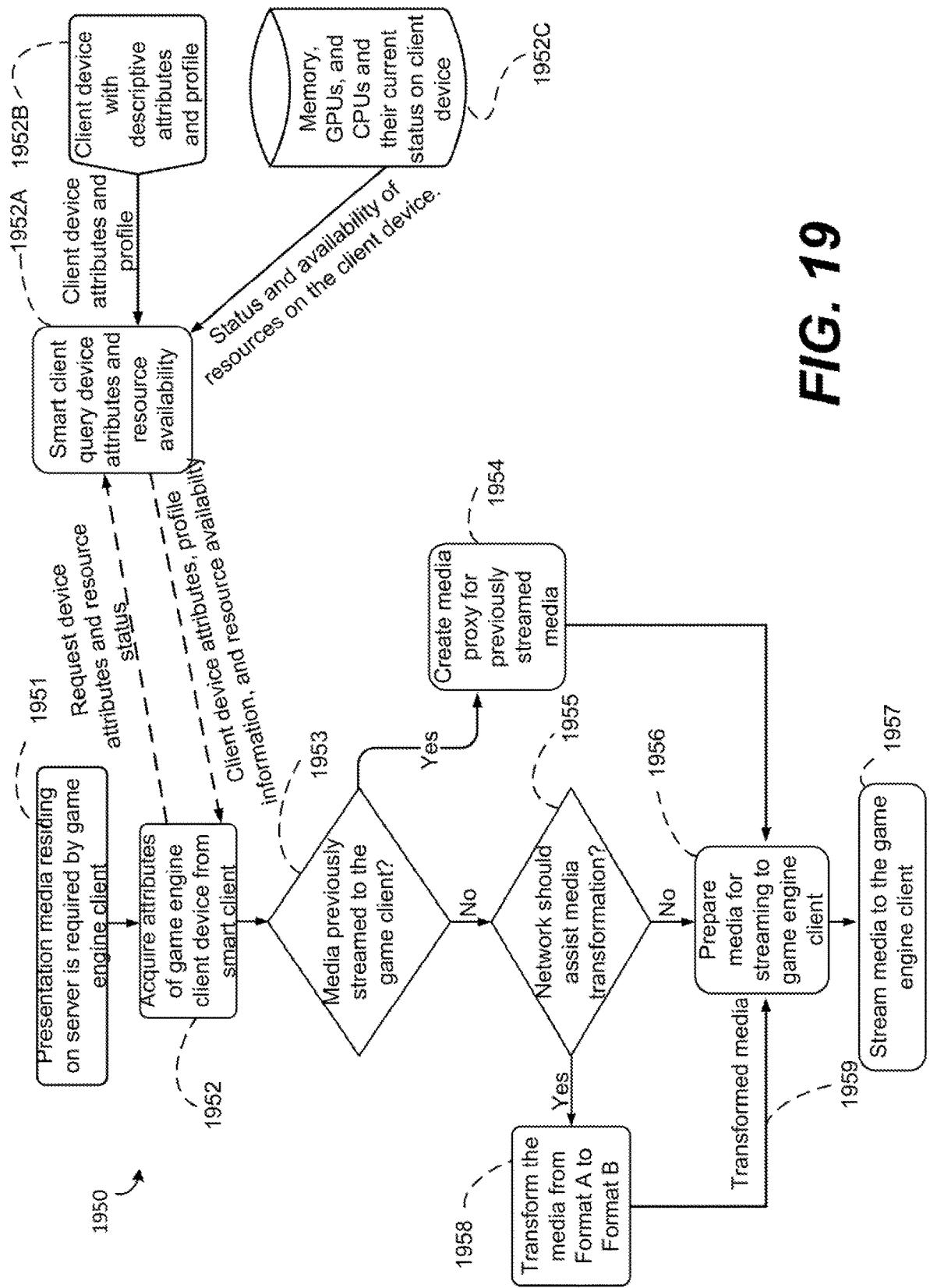
FIG. 19 shows a diagram of a process for device status and profile obtained with a smart client in some examples.

FIG. 19 shows a diagram of a process 1950 for device status and profile obtained with a smart client 1952A of a client device 1952B (e.g., with a game engine). The process 1950 is similar to process 1840 as depicted in FIG. 18, but with acquire attributes of client process 1842 depicted in FIG. 18 implemented by a process 1952 for acquiring attributes of the client device from the smart client to illustrate the role of the smart client in acquiring information about the client device's capabilities including its availability of resources to render the media. Media is ingested into the network at process and requested by a game engine client device (not shown) at process step 1951. A process 1952 initiates a request to the smart client to acquire device attributes and resource status of the client device. For example, the smart client 1952A initiates queries to the client device 1952B and to its additional resources (if any) 1952C to retrieve descriptive attributes about the client device and information about its resources, including resource availability to process future work, respectively. The client device 1952B delivers client device attributes that describe the processing capabilities of the client device (e.g., targeted client device for the ingested media). Status and availability of resources on the client device is returned to the smart client 1952A from the additional resources 1952C. The network then initiates asset query logic 1953 to determine if an asset (media asset) needs to be streamed to the client device or not. If the asset does not need to be streamed then a process step 1954 creates a proxy for the asset in question and inserts that proxy into the media to be prepared for streaming to the client device at a process step 1956. If the asset does need to be streamed to the client device then network server process step 1955 determines if the network needs to assist in any transformation of the media to be streamed to the client, if such a transformation is required. If such a transformation is required and that transformation needs to be performed by the network's available resources, then a network process step 1958 performs the transformation. The transformed media 1959 is then provided to the process step 1956 to merge the transformed media into the media to be streamed to the client device. If at the network process step 1955 the decision is made such that the network does not need to perform any such transformation of the media, then the process step 1956 prepares the media with the original media asset to be streamed to the client device. Following the process step 1956, the media is streamed to the client device at a process step 1957.

Figure 20:
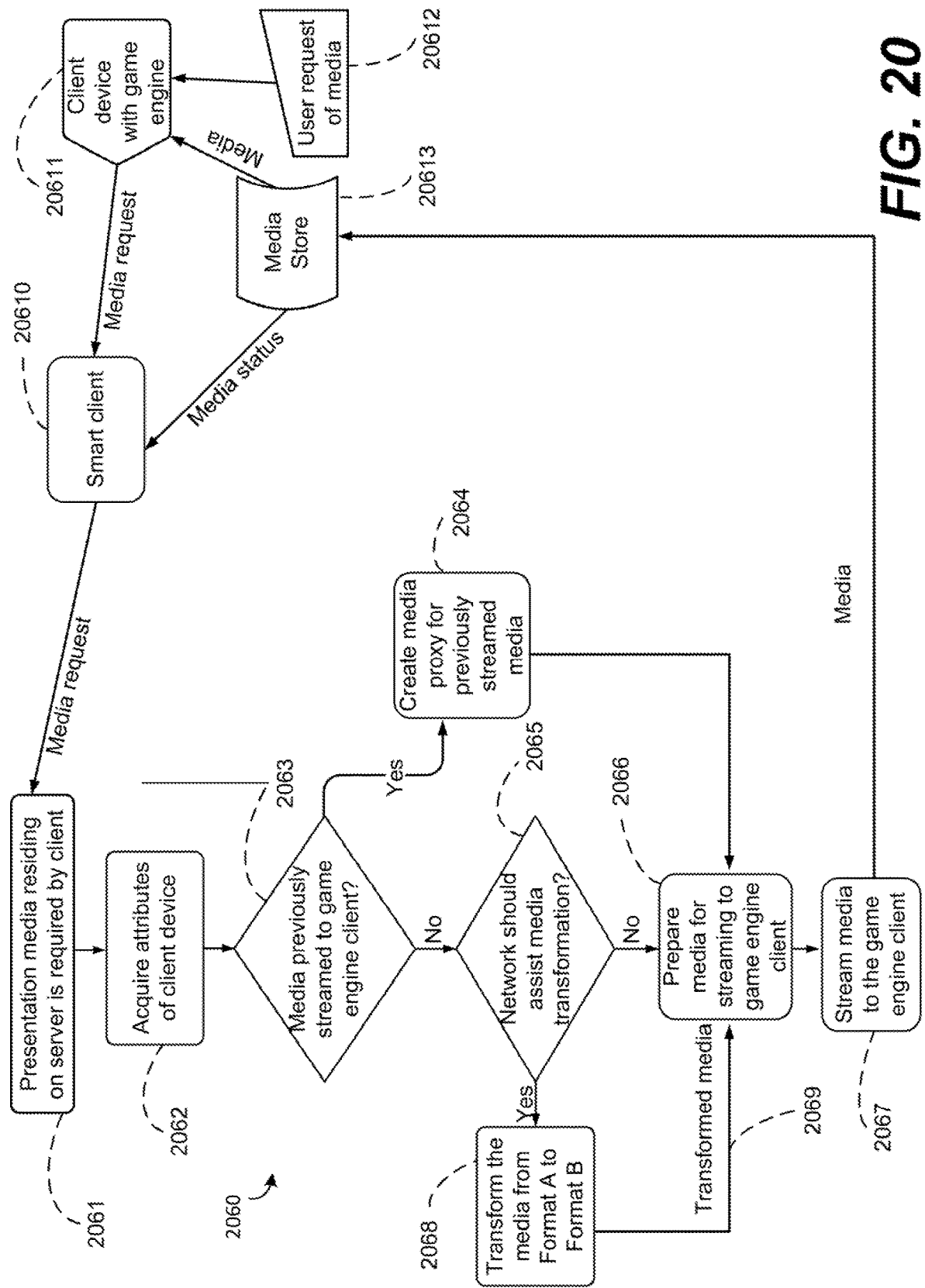
FIG. 20 shows a diagram of a process for illustrating a smart client in a client device requesting and receiving media streamed from the network on behalf of game engine of the client device.

FIG. 20 shows a diagram of a process 2060 for illustrating a smart client in a client device requesting and receiving media streamed from the network on behalf of game engine of the client device. The process 2060 is similar to the process 1950 as depicted in FIG. 19 or the process 1730 in FIG. 17, but with the request and receipt of media managed by the smart client 20610 on behalf of the client device 20611 explicitly added. In FIG. 20, a user requests a particular media at a process step 20612. The request is received by the client device 20611. The client device 20611 forwards the request for the media to the smart client 20610. The smart client 20610 forwards the media request to a server in a process step 2061. The server in the process step 2061 receives the media request. In the process step 2062, the server initiates the steps to acquire device attributes and resource status (exact steps to acquire attributes and resource status not shown). Status and availability of resources on the client device are returned to the server at the process step 2062. The network (e.g., server) then initiates asset query logic 2063 to determine if an asset (media asset) needs to be streamed to the client device or not. If the asset does not need to be streamed then a process step 2064 creates a proxy for the asset in question and inserts that proxy into the media to be prepared for streaming to the client device at a process step 2066. If the asset does need to be streamed to the client device, then the network server, at a process step 2065, determines if the network needs to assist in any transformation of the media to be streamed to the client device, if such a transformation is required. If such a transformation is required and that transformation needs to be performed by the network's available resources, then network (e.g., a network server) at a process step 2068 performs the transformation. The transformed media 2069 is then provided to a process step 2066 to merge the transformed media into the media to be streamed to the client device. If at network process 2065 the decision is made such that the network does not perform any such transformation of the media, then the process step 2066 prepares the media with the original media asset to be streamed to the client device. Following the process step 2066, the media is streamed to the client device at process 2067. In some examples, the media arrives at a media store 20613 that is accessible to the client device 20611. The client device 20611 accesses the media from media store 20613. The media store 20613 can be in the client device 20611 in an example. In another example, the media store 20613 is external of the client device 20611, such as in a device within a same local network with the client device 20611, and the client device 20611 can access the media store 20613.

Figure 21:
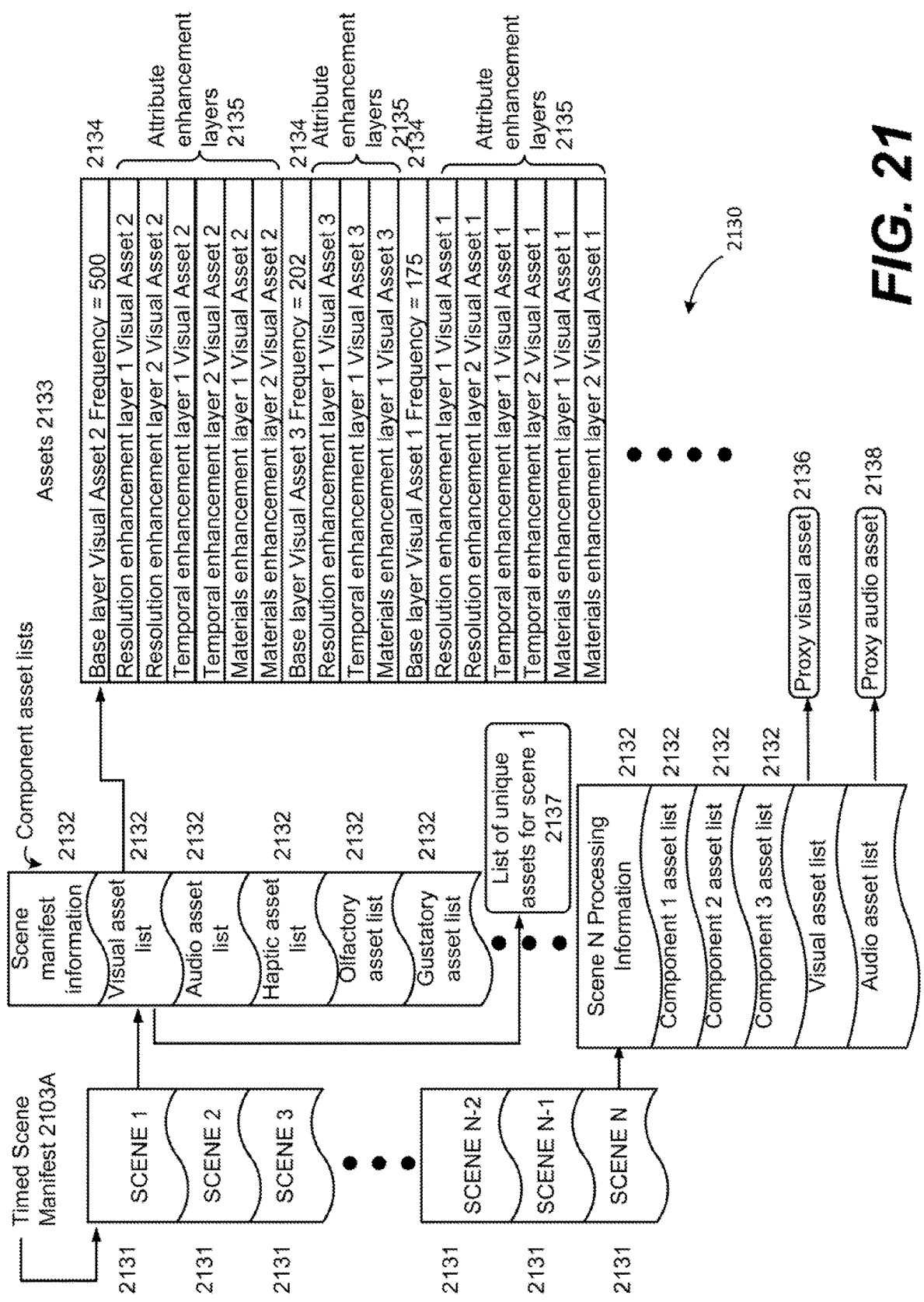
FIG. 21 shows a diagram of a timed media representation ordered by descending frequency in some examples.

FIG. 21 shows a diagram 2130 of a timed media representation ordered by descending frequency in some examples. The timed media representation is similar to the timed media representation depicted in FIG. 3, however, the assets in the timed media representation in the diagram 2130 of FIG. 21 are ordered in the list by asset type and descending frequency values within each asset type. Specifically, a timed scene manifest 2103A includes a list of scene information 2131. A scene information 2131 refers to a list of components 2132 that separately describe processing information and types of media assets in the scene information 2131. The components 2132 refer to assets 2133 that further refer to base layers 2134 and attribute enhancement layers 2135. In the FIG. 21 example, each of the base layers 2134 are ordered according to descending values for the corresponding frequency metrics. A list of unique assets that have not been previously used in other scenes is provided in 2137. Proxy visual asset 2136 includes information of reused visual asset, and proxy audio asset 2138 includes information of reused audio asset.

In some examples, ordering by the descending frequency can allow a client device to process the media asset with high frequency reuse first in order to reduce delay.

Figure 22:
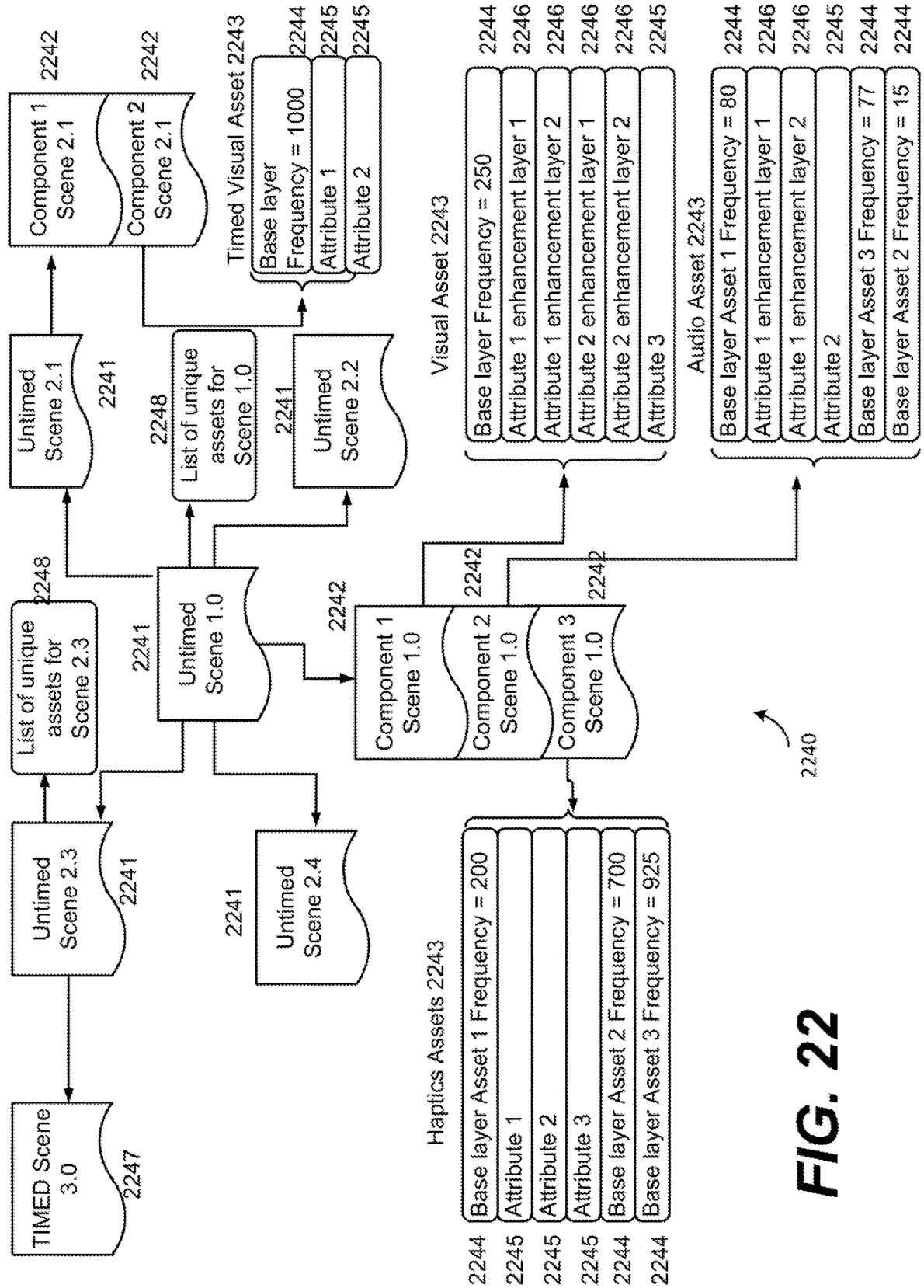
FIG. 22 shows a diagram of an untimed media representation ordered by frequency in some examples.

FIG. 22 shows a diagram 2240 of an untimed media representation ordered by frequency in some examples. The untimed media representation is similar to the untimed media representation depicted in FIG. 4, however, the assets in the untimed media representation in the diagram 2240 of FIG. 22 are ordered in the list by asset type and frequency values within each asset type. An untimed scene manifest (not depicted) references a scene 1.0 for which there is no other scene that can branch to scene 1.0. Scene information 2241 of the scene 1.0 is not associated with a start and end duration according to a clock. The scene Information 2241 also refers to a list of components 2242 that separately describe processing information and types of media assets in the scene information 2241. The components 2242 refer to assets 2243 that further refer to base layers 2244 and attribute enhancement layers 2245 and 2246. In FIG. 22 example, each of the base layers 2244 refer to a numeric frequency value that indicates the number of times the asset is used across the set of scenes in the presentation. For example, haptic assets 2243 are organized by increasing frequency values, while audio assets 2243 are organized by decreasing frequency values. Furthermore, the scene information 2241 refers to other scene information 2241 that are for untimed media. The scene information 2241 also refers to the scene information 2247 that is for a timed media scene. Lists 2248 identify unique assets associated with a particular scene that have not been previously used in higher order (e.g., parent) scenes.

It is noted that, the ordering by frequency in the present disclosure is for illustration, the assets can be order by any suitable increasing/decreasing frequency values in order to optimize media distribution. In some examples, the ordering of the assets is determined according to client device's processing capability, resources and optimization strategy that can be provided to the network in a feedback signal from the client device to the network.

Figure 23:
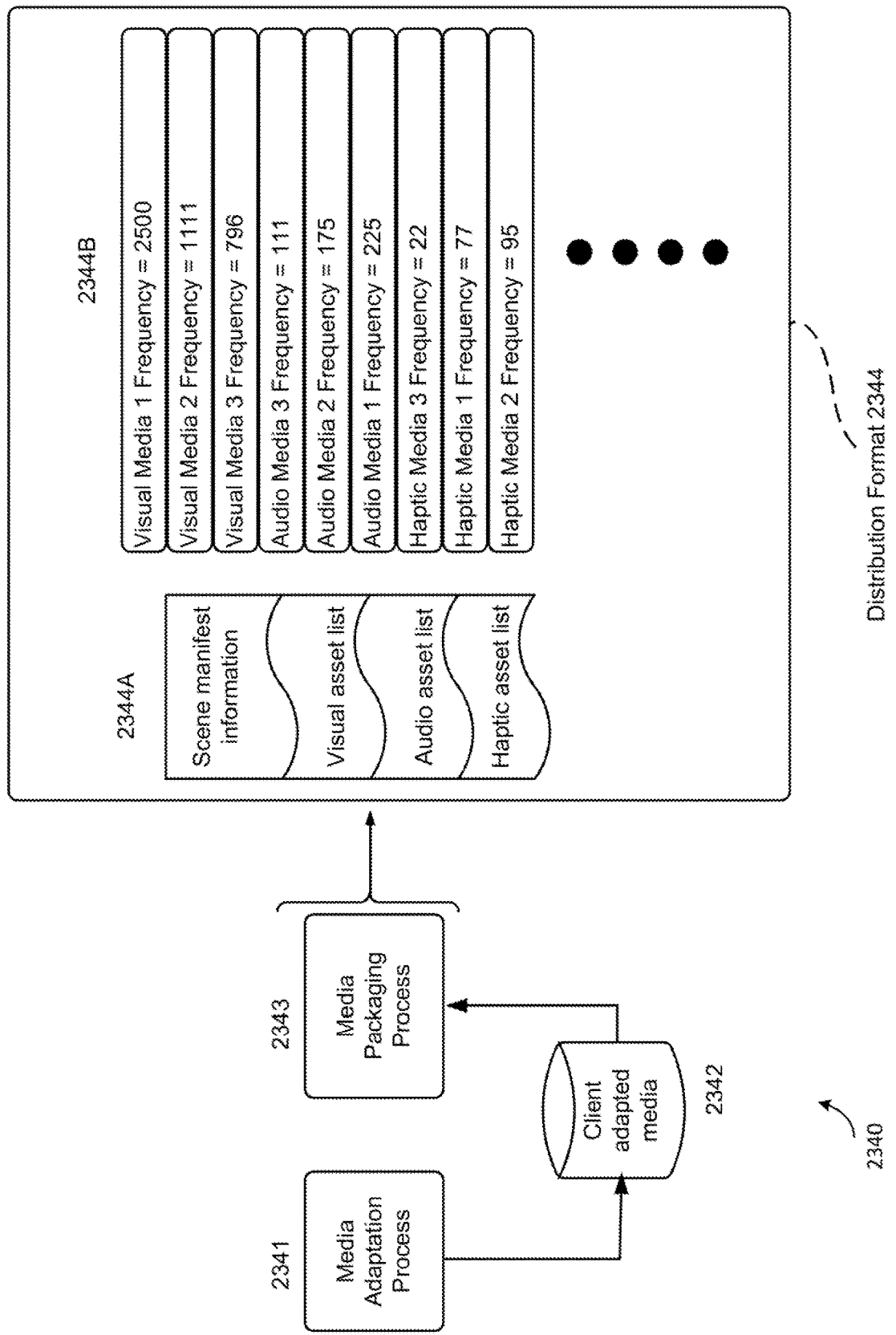
FIG. 23 shows a process of a distribution format creation with ordered frequency in some examples.

FIG. 23 shows a process 2340 of a distribution format creation with ordered frequency. The process 2340 is similar to the process 1100 in FIG. 11, which illustrates a network formatting the same adapted source media into a data model suitable for representation and streaming. However, the resulting distribution format shown in process 2340 illustrates that the assets are ordered first by asset type and then by the frequency by which the assets are used across the entire presentation, e.g., in either ascending or descending frequency values based on asset type.

In FIG. 23, an adapted media packaging process 2343 packages media from media adaptation process 2341 (depicted as process 1000 in FIG. 10) now residing on a storage device 2342 that is configured to store client adapted media (adapted media for client). The packaging process 2343 formats the adapted media from the process 2341 into a robust distribution format 2344 for example, the exemplary formats shown in FIG. 3 or FIG. 4. Manifest information 2344A provides the client device with a list of scene data assets 2344B that it can expect to receive as well as optional metadata indicating the frequency by which all assets are used across the set of scenes in the entire presentation. List 2344B depicts a list of visual assets, audio assets, and haptic assets, each with their corresponding metadata. In the FIG. 23 example, the packaging process 2343 orders the assets in 2344B, i.e., visual assets in 2344B are ordered by decreasing frequency, while audio and haptic assets in 2344B are ordered by increasing frequency.

Figure 24:
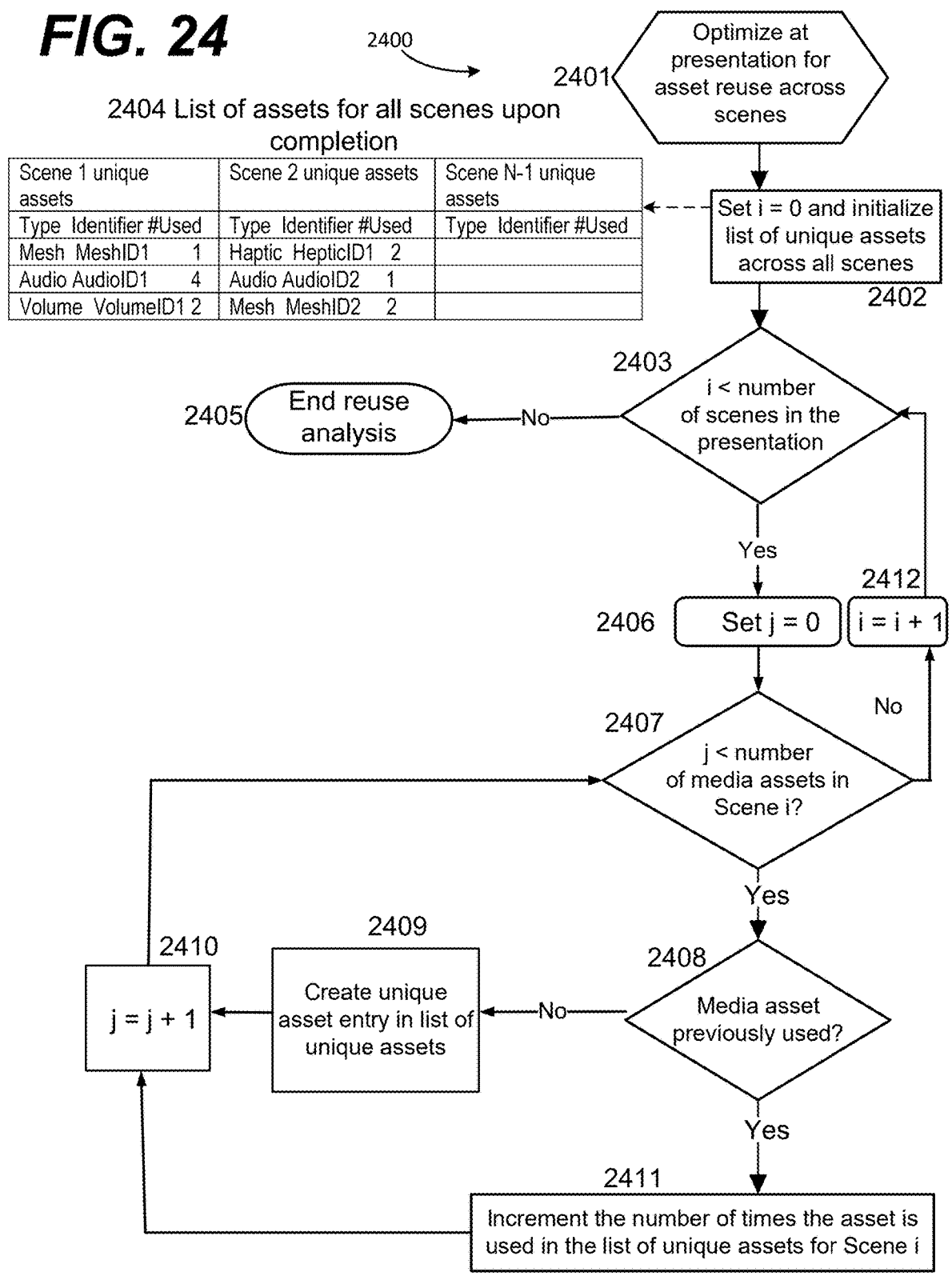
FIG. 24 shows a flow chart of a logic flow for a media reuse analyzer in some examples.

FIG. 24 shows a flow chart 2400 of a logic flow (a process) for a media reuse analyzer, such as the media reuse analyzer 911 depicted in FIG. 9. The process starts at a step 2401 to optimize a presentation for asset reuse across scenes. A step 2402 initializes iterator "i" to zero, and further initializes a set of lists 2404 (one list for each scene) that identify unique assets encountered across all scenes in a presentation as depicted in FIG. 3 or FIG. 4. Lists 2404 depict sample list entries of information describing assets that are unique with respect to the entire presentation, including an indicator for the type of media (e.g., Mesh, Audio, or Volume) of the asset, a unique identifier for the asset, and the number of times that the asset is used across the set of scenes in the presentation. As an example, for scene N-1, there are no assets included in its list because all assets that are required for scene N-1 have been identified as assets that are also used in scenes 1 and scene 2. A step 2403 determines if iterator "i" is less than the total number of scenes in the presentation (as depicted in FIG. 3 or FIG. 4). If iterator "i" is equal to the number of scenes N in the presentation, then the reuse analysis is terminated at a step 2405. Otherwise, if iterator "i" is less than the total number of scenes, process continues to a step 2406 where iterator "j" is set to zero. Step 2407 tests iterator "j" to determine if iterator "j" is less than the total number of media assets (also referred to as media objects) in the current scene "i". If iterator "j" is less than the total number of media assets for scene "i", then process continues to step 2408. Otherwise, process continues to step 2412 where iterator "i" is incremented by 1 before returning to step 2403. If the value of "j" is less than the total number of assets for scene "i", process continues to a conditional step 2408 where the features of the media asset are compared to assets previously analyzed from scenes prior to current scene "i". If the asset has been identified as an asset used in a scene prior to scene "i", then the number of times (e.g., the frequency) the asset has been used across scenes 0 to N-1 is incremented by 1 in step 2411. Otherwise, if the asset is a unique asset, i.e., it has not previously been analyzed in scenes associated with smaller values of iterator "i", then a unique asset entry is created in the list 2404 for scene "i" at step 2409. Step 2409 also creates and assigns a unique identifier to the entry for the asset, and the number of times that the asset has been used across scenes 0 to N-1 is set to 1. Following step 2409, process continues to step 2410 where iterator "j" is incremented by 1. Following step 2410, process returns to step 2407.

Figure 25:
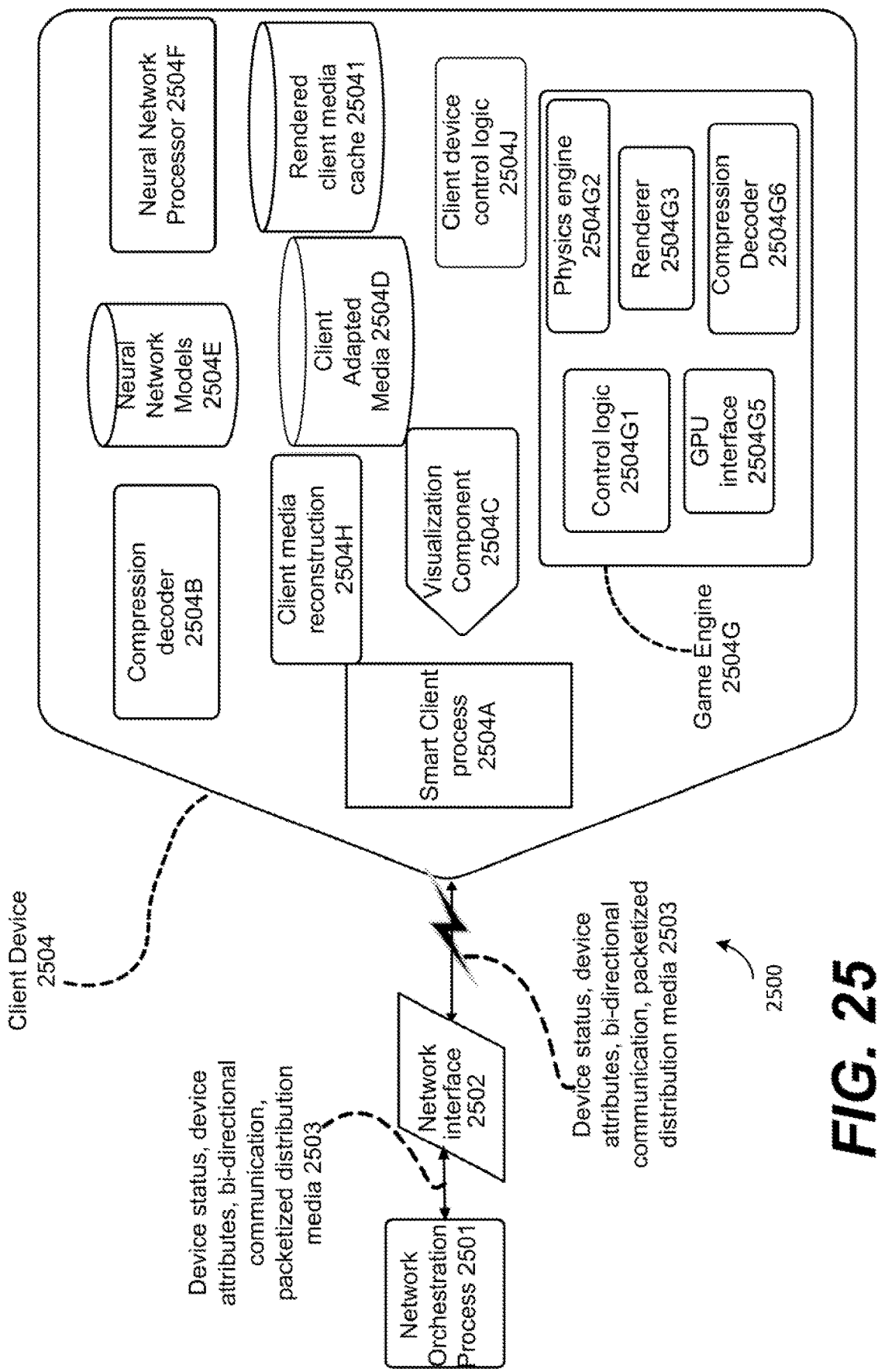
FIG. 25 shows a diagram of network processes communicating with a smart client and a game engine in a client device in some examples.

FIG. 25 shows a diagram 2500 of network processes communicating with a smart client and a game engine in a client device. A network orchestration process 2501 conveys information and media to and receives status updates and other information 2503 via a network interface process 2502. Likewise the network interface process 2502 conveys information and media to and receives status updates and other information from a client device 2504. The client device 2504 depicts a particular embodiment of a game engine client device. A smart client 2504A serves as the primary interface between the network and other media-related processes and/or components in the client device 2504. For example, the smart client 2504A can employ game engine APIs and callback functions (not shown) to interact with game engine 2504G. In some examples, the smart client 2504A may be responsible for reconstructing the streamed media conveyed in 2503 prior to invoking game engine APIs (not shown) that are managed by game engine control logic 2504G1 to cause the game engine 2504G to process the reconstructed media. In such examples, the smart client 2504A may utilize client media reconstruction process 2504H which may in turn utilize compression decoder process 2504B. In some other examples, the smart client 2504A may be responsible only for reconstructing the packetized media streamed in 2503 prior to invoking game engine APIs (not shown) to cause the game engine 2504G to both decompress and process the media. In such examples, the game engine 2504G may employ the compression decoder 2504G6 to decompress the media. Upon receiving reconstructed media and optionally decompressing the media (e.g., the media may have been decompressed on behalf of the client device via the smart client 2504A), then the game engine control logic 2504G1 may employ GPU interface 2504G5 to render the media via renderer process 2504G3. If the rendered media is animated, then physics engine 2504G2 may be employed by the game engine control logic 2504G1 to simulate laws of physics in the animation of the scene.

Throughout the processing of the media by the client device 2504, neural network models 2504E may be employed to guide the operations performed by the client device. For example, in some cases the reconstruction process 2504H may need to employ neural network models 2504E and neural network processors 2504F to fully reconstruct the media. Likewise, the client device 2504 may be configured via client device control logic 2504I to cache the media received from the network after it has been reconstructed and or cache the media once it has been rendered. In such an embodiment, the client adapted media cache 2504D may be utilized to store the reconstructed client media, and the rendered client media cache 2504I may be utilized to store the rendered client media. Further, the client device control logic 2504J may be responsible for the completing the presentation of the media on behalf of the client device 2504. In such an embodiment, visual component 2504C may be responsible for creating the final visual presentation by the client device 2504.

Figure 26:
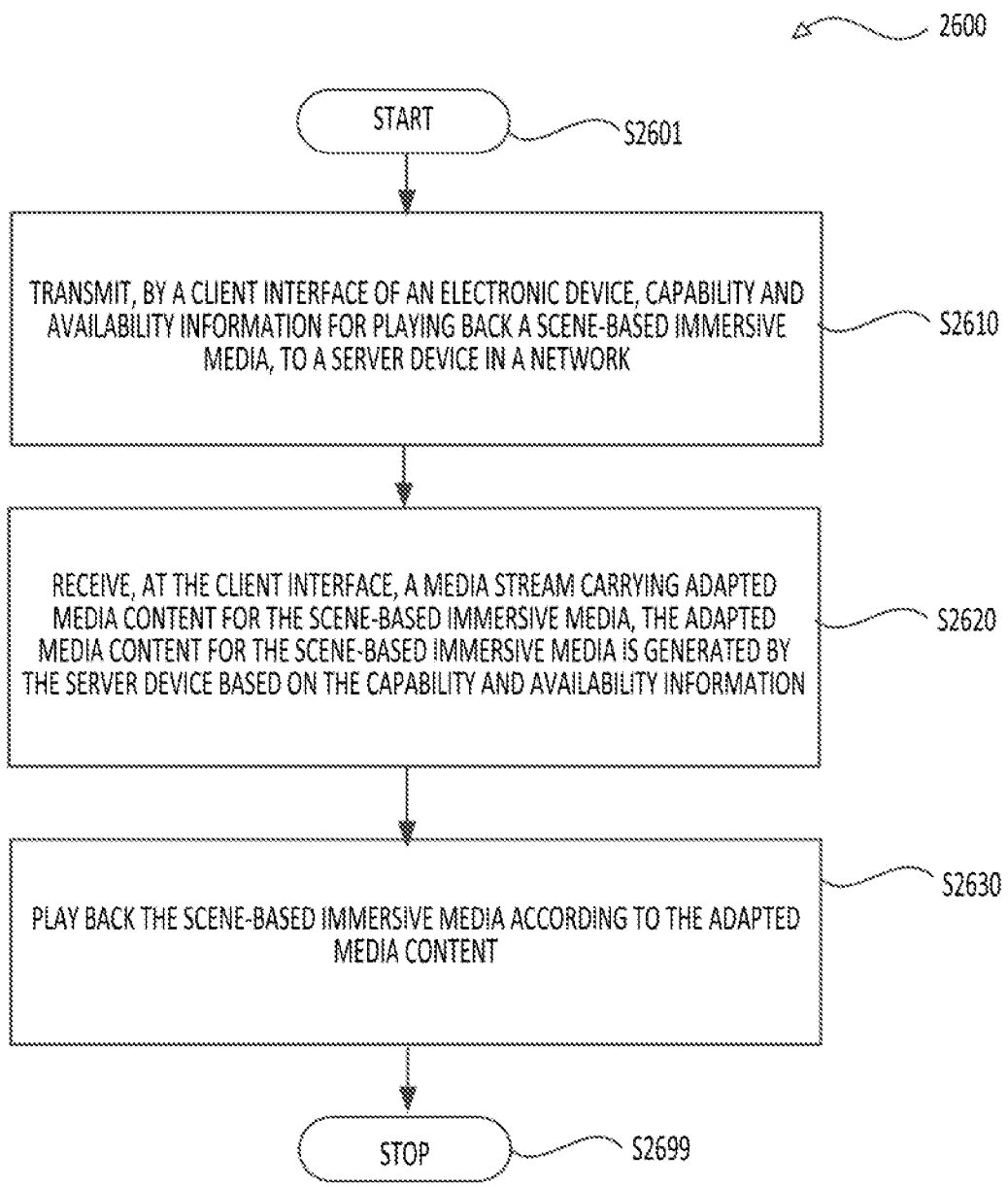
FIG. 26 shows a flow chart outlining a process according to an embodiment of the disclosure.

FIG. 26 shows a flow chart outlining a process 2600 according to an embodiment of the disclosure. The process 2600 can be executed in an electronic device, such as a client device with a smart client for interfacing the client device with a network. In some embodiments, the process 2600 is implemented in software instructions, thus when processing circuitry executes the software instructions, the processing circuitry performs the process 2600. For example, the smart client is implemented in software instructions, the software instructions can be executed by processing circuitry to perform a smart client process that can include the process 2600. The process starts at S2601, and proceeds to S2610.

At S2610, a client interface (e.g., a smart client) of the electronic device sends to a server device in a network, capability and availability information for playing back a scene-based immersive media at the electronic device.

At S2620, the client interface receives a media stream carrying adapted media content for the scene-based immersive media, the adapted media content is generated from the scene-based immersive media by the server device based on the capability and availability information.

At S2630, the scene-based immersive media is played back at the electronic device according to the adapted media content.

In some examples, the client interface determines, from the adapted media content, that a first media asset associated with a first scene is received for a first time and is to be reused in one or more scenes. The client interface can cause the first media asset to be stored in a cache device that is accessible by the electronic device.

In some examples, the client interface can extract a first list of unique assets in the first scene from the media stream. The first list identifies the first media asset as a unique asset in the first scene and to be reused in one or more other scenes.

In some examples, the client interface can send a signal to the server device, the signal is indicative of an availability of the first media asset at the electronic device. The signal causes the server device to use a proxy to substitute for the first media asset in the adapted media content.

In some examples, to play back the scene-based immersive media, the client interface determines according to the proxy in the adapted media content, that the first media asset is previously stored in the cache device. The client interface can access the cache device to retrieve the first media asset.

In an example, the client interface receives, from the server device, a query signal for the first media asset, and transmits, in response to the query signal, the signal indicative of the availability of the first media asset at the electronic device when the first media asset is stored in the cache device.

In some examples, the client interface receives, from the server device a request to acquire device attribute and resource status. The client interface queries, one or more internal components of the electronic device and/or one or more external components associated with the electronic device for attributes of the electronic device and resource availability for processing the scene-based immersive media. The client interface can transmit the received information from the internal components of the electronic device and the external components associated with the electronic device, such as the attributes of the electronic device and the resource availability of the electronic device, to the server device.

In some examples, the electronic device receives a request of the scene-based immersive media from a user interface, and the client interface forwards the request of the scene-based immersive media to the server device.

In some examples, to play back the scene-based immersive media, under a control of the client interface, a reconstructed scene-based immersive media is generated based on decoding of the media stream and media reconstruction. Then, the reconstructed scene-based immersive media is provided, via an application programing interface (API) of a game engine of the electronic device, to the game engine for playing back.

In some other examples, the client interface depacketizes the media stream to generate depacketized media data. The depacketized media data is provided to the game engine via an application programing interface (API) of a game engine of the electronic device. The game engine then generates a reconstructed scene-based immersive media for playing back based on the depacketized media data.

Then, the process 2600 proceeds to S2699 and terminates.

The process 2600 can be suitably adapted to various scenarios and steps in the process 2600 can be adjusted accordingly. One or more of the steps in the process 2600 can be adapted, omitted, repeated, and/or combined. Any suitable order can be used to implement the process 2600. Additional step(s) can be added.

Figure 27:
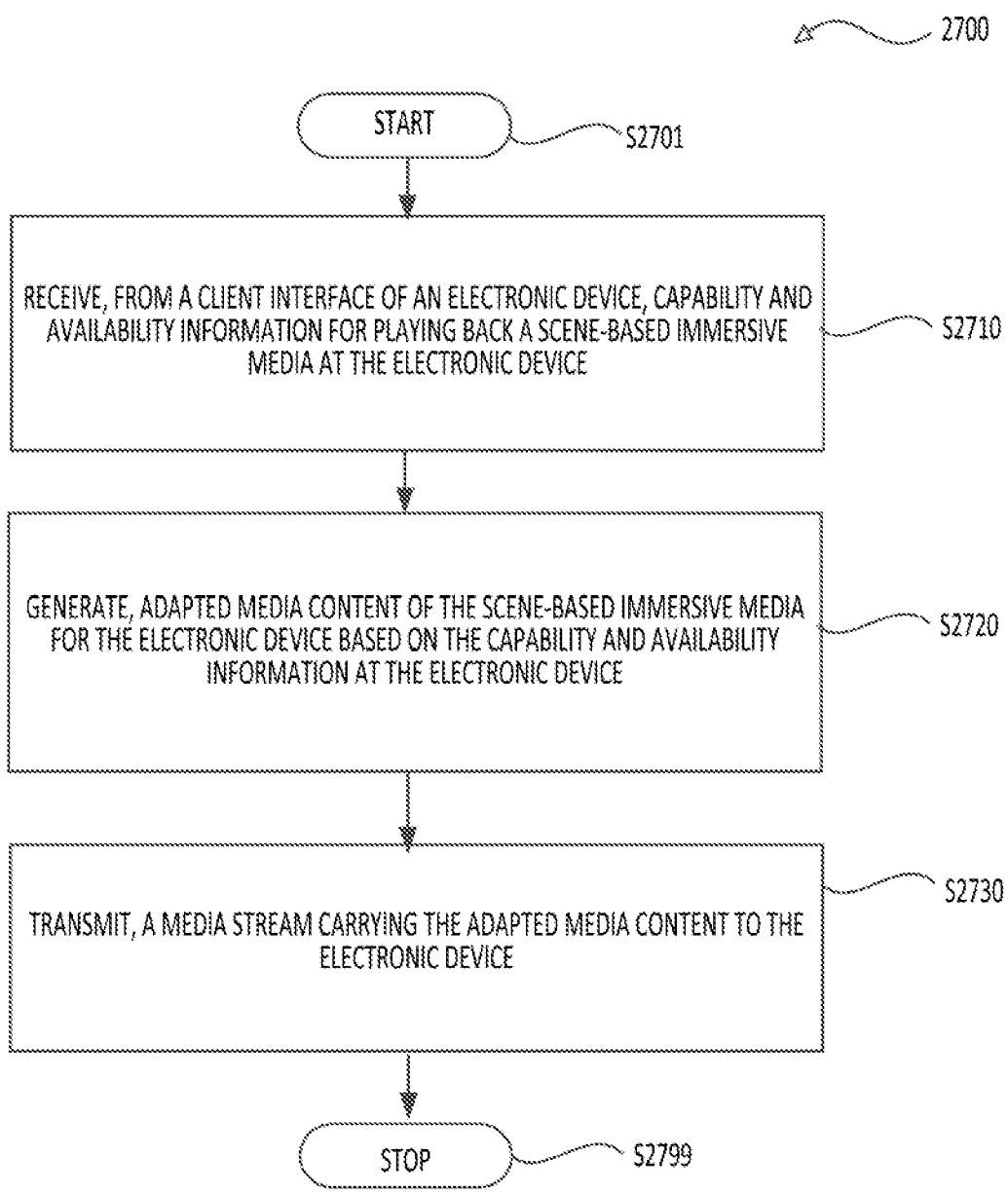
FIG. 27 shows a flow chart outlining a process according to an embodiment of the disclosure.

FIG. 27 shows a flow chart outlining a process 2700 according to an embodiment of the disclosure. The process 2700 can be executed in a network, such as a server device in a network. In some embodiments, the process 2700 is implemented in software instructions, thus when processing circuitry executes the software instructions, the processing circuitry performs the process 2700. The process starts at S2701, and proceeds to S2710.

At S2710, the server device receives, from a client interface of an electronic device, capability and availability information for playing back a scene-based immersive media at the electronic device.

At S2720, the server device generates, adapted media content of the scene-based immersive media for the electronic device based on the capability and availability information at the electronic device.

At S2730, the server device transmits, a media stream carrying the adapted media content to the electronic device (e.g., the client interface of the electronic device).

In some examples, the server device determines that a first media asset in a first scene has been streamed to the electronic device previously, and replaces the first media asset in the first scene with a proxy that is indicative of the first media asset.

In some examples, the server device extracts a list of unique assets for each scene.

In some examples, the server device receives a signal indicative of an availability of the first media asset at the electronic device. In an example, the signal is sent from the client interface of the client device. The server device then replaces the first media asset in the first scene with a proxy that is indicative of the first media asset.

In some examples, the server device transmits a query signal for the first media asset to the client device, and receives, in response to the query signal, the signal indicative of the availability of the first media asset at the electronic device.

In some examples, the server device transmits a request to acquire device attribute and resource status, and then receives the attributes of the electronic device and the capability and availability information.

Then, the process 2700 proceeds to S2799 and terminates.

The process 2700 can be suitably adapted to various scenarios and steps in the process 2700 can be adjusted accordingly. One or more of the steps in the process 2700 can be adapted, omitted, repeated, and/or combined. Any suitable order can be used to implement the process 2700. Additional step(s) can be added.

According to second aspects of the disclosure, various techniques disclosed in the present disclosure are used for streaming of scene-based immersive media in which the substitution of user-provided visual assets in place of content-producer-provided visual assets enables the presentation of a more personalized media experience to an end-user. In some examples, a smart client in a client device is implemented with some of the techniques, the smart client may be embodied by one or more processes, with one or more channels of communication implemented between client device processes and network server processes. In some examples, metadata in an immersive media stream can signal the availability of a visual asset that is suitable for exchange with a user-provided visual asset. The client device can access a repository of user-provided assets, each of such assets annotated with metadata to assist with a substitution process. The client device can furthermore employ an end-user interface to enable the loading of user-provided visual assets into an accessible cache (also referred to as user-provided media cache) for subsequent substitution into scene-based media presentations streamed from a server device in a network.

According to third aspects of the disclosure, various techniques disclosed in the present disclosure are used for streaming of scene-based immersive media in which the substitution of user-provided nonvisual assets (e.g., audio, somatosensory, olfactory) in place of content-producer-provided (also known as "system") nonvisual assets enables the presentation of a more personalized media experience to an end-user. In some examples, a smart client in a client device is implemented with some of the techniques, the smart client may be embodied by one or more processes, with one or more channels of communication implemented between client device processes and network server processes. In some examples, metadata in an immersive media stream is used to signal the availability of a nonvisual asset that is suitable for exchange with a user-provided nonvisual asset. In some examples, the smart client can access a repository of user-provided assets, each of such assets annotated with metadata to assist with the substitution process. The client device may furthermore employ an end-user interface to enable the loading of user-provided nonvisual assets into a client-accessible, user-provided media cache for subsequent substitution into scene-based media presentations streamed from the network server.

Figure 28:
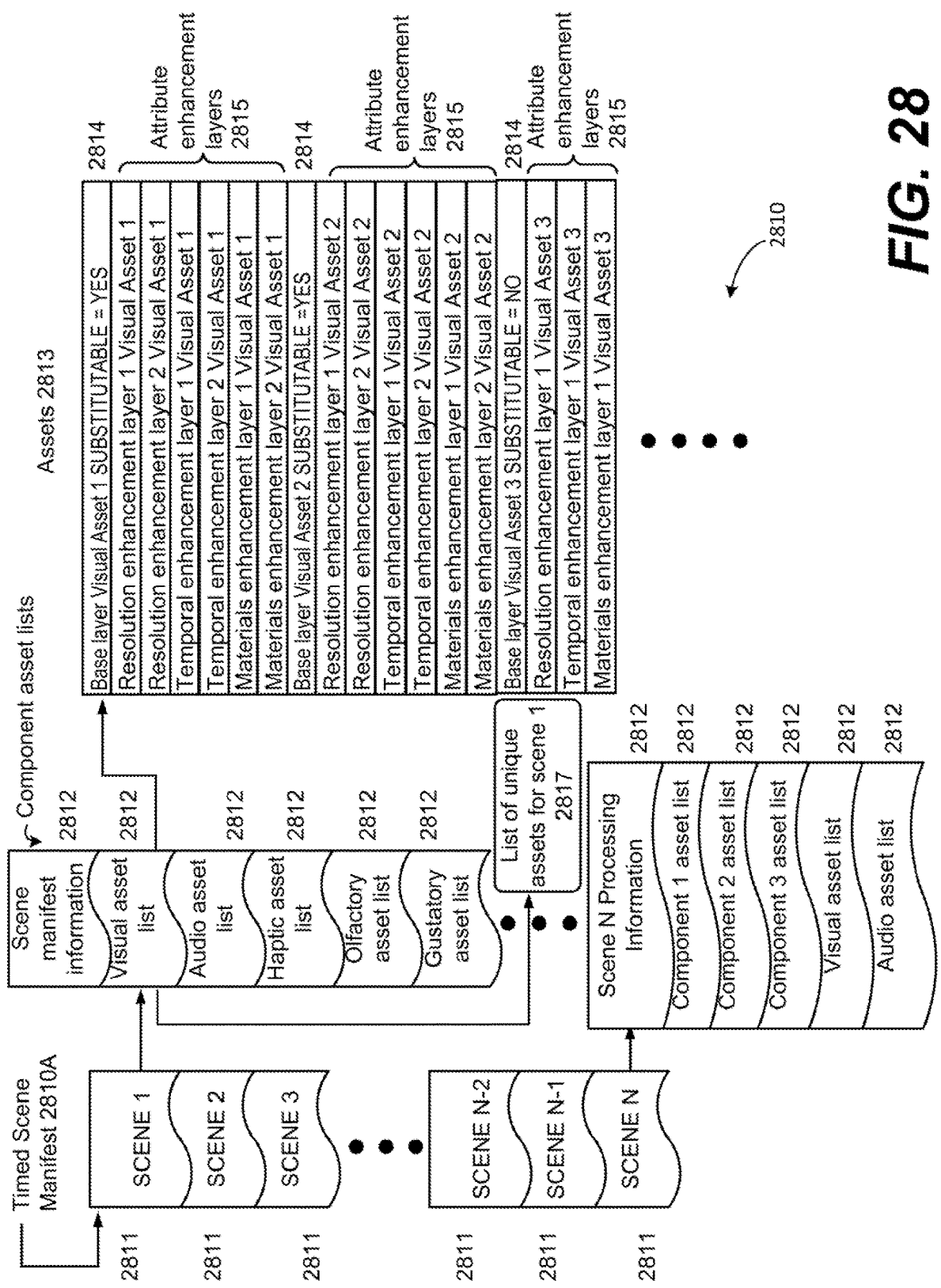
FIG. 28 shows a diagram of a timed media representation with signaling of substitution for visual assets in some examples.

FIG. 28 shows a diagram of a timed media representation 2810 with signaling of substitution for visual assets in some examples. The timed media representation 2810 includes a timed scene manifest 2810A that includes information of a list of scenes 2811. A scene 2811 refers to a list of components 2812 that separately describe processing information and types of media assets in the scene 2811. The components 2812 refer to assets 2813 that further refer to base layers 2814 and attribute enhancement layers 2815. The base layers 2814 for visual assets are provisioned with metadata to indicate that the corresponding asset is or is not a candidate to be substituted by a user-provided asset (not shown). A list of assets 2817 that have not been previously used in other scenes 2811 (e.g., prior scenes) is provided for each scene 2811.

In the FIG. 28 example, the base layer for visual asset 1 indicates that the visual asset 1 is substitutable; the base layer for visual asset 2 indicates that the visual asset 2 is substitutable; and the base layer for visual asset 3 indicates that the visual asset 3 is non substitutable.

Figure 29:
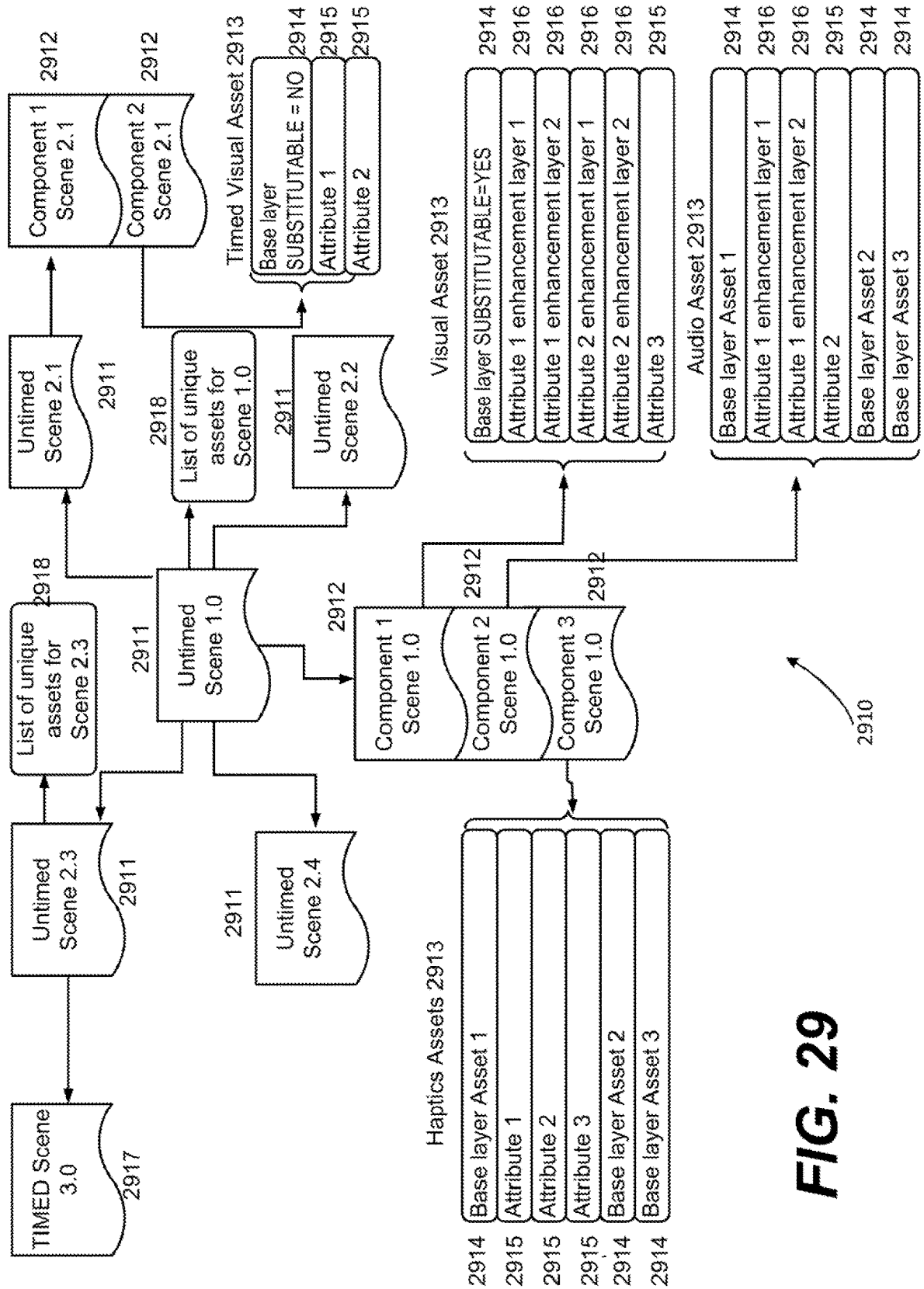
FIG. 29 shows a diagram of an untimed media representation with signaling of substitution of visual assets in some examples.

FIG. 29 shows a diagram of an untimed media representation 2910 with signaling of substitution of visual assets in some examples. In some examples, an untimed scene manifest (not depicted) references a Scene 1.0 for which there is no other scene that can branch to Scene 1.0. The scenes information 2911 in FIG. 29 are not associated with a start and end duration according to a clock. A scene information 2911 refers to a list of components 2912 that separately describe processing information and types of media assets of the scene. The components 2912 refer to assets 2913 that further refer to base layers 2914 and attribute enhancement layers 2915 and 2916. Assets 2913 of type "visual" are further provisioned with metadata to indicate that the corresponding asset is or is not a candidate to be substituted by a user-provided asset (not shown). Furthermore, a scene information 2911 can refer to other scenes information 2911 that are for untimed media. A scene Information 2911 can also refer to a scene information 2917 that is for a timed media scene. Lists 2918 identify unique assets associated with a particular scene that have not been previously used in higher order (e.g., parent) scenes.

Figure 30:
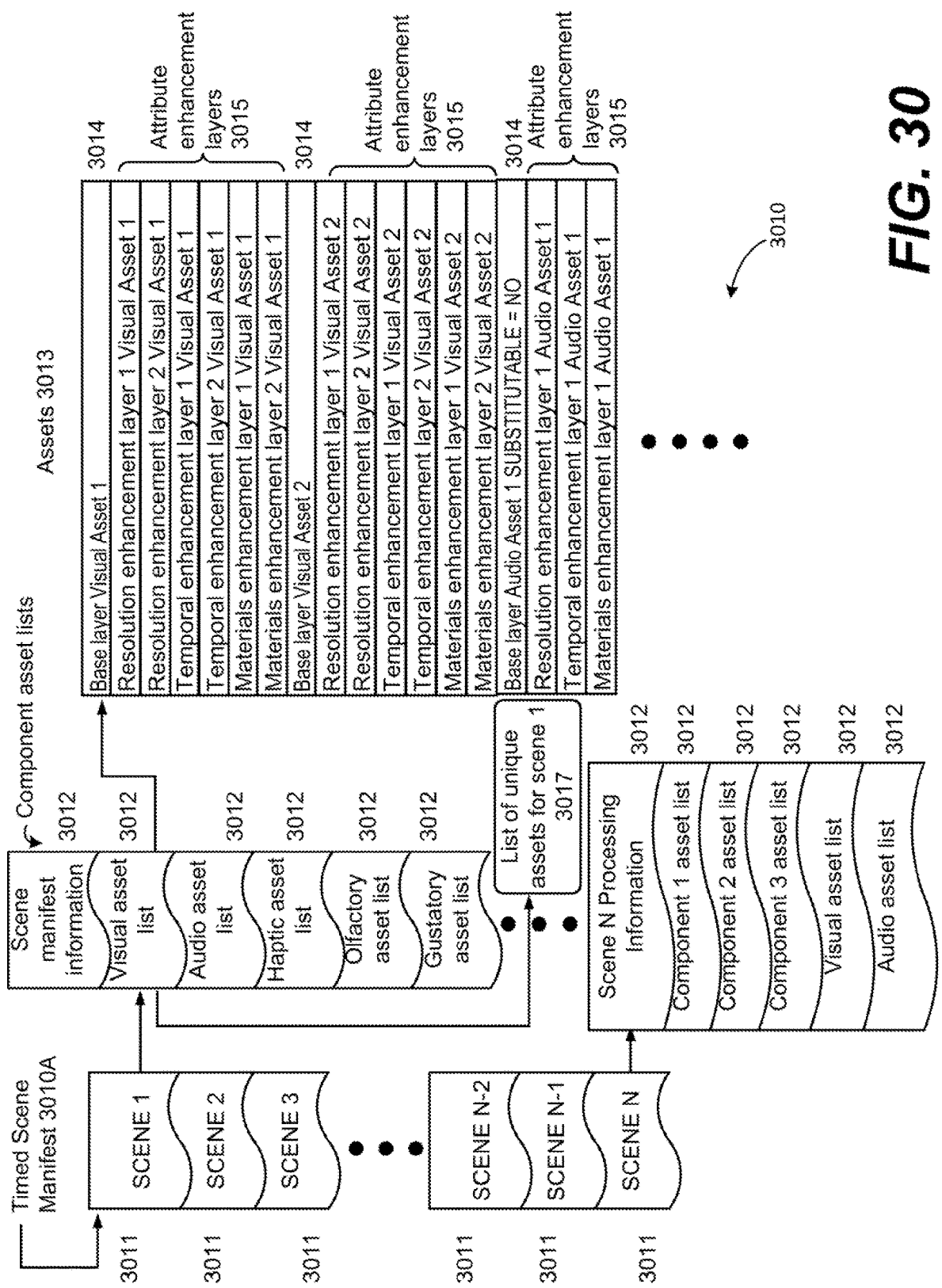
FIG. 30 shows a diagram of a timed media representation with signaling of substitution for nonvisual assets in some examples.

FIG. 30 shows a diagram of a timed media representation 3010 with signaling of substitution for nonvisual assets in some examples. The timed media representation 3010 includes a timed scene manifest 3010A that includes information of a list of scenes 3011. Information of a scene 3011 refers to a list of components 3012 that separately describe processing information and types of media assets in the scenes 3011. The components 3012 refer to assets 3013 that further refer to base layers 3014 and attribute enhancement layers 3015. The base layers 3014 for nonvisual assets are provisioned with metadata to indicate that the corresponding asset is or is not a candidate to be substituted by a user-provided asset (not shown). A list of assets 3017 that have not been previously used in other scenes 3011 is provided for each scene 3011.

Figure 31:
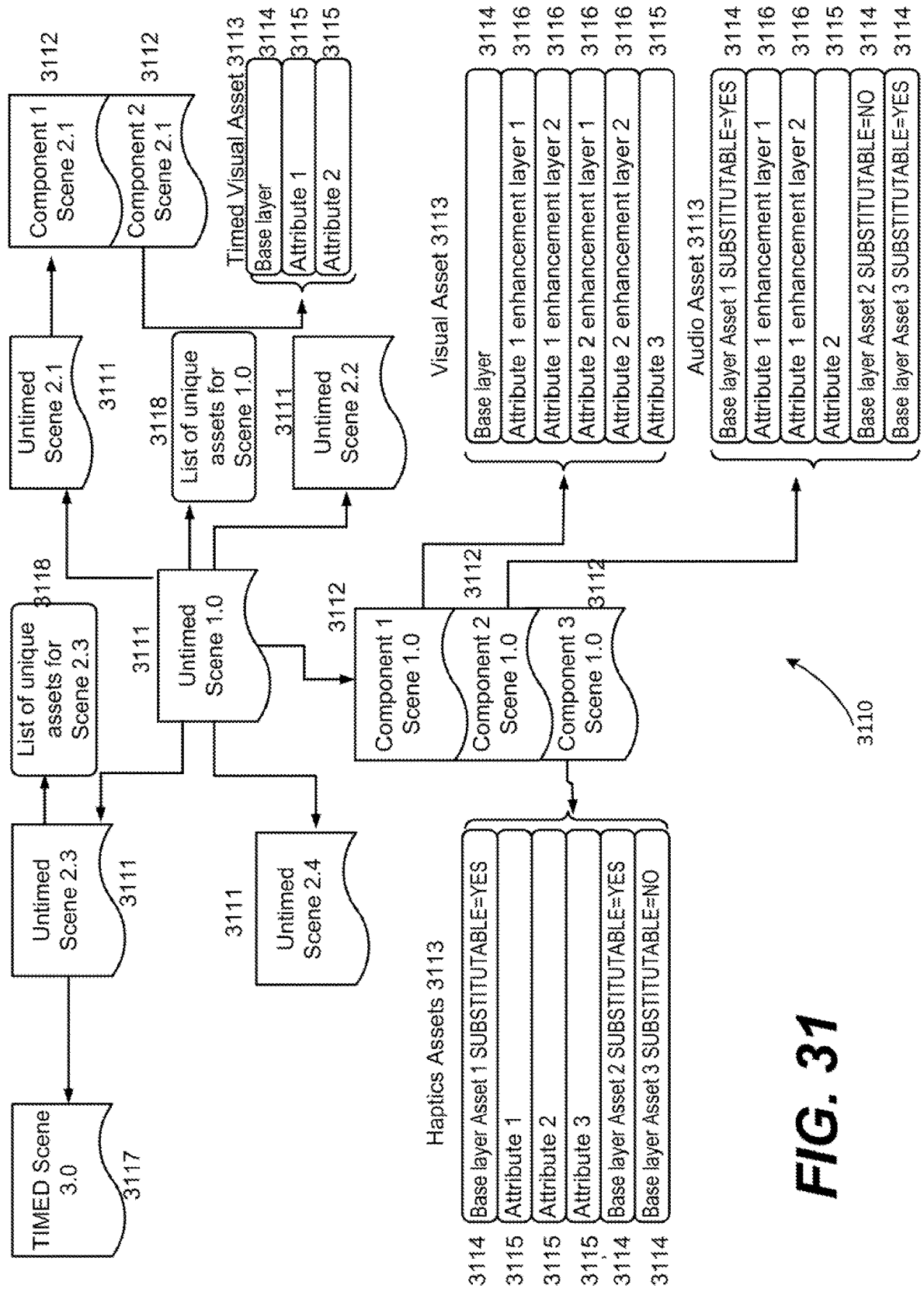
FIG. 31 shows a diagram of an untimed media representation with signaling of substitution of nonvisual assets in some examples.

FIG. 31 shows a diagram of an untimed media representation 3110 with signaling of substitution of nonvisual assets in some examples. An untimed scene manifest (not depicted) references a Scene 1.0 for which there is no other scene that can branch to Scene 1.0. Information of scenes 3111 is not associated with a start and end duration according to a clock. Information of a scene 3111 refers to a list of components 3112 that separately describe processing information and types of media assets in the scene. The components 3112 refer to assets 3113 that further refer to base layers 3114 and attribute enhancement layers 3115 and 3116. Assets 3113 that are not of type "visual" are further provisioned with metadata to indicate that the corresponding asset is or is not a candidate to be substituted by a user-provided asset (not shown). Furthermore, information of scene 3111 can refer to other scenes information 3111 that are for untimed media. Information of scene 3111 can also refer to scene information 3117 that is for a timed media scene. Lists 3118 identify unique assets associated with a particular scene that have not been previously used in higher order (e.g., parent) scenes.

Figure 32:
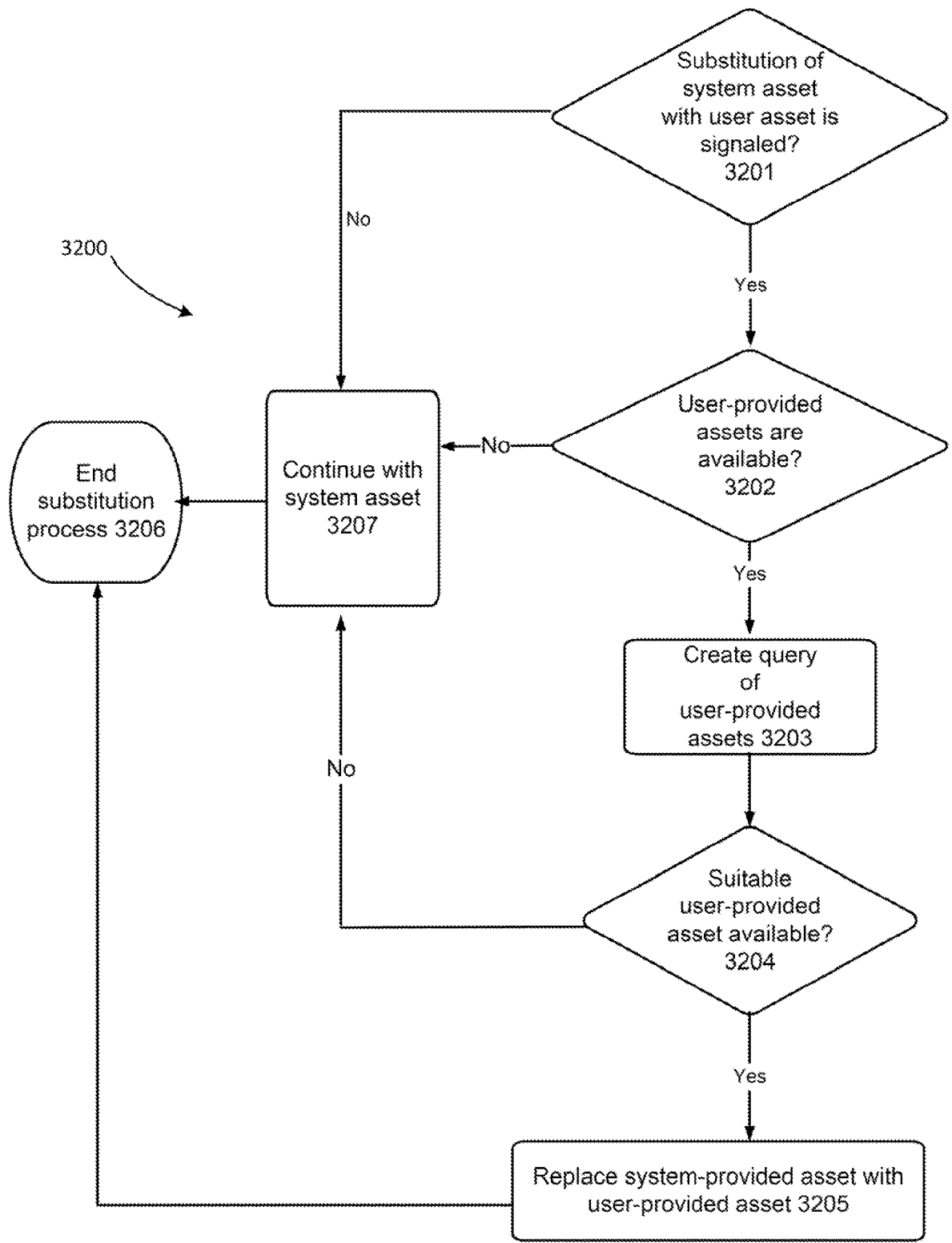
FIG. 32 shows a process to perform asset substitution with user-provided asset in a client device according to some embodiments of the disclosure.

FIG. 32 shows a process (also referred to as substitution logic) 3200 to perform asset substitution with user-provided asset in a client device according to some embodiments of the disclosure. In some examples, the process 3200 can be executed by a smart client in the client device. Starting at a process step 3201, the metadata in an asset is examined to determine if the asset in question is a candidate to be substituted. If the asset is not a candidate for substitution, then the process continues with the asset (e.g., provided by the content provider) at a process step 3207. Otherwise, if the asset is a candidate for substitution, a decision making step 3202 is executed. If the client device is not provisioned with the ability to store user-provided asset (e.g., depicted as a media cache 1415 in FIG. 14), then process continues with the asset provided by the content provider at the process step 3207. Otherwise, if the client device is provisioned with a user-provided asset cache (e.g., user-provided media cache 1416 in FIG. 14), then process continues at a process step 3203. The process step 3203 builds a query for the asset cache (e.g., user-provided media cache 1415 in FIG. 14) to retrieve a suitable user-provided asset to substitute for the asset provided by the content provider. A decision making step 3204 determines if a suitable user-provided asset is available to be used. If a suitable user-provided asset is available, the process continues at a process step 3205 in which the reference to the asset provided by the content provider is replaced by a reference to the user-provided asset in the media. Process then continues to a process step 3206 which denotes the end of the substitution logic 3200. If a suitable user-provided asset is not available from the asset cache (e.g., user-provided media cache 1416 in FIG. 14), then process continues with the asset provided by the content provider at a process step 3207, i.e., the substitution is not performed. From the process step 3207, the process continues to the process step 3206 which denotes the end of the substitution logic 3200.

In some examples, the process 3200 is applied on visual assets. In an example, a person may want to replace a visual asset of a character in a media with a visual appearance of the person for better experience. In another example, a person may want to replace a visual asst for a building in a scene with a visual appearance of a visual appearance of a real building. In some examples, the process 3200 is applied on nonvisual assets. In an example, for a person with vision impairment, the person may have customized haptics assets to replace the haptics assets provided from the content provider. In another example, for a person from a region with accent, the person may have audio assets with accent to replace the audio assets provided from the content provider.

Figure 33:
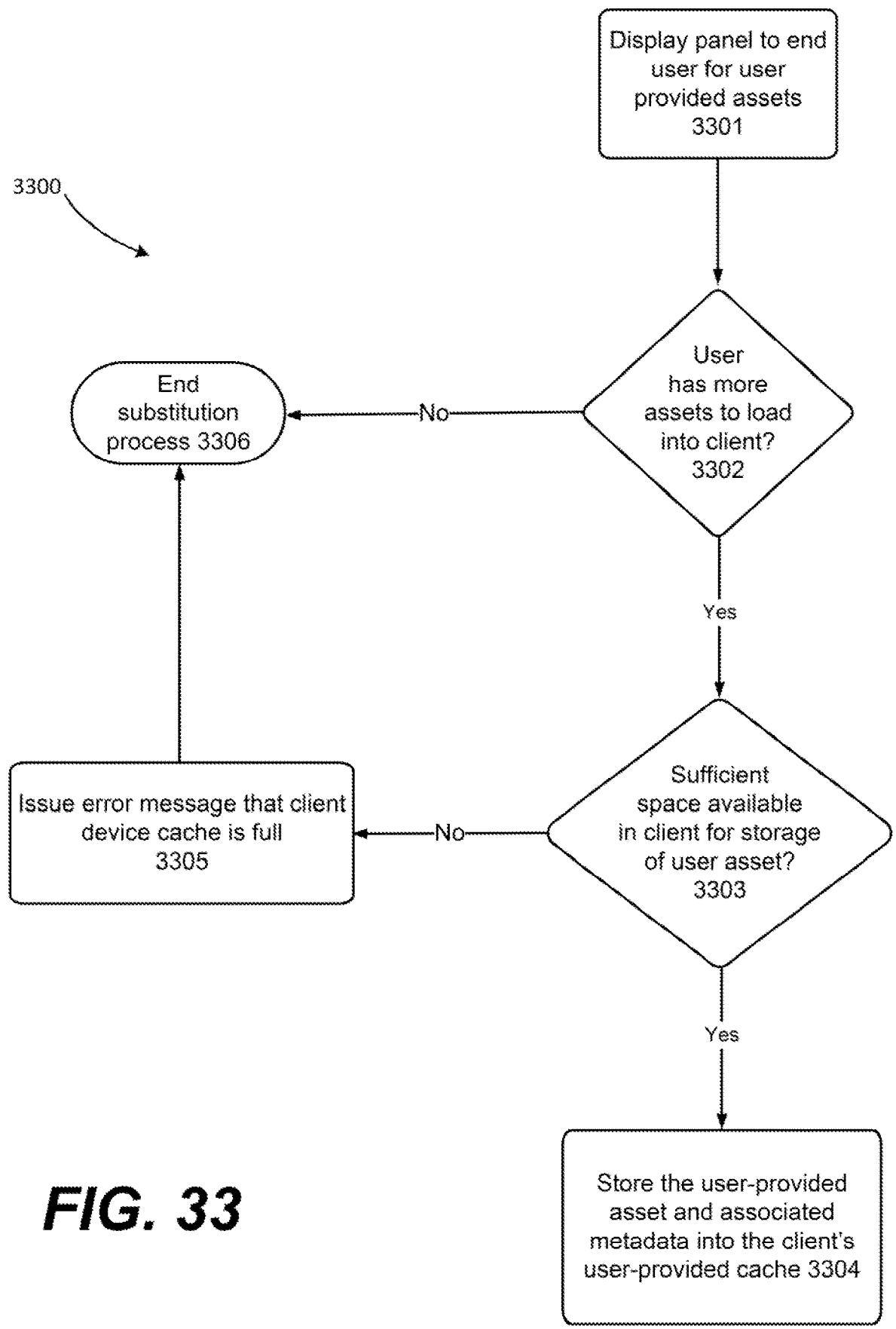
FIG. 33 shows a process for populating user-provided media cache in a client device according to some embodiments of the disclosure.

FIG. 33 shows a process (also referred to as populating logic) 3300 for populating user-provided media cache in a client device according to some embodiments of the disclosure. The process starts at a process step 3301, a display panel on the client device (e.g., client device 1418 in FIG. 14) presents a user with options to load assets into a cache (e.g., the user provided media cache 1416 in FIG. 14). A decision making step 3302 is then executed to determine if the user has more assets to load (e.g., from an external storage, such as the user provided media storage 1419 in FIG. 14) into the client device. If the user has more assets to load into the client device, then the process continues to a decision making step 3303. If the user does not have any (more) assets to load into the client device, then process continues to a process step 3306. The process step 3306 denotes the end of the populating logic 3300. The decision making step 3303 determines if there is sufficient storage in the client device (e.g., the user provided media cache 1416 in FIG. 14) to store the user-provided asset. If there is sufficient storage in the client device (e.g., the user provided media cache 1416 in FIG. 14), then the process continues to a process step 3304. If there is not sufficient storage to store the user-provided asset, then the process continues to a process step 3305. The process step 3305 issues a message to inform the user that the client device does not have sufficient storage to store the user's asset. Once the message is issued at the process step 3305, the process then continues to the process step 3306 which denotes the end of the populating logic 3300. If there is sufficient storage for the asset, then the process step 3304 will copy the user's asset into the client device (e.g., the user provided media cache 1416 in FIG. 14). Once the asset is copied at the process step 3304, process returns back to the step 3302 to inquire if the user has more assets to load into the client device.

In some examples, the process 3300 is applied on visual assets (e.g., user provided visual assets). In some examples, the process 3300 is applied on nonvisual assets (e.g., user provided nonvisual assets).

Figure 34:
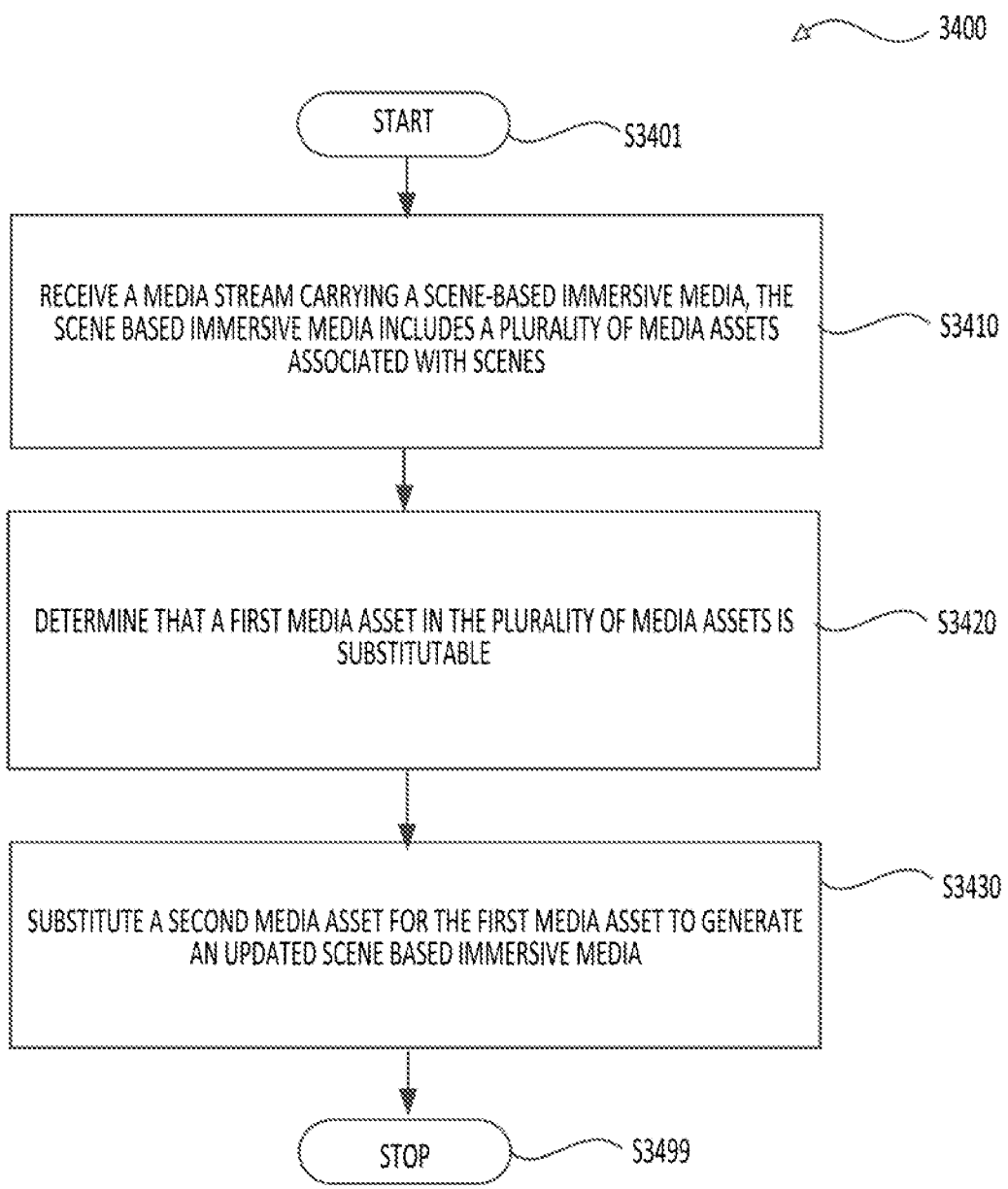
FIG. 34 shows a flow chart outlining a process according to an embodiment of the disclosure.

FIG. 34 shows a flow chart outlining a process 3400 according to an embodiment of the disclosure. The process 3400 can be executed in an electronic device, such as a client device with a smart client for interfacing the client device with a network. In some embodiments, the process 3400 is implemented in software instructions, thus when processing circuitry executes the software instructions, the processing circuitry performs the process 3400. For example, the smart client is implemented in software instructions, and the software instructions can be executed to perform a smart client process that includes the process 3400. The process starts at S3401, and proceeds to S3410.

At S3410, a media stream carrying a scene-based immersive media is received. the scene based immersive media includes a plurality of media assets associated with scenes.

At S3420 a first media asset in the plurality of media assets is determined to be substitutable.

At S3430 a second media asset is used to substitute for the first media asset to generate an updated scene based immersive media.

In some examples, metadata in a base layer of the first media asset can indicate that the first media asset is substitutable. In an example, the first media asset is a timed media asset. In another example, the first media asset is an untimed media asset.

In some examples, the first media asset is a visual asset. In some examples, the first media asset is a nonvisual asset, such as an audio asset, a haptics asset and the like.

In some examples, a storage device (e.g., a cache) of the client device is accessed to determine whether the second media asset that corresponds to the first media asset is available at the client device. In an example, the smart client creates a query that queries whether the second media asset corresponding to the first media asset is available.

In some examples, the client device can perform a populating process to load user provided media asset in the storage device. For example, the client device can load the second media asset into a cache via a user interface. In some examples, the second media asset is a user provided media asset.

Then, the process 3400 proceeds to S3499 and terminates.

The process 3400 can be suitably adapted to various scenarios and steps in the process 3400 can be adjusted accordingly. One or more of the steps in the process 3400 can be adapted, omitted, repeated, and/or combined. Any suitable order can be used to implement the process 3400. Additional step(s) can be added.

It is noted that the smart client component (e.g., smart client process, software instructions and the like) can manage the receipt and processing of streamed media on behalf of a client device in a distribution network designed to stream scene-based media to client devices (e.g., immersive client devices). The smart client may be configured to perform many functions on behalf of the client device including: 1) requesting of media resources from a distribution network; 2) reporting on current status or configurations of client device resources, including attributes describing a client's preferred media formats; 3) accessing media that may be previously transformed and stored in a format that is suitable for the client device, i.e., having been previously processed by another similar or same client device, and cached in a data storage for subsequent reuse; 4) substituting user-provided media assets in place of system-provided media assets. Further, in some examples, some techniques can be implemented in a network device to perform functions similar to the smart client in the client device, but tuned to focus on the adaptation of media from a format A to a format B to contribute to the efficacy of the network that distributes immersive scene-based media to multiple heterogeneous client devices. In some examples, the techniques can be implanted as software instructions in a network device and the software instructions can be executed by processing circuitry of the network device, the software instructions or the process performed by the processing circuitry according to the software instructions can be referred to as a smart controller in the sense that the smart controller sets up, initiates, manages, terminates, and tearsdown resources for adapting ingest media to a client-specific format before the media is made available for distribution to the specific client device.

According to fourth aspects of the present disclosure, various techniques disclosed in the present disclosure can manage the adaptation of media on behalf of a network that transforms media to a client-specific format on behalf of a client device. In some examples, a smart controller in a network server device is implemented according to some of the techniques, the smart controller may be embodied by one or more processes, with one or more channels of communication implemented between smart controller processes and network processes. In some examples, some of the techniques include metadata to sufficiently describe the intended results of the transformation process of the media. In some examples, some of the techniques can provide access to media caches that may contain previously transformed media. In some examples, some of the techniques can provide access to one or more renderer processors. In some examples, some of the techniques can provide access to sufficient GPU and or CPU processors. In some examples, some of the techniques can provide access to sufficient storage devices in which to store the resulting transformed media.

Figure 35:
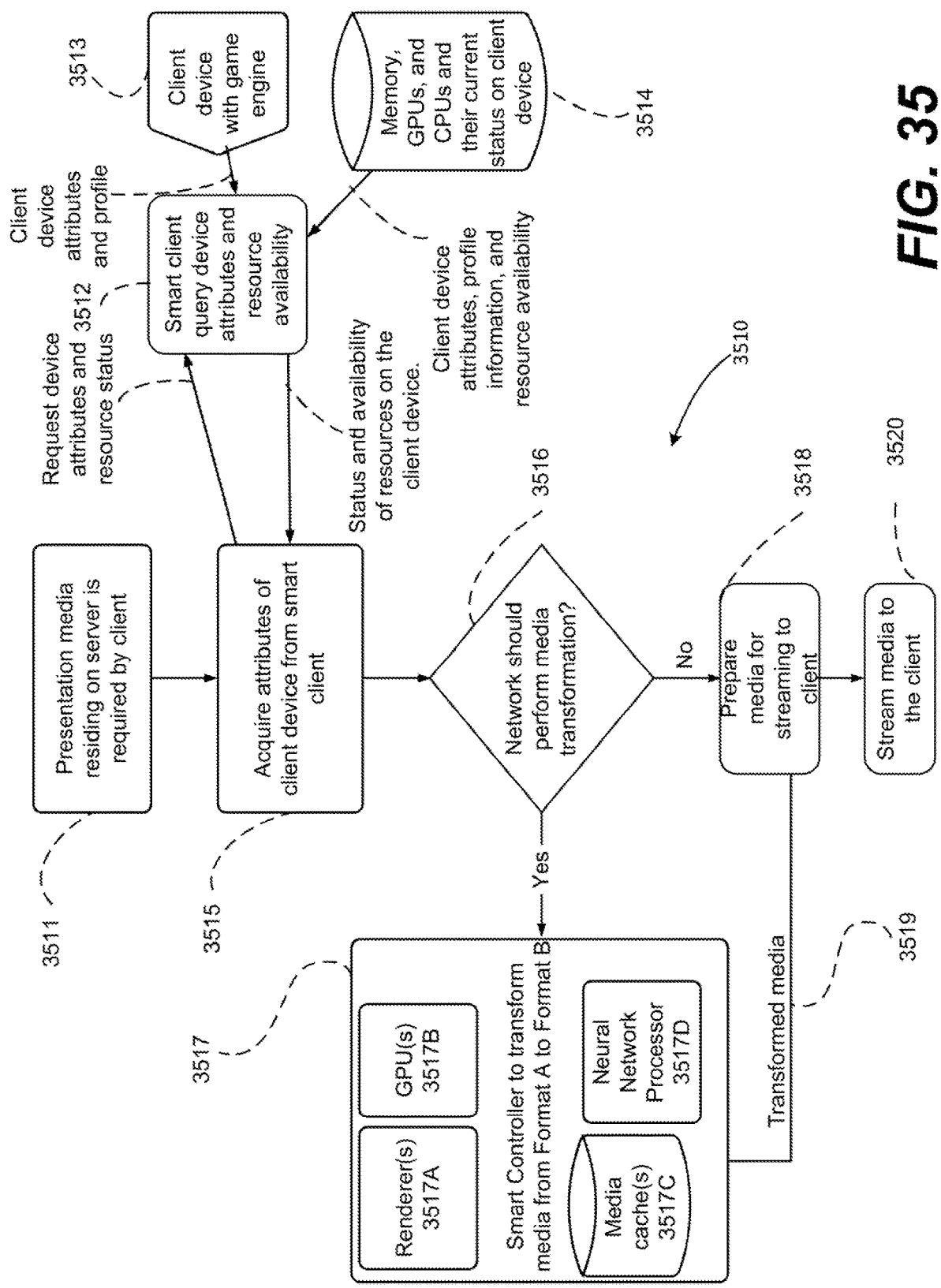
FIG. 35 shows a process for performing network-based media transformation in some examples.

FIG. 35 shows a process 3510 for performing network-based media transformation in some examples. The network-based media transformation is performed in a network, such as by a smart controller in a network server device, and based on information of a client device. The information of the client device is provided from a smart client in the client device in some examples.

Specifically, in FIG. 35, at a process step 3511, media requested by the client device is ingested into the network. Then, at a process step 3515, the network acquires device attributes and resource status of the client device. For example, the network initiates a request to the smart client (e.g., shown as in a process step 3512) to acquire device attributes and resource status. At the process step 3512, the smart client initiates queries to the client device 3513 and to additional resources (if any) 3514 for the client device to retrieve descriptive attributes about the client device and information about client device's resources, including resource availability to process future work, respectively. The client device 3513 delivers client device attributes that describe the processing capabilities of the client device. Status and availability of resources on the client device is returned to the smart client from the additional resources 3514. Then, the smart client provides the status and availability of resources on the client device to the network, as shown in the process step 3515. At a process step 3516, the network then determines if the network needs to transform the media before the media is streamed to the client device for example based on the status and availability of resources on the client device. If such a transformation is required, for example the client device is powered by battery and lacks processing power, then the smart controller 3517 performs the transformation. The smart controller 3517 may utilize renderer(s) 3517A, GPU(s) 3517B, media caches 3517C, and neural network processor 3517D to assist in the transformation. The transformed media 3519 is then provided to a process step 3518 to merge the transformed media into the media to be streamed to the client device. If at the process step 3516, the decision is made such that the network does not perform any such transformation of the media, for example the client device has enough process power, then the process step 3518 prepares the media with the original media asset to be streamed to the client device. Following the process step 3518, the media is streamed to the client at a process step 3520.

Figure 36:
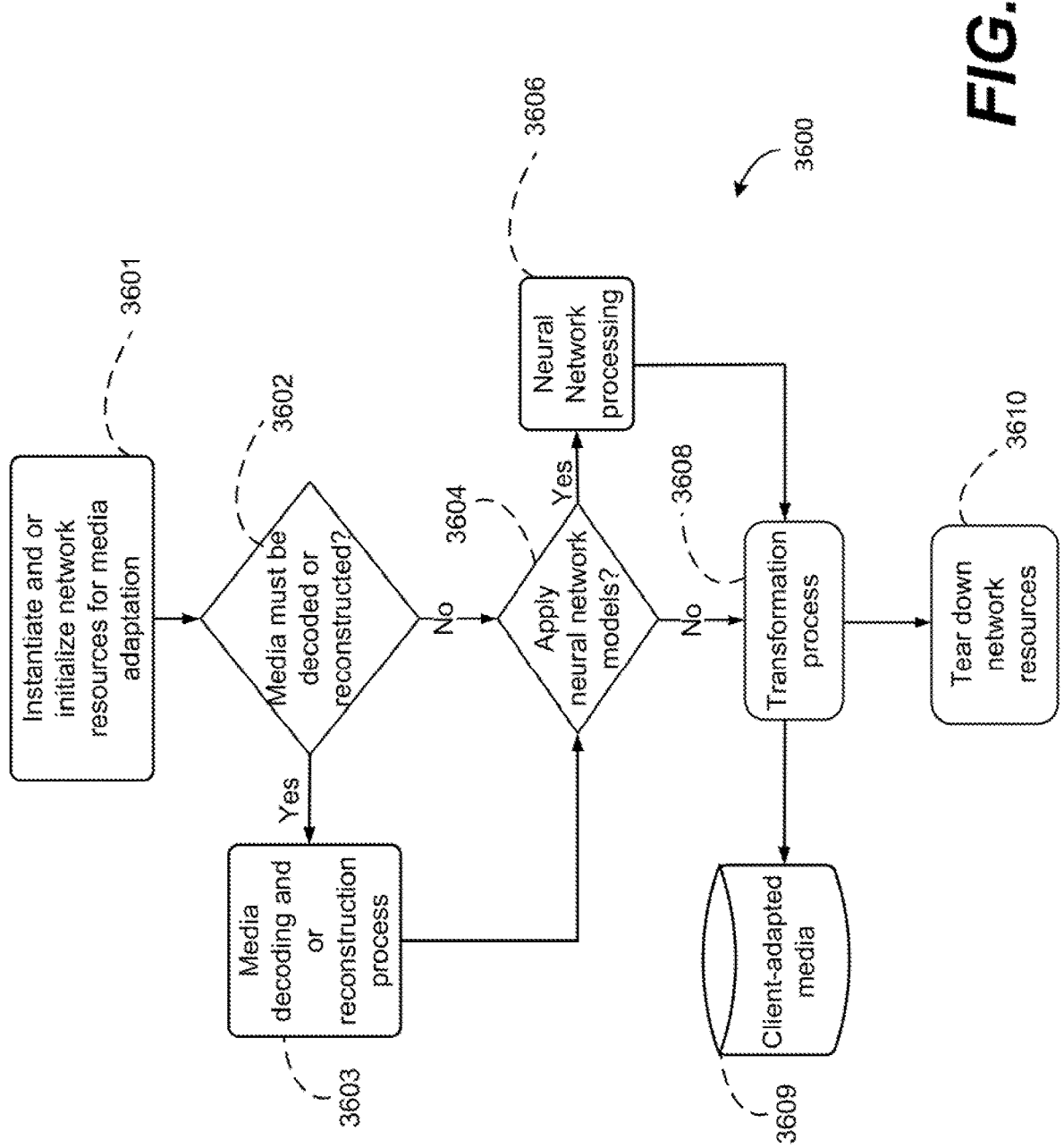
FIG. 36 shows a process to perform network-based media adaptation in a smart controller in a network in some examples.

FIG. 36 shows a process 3600 to perform network-based media adaptation in a smart controller in a network. A process step 3601 instantiates and or initializes resources to perform the adaptation of the media. Such resources may include separate compute threads for managing instances of renderers and or decoders to return the media to an original state, e.g., such as returning the media to its uncompressed representation of the same media. A decision making process step 3602 determines if the media needs to first undergo a reconstruction and/or decompression process. If the media needs to first be reconstructed and/or decompressed prior to being adapted for distribution to the client device, then a process step 3603 will perform the tasks of reconstructing and/or decompressing the media. The reconstructed and/or decompressed media is returned via a channel to the smart controller. Next, at a process step 3604, the smart controller determines if the media should be further refined using neural networks and possibly a neural network model (not shown) provided to or stored in the network on behalf of the client device, to assist in adapting the media to a client-friendly format. If the smart controller determines that an application of a neural network needs to be performed, then at a process step 3606, neural network processor can apply the neural network model to the media. The resulting media from the neural network processing is return to the smart controller via a channel. At the processing step 3604, if there is no need to refine the media using a neural network processor, the neural network processing is skipped. At a processing step 3608, the smart controller transforms the media (e.g., reconstructed and/or decompressed media or resulting media from neural network processing) into a format that is suitable for the specific client device. Such transformation process may employ renderer tools, 3D modelling tools, video decoders and or video encoders. Processing performed by the processing step 3608 may include reducing the polygon count of particular assets so that the computation complexity for rendering the asset by the client device is consistent with the capabilities of the client device's computation capabilities. Other factors may also be addressed as part of the transformation process step 3608 including, for example, substituting different texture resolutions for certain assets. For example, if the UV texture for a particular mesh-based asset needs to be provided at a particular resolution, e.g., in high definition (HD) rather than ultra high definition (UHD), then the transformation process 3608 may also create an HD representation of the UV textures for the mesh asset. Another example is if a particular asset in the generic network media is described according to the specifications of a particular 3D format, e.g., FBX, glTF, OBJ, and the client device is not capable of ingesting the media represented according to that particular format specification, then transformation process 3608 may employ 3D tools to transform the media asset into a format that can be ingested by the client device. Following the completion of transformation process 3608, the media is stored in a client-adapted media cache 3609 for subsequent access by the client device (not shown). If necessary, the smart controller then performs a tear-down or deallocation process 3610 of compute and storage resources that were previously allocated at 3601 for the smart controller.

Figure 37:
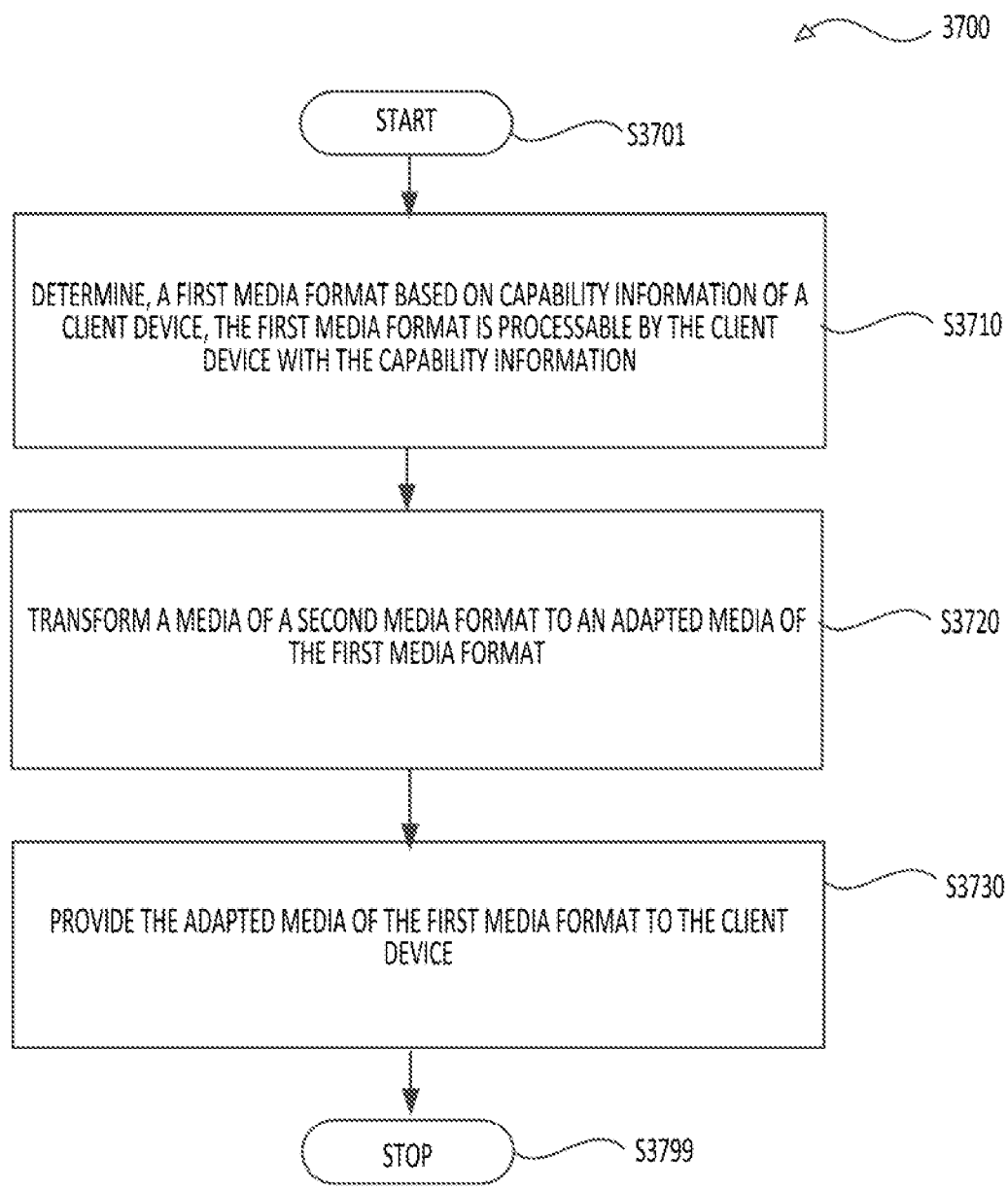
FIG. 37 shows a flow chart outlining a process according to an embodiment of the disclosure.

FIG. 37 shows a flow chart outlining a process 3700 according to an embodiment of the disclosure. The process 3700 can be executed in a network, such as a server device in a network. In some embodiments, the process 3700 is implemented in software instructions, thus when processing circuitry executes the software instructions, the processing circuitry performs the process 3700. For example, the process 3700 is implemented as software instructions in a smart controller, the processing circuitry can execute the software instructions to perform the smart controller process. The process starts at S3701, and proceeds to S3710.

At S3710, the server device determines a first media format based on capability information of a client device. The first media format is processable by the client device with the capability information.

At S3720, the server device transforms a media of a second media format to an adapted media of the first media format. In some examples, the media is a scene-based immersive media.

At S3730, the adapted media of the first media format is provided (e.g., streamed) to the client device.

In some examples, the smart controller may include render(s), video decoders, video encoders, neural network model(s) and the like. In some examples, the second media format is ingest media format of the network. The smart controller can transform the media of the ingest media format of the network to an intermediate media format, and then transform the media from the intermedia media format to the first media format. In some examples, the smart controller may decode the media of the ingest media format and generate a reconstructed media, then the smart controller can transform the reconstructed media to the media of the first media format.

In some examples, the smart controller can cause neural network processor to apply a neural network model on the reconstructed media to refine the reconstructed media, and then transform the refined media to the media of the first media format.

In some examples, the media of the second media format is of a generic media type for network transmission and storage.

In some examples, the capability information of the client device includes at least one of a capability of computation by the client device and a capability of accessible storage resource of the client device.

In some examples, the smart controller can cause a request message to be sent to the client device, and the request message requests the capability of the client device. Then, the smart controller can receive a response with the capability information of the client device.

Then, the process 3700 proceeds to S3799 and terminates.

The process 3700 can be suitably adapted to various scenarios and steps in the process 3700 can be adjusted accordingly. One or more of the steps in the process 3700 can be adapted, omitted, repeated, and/or combined. Any suitable order can be used to implement the process 3700. Additional step(s) can be added.

According to fifth aspects of the present disclosure, various techniques can be used to characterize the capabilities of a client device in terms of the media that the client device is capable of ingesting. In some examples, a characterization can be represented by a client media profile that serves to convey a description of scene-based immersive media asset types, levels of detail per asset type, maximum size in terms of bytes per asset type, maximum number of polygons per asset type, and other parameters that describe the types of media and characteristics of that media that the client device is capable of ingesting directly from the network. A network that receives the client media profile from the client device may then operate more efficiently in terms of preparing the ingested media to be distributed and or accessed by the client device.

Figure 38:
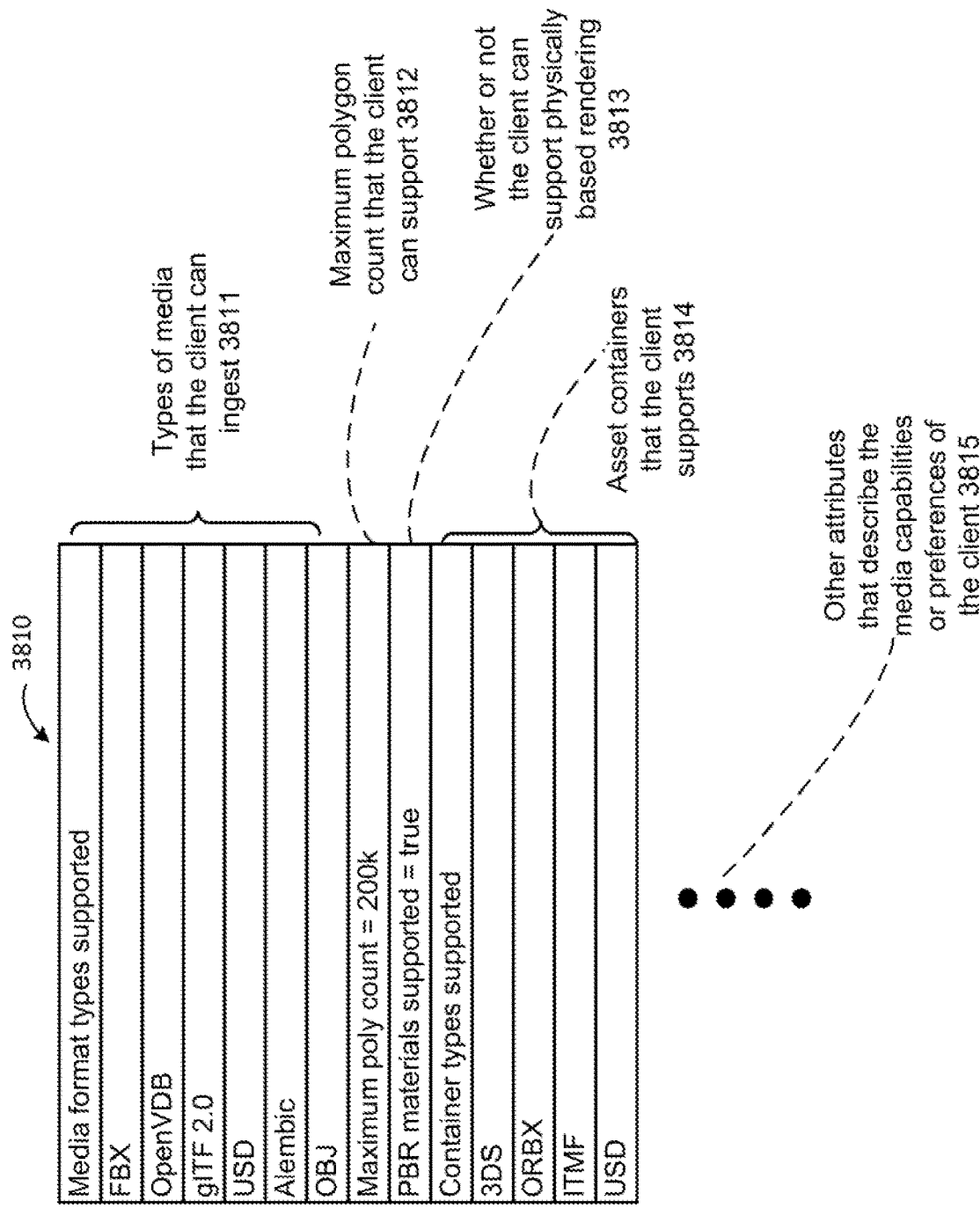
FIG. 38 shows a diagram of a client media profile in some examples.

FIG. 38 shows a diagram of a client media profile 3810 in some examples. In FIG. 38 example, information concerning the media formats, media containers, and other attributes about the media that are supported by the client device are conveyed in a uniform manner (i.e., according to a specification not shown in FIG. 38) to the network.

For example, the types of media formats that the client device can support are depicted as a list 3811. A data element 3812 conveys the maximum polygon count that the client device can support. A data element 3813 indicates whether the client device supports physically based rendering, or not. A list 3814 identifies the asset media containers that the client device supports. A list 3815 depicts that there are other media-related items that may include the complete media profile to characterize the media preferences of the client device. The disclosed subject matter may be regarded as an immersive media scene-based media corollary to information (including the color format, color depth, video, and audio formats supported) exchanged via the specifications for the high definition multimedia interface between a source and a sink process.

Figure 39:
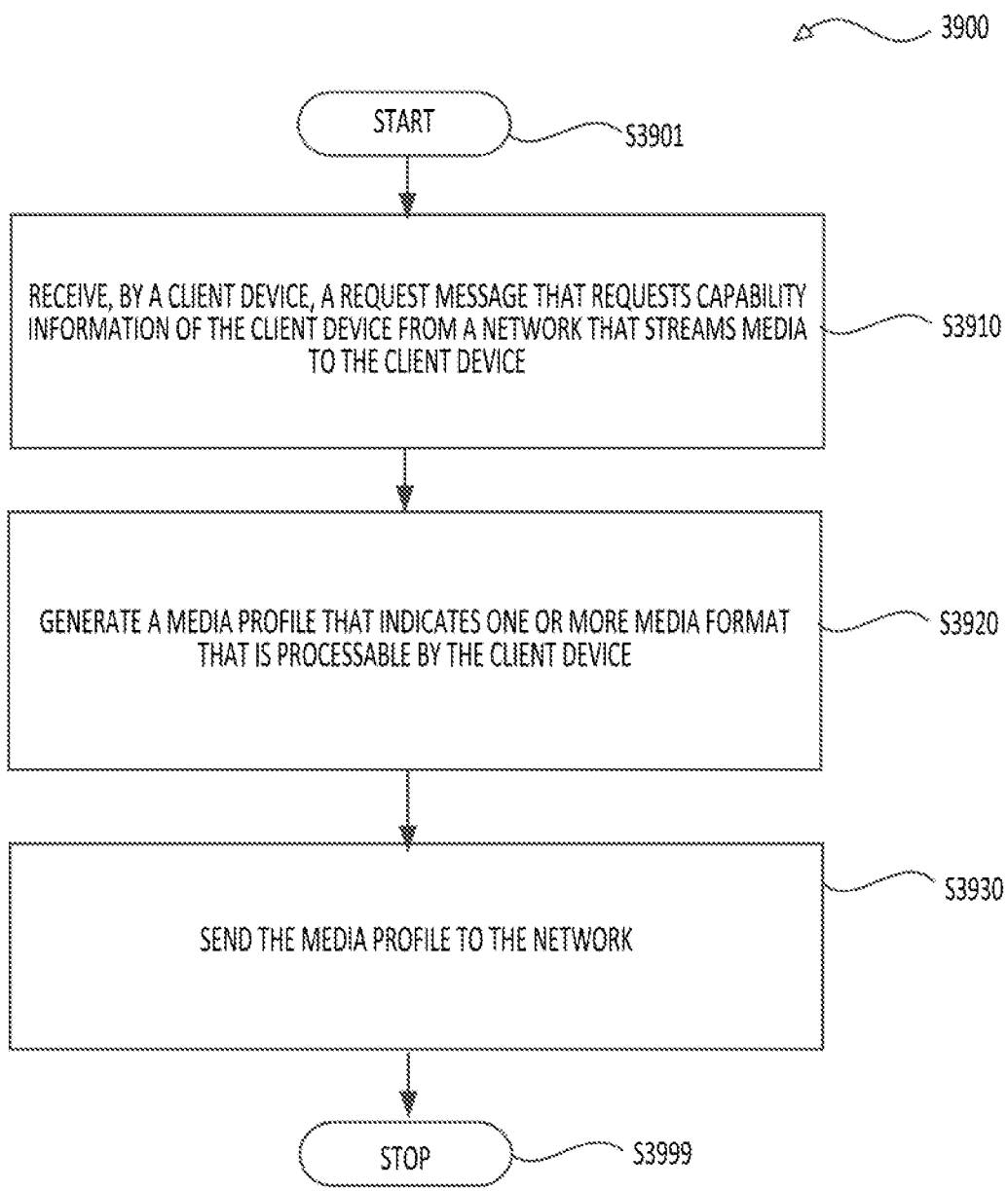
FIG. 39 shows a flow chart outlining a process according to an embodiment of the disclosure.

FIG. 39 shows a flow chart outlining a process 3900 according to an embodiment of the disclosure. The process 3900 can be executed in an electronic device, such as a client device with a smart client for interfacing the client device with a network. In some embodiments, the process 3900 is implemented in software instructions, thus when processing circuitry executes the software instructions, the processing circuitry performs the process 3900. The process starts at S3901, and proceeds to S3910.

At S3910, a client device receives a request message from a network that streams media (e.g., scene-based immersive media) to the client device, the request message requests capability information of the client device.

At S3920, the client device generates a media profile that indicates one or more media format that is processable by the client device.

At S3930, the client device sends the media profile to the network.

In some examples, the media profile defines one or more types of scene-based media that are supported by the client device, such as shown by 3811 in FIG. 38.

In some examples, the media profile includes a list of media parameters that characterize the capabilities of the client device to support specific variations of the media in a manner consistent with the processing capability of the client device, such as shown by 3812, 3813, 3814 in FIG. 38.

Then, the process 3900 proceeds to S3999 and terminates.

The process 3900 can be suitably adapted to various scenarios and steps in the process 3900 can be adjusted accordingly. One or more of the steps in the process 3900 can be adapted, omitted, repeated, and/or combined. Any suitable order can be used to implement the process 3900. Additional step(s) can be added.

Figure 40:
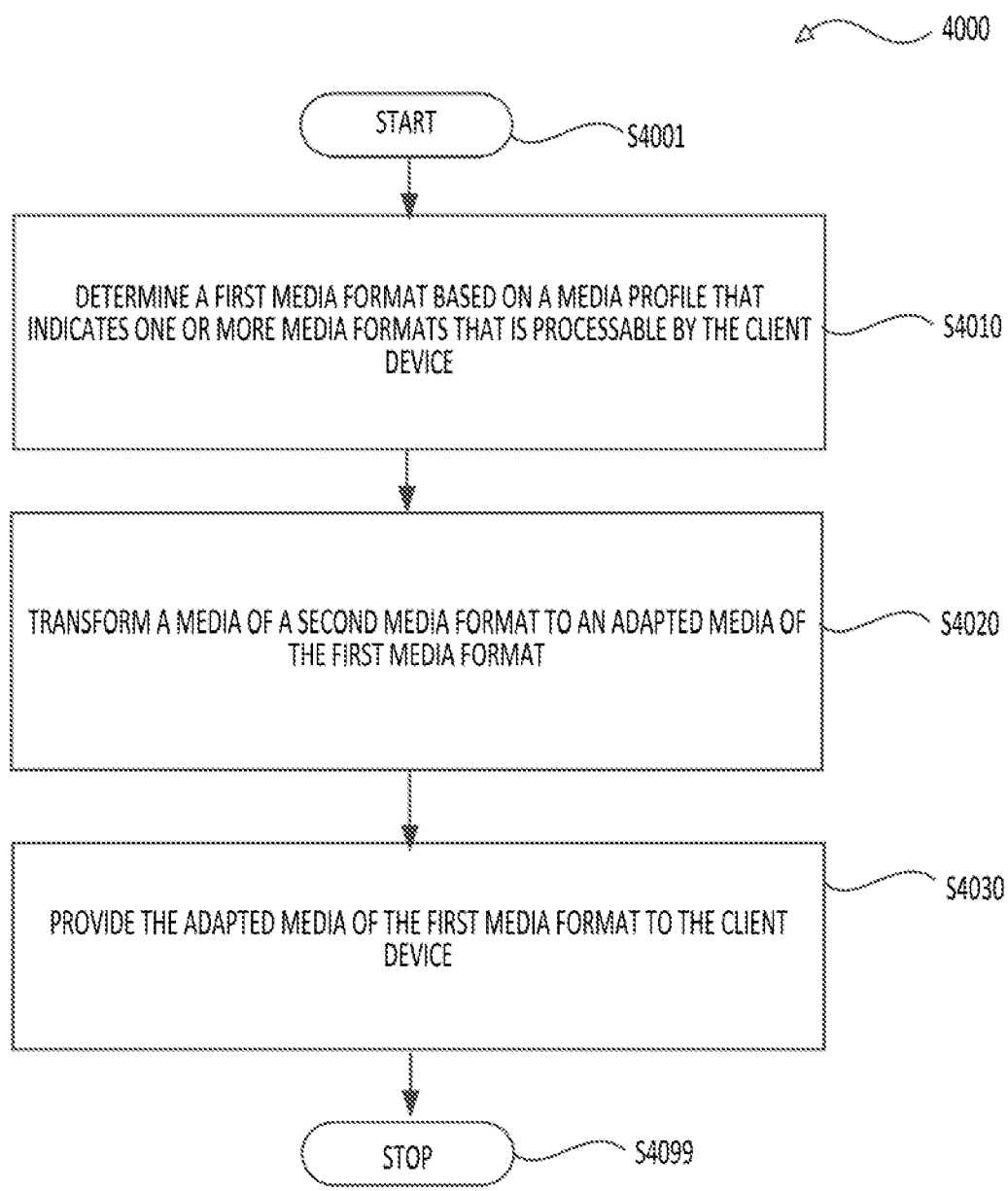
FIG. 40 shows a flow chart outlining a process according to an embodiment of the disclosure.

FIG. 40 shows a flow chart outlining a process 4000 according to an embodiment of the disclosure. The process 4000 can be executed in a network, such as a server device in a network. In some embodiments, the process 4000 is implemented in software instructions, thus when processing circuitry executes the software instructions, the processing circuitry performs the process 4000. The process starts at S4001, and proceeds to S4010.

At S4010, a first media format is determined, for example by the server device, based on a client media profile that indicates one or more media formats that is processable by the client device. For example, the client media profile can be the client media profile 3810 in FIG. 38.

At S4020, a media of a second media format is transformed to an adapted media of the first media format. In some examples, the media is a scene-based immersive media of an ingest media format of the network. The server device can transform the media of the ingest media format of the network to the first media format that is processable by the client device.

At S4030, the adapted media of the first media format is provided (e.g., streamed) to the client device.

In some examples, the media profile defines one or more types of scene-based media that are supported by the client device, such as shown by 3811 in FIG. 38.

In some examples, the media profile includes a list of media parameters that characterize the capabilities of the client device to support specific variations of the media in a manner consistent with the processing capability of the client device, such as shown by 3812, 3813, 3814 in FIG. 38.

Then, the process 4000 proceeds to S4099 and terminates.

The process 4000 can be suitably adapted to various scenarios and steps in the process 4000 can be adjusted accordingly. One or more of the steps in the process 4000 can be adapted, omitted, repeated, and/or combined. Any suitable order can be used to implement the process 4000. Additional step(s) can be added.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of media processing in an electronic device, comprising:
    transmitting, by a client interface of the electronic device and to a server device in an immersive media streaming network, capability and availability information of the electronic device for playing back a scene-based immersive media, the scene-based immersive media including a plurality of scenes, a first scene in the plurality of scenes being indicated by a scene graph that specifies logical relationships among a plurality of media assets in the first scene;
    receiving, by the client interface, a media stream carrying adapted media content for the scene-based immersive media, the adapted media content being generated from the scene-based immersive media by the server device based on the capability and availability information;
    playing back the scene-based immersive media according to the adapted media content;
    determining, according to the adapted media content, that a first media asset associated with the first scene is received for a first time and is to be reused in one or more scenes in the plurality of scenes, the plurality of media assets including the first media asset;
    storing the first media asset in a cache device that is accessible by the electronic device; and
    extracting a first list of unique assets in the first scene from the media stream, the first list of unique assets identifying the first media asset as a unique asset in the first scene and to be used in the first scene and reused in the one or more scenes, wherein
    an entry for the first media asset in the first list of unique assets in the first scene includes an indicator for a type of media of the first media asset, a unique identifier for the first media asset, and a number of times that the first media asset is used across the plurality of scenes in the scene-based immersive media, the type of media being one of a plurality of assets including a visual asset, an audio asset, and a haptic asset, the plurality of scenes including the first scene and the one or more scenes, and the number of times being a number of the first scene and the one or more scenes.

2. The method of claim 1, wherein the transmitting the capability and availability information comprises:
    transmitting, by the client interface, a signal indicative of an availability of the first media asset at the electronic device to the server device, the signal causing the server device to use a proxy to substitute for the first media asset in the adapted media content.

3. The method of claim 2, wherein the playing back the scene-based immersive media further comprises:
    determining, by the client interface, that the first media asset is previously stored in the cache device according to the proxy in the adapted media content; and
    accessing the cache device to retrieve the first media asset.

4. The method of claim 2, wherein the transmitting the signal indicative of the availability of the first media asset comprises:
    receiving a query signal for the first media asset from the server device; and
    transmitting, in response to the query signal, the signal indicative of the availability of the first media asset at the electronic device.

5. The method of claim 1, wherein the transmitting the capability and availability information comprises:
    receiving, by the client interface, a request to acquire device attribute and resource status from the server device;
    querying, one or more internal components of the electronic device and/or one or more external components associated with the electronic device for attributes of the electronic device and resource availability for processing the scene-based immersive media; and
    transmitting the attributes of the electronic device and the resource availability to the server device.

6. The method of claim 1, further comprising:
    receiving a request of the scene-based immersive media from a user interface; and
    forwarding, by the client interface, the request of the scene-based immersive media to the server device.

7. The method of claim 1, wherein the playing back the scene-based immersive media further comprises:
    generating, under a control of the client interface, a reconstructed scene-based immersive media based on a decoding of the media stream and a media reconstruction; and
    providing, via an application programming interface (API) of a game engine of the electronic device, the reconstructed scene-based immersive media to the game engine for playing back.

8. The method of claim 1, wherein the playing back the scene-based immersive media further comprises:
    depacketizing, by the client interface, the media stream to generate depacketized media data;
    providing, via an application programming interface (API) of a game engine of the electronic device, the depacketized media data to the game engine; and generating, by the game engine, a reconstructed scene-based immersive media for playing back based on the depacketized media data.

9. The method of claim 1, wherein the capability and availability information indicates one or more of capability of computation by the electronic device, capability of accessible storage resource of the electronic device, and availability of resources on the electronic device for rendering the scene-based immersive media.

10. The method of claim 1, wherein the first scene and the one or more scenes include the first media asset, and the first media asset is only received one time for the first scene and the one or more scenes.

11. An electronic device, comprising:
processing circuitry configured to:
transmit, to a server device in an immersive media streaming network, capability and availability information of the electronic device for playing back a scene-based immersive media, the scene-based immersive media including a plurality of scenes, a first scene in the plurality of scenes being indicated by a scene graph that specifies logical relationships among a plurality of media assets in the first scene;
receive, a media stream carrying adapted media content for the scene-based immersive media, the adapted media content being generated from the scene-based immersive media by the server device based on the capability and availability information;
play back the scene-based immersive media according to the adapted media content;
determine, according to the adapted media content, that a first media asset associated with the first scene is received for a first time and is to be reused in one or more scenes in the plurality of scenes, the plurality of media assets including the first media asset;
store the first media asset in a cache device that is accessible by the electronic device; and
extract a first list of unique assets in the first scene from the media stream, the first list of unique assets identifying the first media asset as a unique asset in the first scene and to be used in the first scene and reused in the one or more scenes, wherein
an entry for the first media asset in the first list of unique assets in the first scene includes an indicator for a type of media of the first media asset, a unique identifier for the first media asset, and a number of times that the first media asset is used across the plurality of scenes in the scene-based immersive media, the type of media being one of a plurality of assets including a visual asset, an audio asset, and a haptic asset, the plurality of scenes including the first scene and the one or more scenes, and the number of times being a number of the first scene and the one or more scenes.

12. The electronic device of claim 11, wherein the processing circuitry is configured to:
transmit a signal indicative of an availability of the first media asset at the electronic device to the server device, the signal causing the server device to use a proxy to substitute for the first media asset in the adapted media content.

13. The electronic device of claim 12, wherein the processing circuitry is configured to:
determine that the first media asset is previously stored in the cache device according to the proxy in the adapted media content; and
access the cache device to retrieve the first media asset.

14. The electronic device of claim 12, wherein the processing circuitry is configured to:
receive a query signal for the first media asset from the server device; and
transmit, in response to the query signal, the signal indicative of the availability of the first media asset at the electronic device.

15. The electronic device of claim 11, wherein the processing circuitry is configured to:
receive a request to acquire device attribute and resource status from the server device;
query, one or more internal components of the electronic device and/or one or more external components associated with the electronic device for attributes of the electronic device and resource availability for processing the scene-based immersive media; and
transmit the attributes of the electronic device and the resource availability to the server device.

* * * * *